(12) United States Patent
Ben-Yehuda et al.

(10) Patent No.: US 10,963,393 B1
(45) Date of Patent: Mar. 30, 2021

(54) STORAGE SYSTEM AND A METHOD FOR APPLICATION AWARE PROCESSING

(71) Applicant: LIGHTBITS LABS LTD., Kfar Saba (IL)

(72) Inventors: Shmuel Ben-Yehuda, Haifa (IL); Ofir Efrati, Even Yehuda (IL); Abel Alkon Gordon, Haifa (IL); Eran Kirzner, Moshav Elishama (IL); Fabian Trumper, Sunnyvale, CA (US)

(73) Assignee: Lightbits Labs Ltd., Kfar Saba (IL)

( * ) Notice: Subject to any disclaimer, the term of this patent is extended or adjusted under 35 U.S.C. 154(b) by 272 days.

(21) Appl. No.: 15/857,758

(22) Filed: Dec. 29, 2017

Related U.S. Application Data

(60) Provisional application No. 62/488,772, filed on May 4, 2017, provisional application No. 62/471,968, filed on Mar. 16, 2017, provisional application No. 62/467,250, filed on Mar. 6, 2017, provisional application No. 62/445,741, filed on Jan. 13, 2017, provisional application No. 62/445,743, filed on Jan. 13, 2017.

(51) Int. Cl.
*G06F 12/10* (2016.01)
*G06F 13/16* (2006.01)
*G06F 13/40* (2006.01)
*G06F 13/28* (2006.01)

(52) U.S. Cl.
CPC ......... *G06F 12/10* (2013.01); *G06F 13/1668* (2013.01); *G06F 13/4022* (2013.01); *G06F 13/4027* (2013.01); *G06F 13/28* (2013.01); *G06F 2212/1041* (2013.01); *G06F 2212/154* (2013.01); *G06F 2213/0026* (2013.01); *G06F 2213/16* (2013.01); *G06F 2213/28* (2013.01)

(58) Field of Classification Search
CPC .. G06F 12/10; G06F 13/1668; G06F 13/4022; G06F 13/4027
See application file for complete search history.

(56) References Cited

U.S. PATENT DOCUMENTS

| 6,173,381 | B1 | 1/2001 | Dye |
| 7,203,842 | B2 | 4/2007 | Kean |
| 8,159,259 | B1 | 4/2012 | Lewis |
| 8,896,346 | B1 | 11/2014 | Lewis |
| 9,619,167 | B2 | 4/2017 | Khan |
| 2001/0015919 | A1 | 8/2001 | Kean |

(Continued)

OTHER PUBLICATIONS

Wu, X., Xu, Y., Shao, Z., Jiang S., LSM-trie, "An LSM-tree-based Ultra-Large Key—Value Store for Small Data", In Proceedings of the 2015 USENIX Annual Technical Conference (USEN IC ATC'15), Jul. 8-10, 2015.

(Continued)

*Primary Examiner* — Ryan Bertram
*Assistant Examiner* — Edmund H Kwong
(74) *Attorney, Agent, or Firm* — Pearl Cohen Zedek Latzer Baratz LLP

(57) ABSTRACT

A method for accessing a storage system, the method may include receiving a block call, from a processor that executes an application and by a storage engine of a computer that is coupled to a storage system; generating, by the storage engine and based on the block call, a key value call; and sending the key value call to a key value frontend of the storage system.

19 Claims, 28 Drawing Sheets

(56) References Cited

U.S. PATENT DOCUMENTS

| | | |
|---|---|---|
| 2001/0037458 A1 | 11/2001 | Kean |
| 2003/0191876 A1 | 10/2003 | Fallon |
| 2003/1021720 | 11/2003 | Poo |
| 2005/0104753 A1 | 5/2005 | Dror |
| 2007/0073941 A1 | 3/2007 | Brink |
| 2007/0288765 A1 | 12/2007 | Kean |
| 2008/0109903 A1 | 5/2008 | Werner |
| 2010/0027419 A1 | 2/2010 | Padhye |
| 2010/0174968 A1 | 7/2010 | Charles |
| 2011/0296088 A1 | 12/2011 | Duzly |
| 2012/0060072 A1 | 3/2012 | Simitci |
| 2012/0166689 A1 | 6/2012 | Lee |
| 2012/0250495 A1 | 10/2012 | Park |
| 2013/0013864 A1 | 1/2013 | Chung |
| 2013/0145059 A1 | 6/2013 | Lu |
| 2013/0250686 A1* | 9/2013 | Marukame ............ G06F 3/0679 365/185.12 |
| 2014/0310494 A1 | 10/2014 | Higgins |
| 2014/0337560 A1 | 11/2014 | Chun et al. |
| 2014/0365707 A1 | 12/2014 | Talagala |
| 2014/1036570 | 12/2014 | Iwata |
| 2015/0032921 A1 | 1/2015 | Malkin |
| 2015/0100860 A1 | 4/2015 | Lee |
| 2015/0193360 A1 | 7/2015 | Lu et al. |
| 2016/0231948 A1* | 8/2016 | Gupta ................... G06F 3/0653 |
| 2016/0275094 A1 | 9/2016 | Lipcon |
| 2017/0139839 A1 | 5/2017 | Ke |
| 2017/0332234 A1 | 11/2017 | Lunardhi |
| 2017/1033044 | 11/2017 | Lunardhi |
| 2018/0129770 A1 | 5/2018 | Tamir |
| 2018/0150255 A1 | 5/2018 | Woo |

OTHER PUBLICATIONS

U.S. Office Action of U.S. Appl. No. 15/857,767 dated Jan. 7, 2020.

Mei, F., Cao, Q., Jiang, H., Tian, L., "LSM-tree Managed Storage for Large-Scale Key-Value Store", Proceedings of the 2017 Symposium on Cloud Computing, Sep. 2017, pp. 142-156.

Tanaka, S., Kozyrakis, C., "High Performance Hardware-Accelerated Flash Key-Value Store", CSL, Stanford University, 2014.

U.S. Final Office Action of U.S. Appl. No. 15/857,767 dated Apr. 28, 2020.

Lim, et al., "Reducing False Positives of a Bloom Filter using Cross-Checking Bloom Filters", AMIC 8:4, 2014, pp. 1865-1877.

Dharam, "Hash in detail—Part Three", Techieme.in, 2013.

U.S. Office Action of U.S. Appl. No. 15/857,761 dated May 20, 2019.

U.S. Office Action of U.S. Appl. No. 15/857,756 dated Oct. 12, 2018.

U.S. Final Office Action of U.S. Appl. No. 15/857,756 dated Feb. 19, 2020.

U.S. Office Action of U.S. Appl. No. 15/857,756 dated Feb. 15, 2019.

U.S. Office Action of U.S. Appl. No. 15/857,756 dated Jul. 31, 2019.

Office Action of U.S. Appl. No. 15/857,769 dated Aug. 27, 2020.

\* cited by examiner

Managing, by wherein an in-line hardware accelerator of the storage system, access to a solid state drive (SSD) unit of the storage system; wherein the storage system may include an accelerator memory module that is coupled to the in-line hardware accelerator or belongs to the in-line hardware accelerator 710

Retrieving, by the in-line accelerator, data stored in a volatile memory module of the storage system and a non-volatile memory module of the storage system without involving a central processing unit (CPU) of the storage system; wherein the in-line hardware accelerator is directly coupled to the SSD unit, the volatile memory and the non-volatile memory; wherein the CPU is directly coupled to the volatile memory and to the non-volatile memory 720

Controlling various components of the storage system by the controller 730

Executing by the in-line hardware accelerator acceleration processes using at least one acceleration engines of the in-line hardware accelerator; wherein the accelerator engines may include at least one out of a compression engine, a decompression engine, an encryption engine, a decryption engine, a compaction engine, a de-duplication engine, a data movement engine, a replication engine, a peer-to-peer engine, a scatter-gather engine, a virtual MMU engine, or an erasure coding engine 1240

Accessing the accelerator memory module by the in line hardware accelerator. 1250

STORAGE SYSTEM AND A METHOD FOR APPLICATION AWARE PROCESSING

CROSS REFERENCE TO RELATED APPLICATIONS

This application claims priority from U.S. provisional patent Ser. No. 62/445,743 filing date Jan. 13, 2017, U.S. provisional patent Ser. No. 62/445,741 filing date Jan. 13, 2017; U.S. provisional patent Ser. No. 62/467,250 filing date Mar. 6, 2017; U.S. provisional patent Ser. No. 62/471,968 filing date Mar. 16, 2017; and U.S. provisional patent Ser. No. 62/488,772 filing date Apr. 23, 2017, all being incorporated herein by reference.

BACKGROUND

There is a growing need to store data in an efficient manner.

SUMMARY

There may be provided a storage system may include an in-line hardware accelerator, a solid-state drive (SSD) unit, a central processing unit (CPU), a volatile memory module, and an accelerator memory module that may be coupled to the in-line hardware accelerator or belongs to the in-line hardware accelerator. The in-line hardware accelerator may be directly coupled to the SSD unit, the volatile memory and the non-volatile memory. The CPU may be directly coupled to the volatile memory and to the non-volatile memory. The in-line hardware accelerator may be configured to manage access to the SSD unit. The in-line accelerator may be configured to retrieve data stored in the volatile memory module and the non-volatile memory module without involving the CPU.

The storage system may include multiple CPUs, multiple in-line hardware accelerators and a controller that may be configured to allocate tasks to the multiple CPUs and to the multiple in-line hardware accelerators.

The storage system may include a communication network that may be coupled to the CPU, the in-line hardware accelerator, the volatile memory module and to a non-volatile memory module of the storage system; wherein only the CPU and the in-line hardware accelerator may be configured to actively initiate data transfer over the communication network.

The communication network may be a peripheral component interconnect express (PCIe) root complex and wherein the in-line hardware accelerator may be coupled to the PCIe root complex via a PCI switch.

The in-line hardware accelerator may include at least one acceleration engines out of a compression engine, a decompression engine, an encryption engine, a decryption engine, a compaction engine, a de-duplication engine, a data movement engine, a replication engine, a peer-to-peer engine, a scatter-gather engine, a virtual MMU engine, or an erasure coding engine.

The storage system may include a controller that may be configured to instruct the in-line hardware accelerator to (i) perform only SSD unit related operations on one or more data units retrieved by the in-line hardware accelerator, or to (ii) perform, on the one or more data units retrieved by the in-line hardware accelerator, SSD unit related operations in addition to an additional processing operation selected out of encryption and compression.

The one or more data units may be associated with a certain application, and wherein the controller may be configured to determine whether to instruct the in-line hardware accelerator to perform (i) or (ii) based on an identity of the certain application.

The one or more data units may be associated with a certain application, and wherein the controller may be configured to determine whether to instruct the in-line hardware accelerator to perform (i) or (ii) based on an outcome of at least one previous attempt to compress or encrypt data units related to the certain application.

The one or more data units may be associated with a certain application, and wherein the controller may be configured to determine whether to instruct the in-line hardware accelerator to perform (i) or (ii) based on a priority of the certain application.

The controller may be configured to determine whether to instruct the in-line hardware accelerator to perform (i) or (ii) based on a fullness of at least one of the volatile memory and the non-volatile memory.

The accelerator memory module may include (a) a first area for storing data fetched by the in-line hardware accelerator, (b) a second area for storing data that was compressed or encrypted by the in-lime hardware accelerator, and (c) a third area for storing data that undergone SSD unit related operations.

The in-line hardware accelerator may be configured to perform at least one out of replication, erasure coding, compression, encryption, compaction, and de-duplication.

The in-line hardware accelerator may be configured to retrieve data from the accelerator memory, compressing or encrypting the data to provide processed data, perform SSD unit processing on the processed data to provide SSD storage ready data and writing the SSD storage ready data to the SSD unit.

The in-line hardware accelerator may be configured to retrieve data from the accelerator memory, perform SSD unit processing on the data to provide SSD storage ready data and writing the SSD storage ready data to the SSD unit.

The in-line hardware accelerator may include a field programmable gate array (FPGA).

The FPGA may include multiple user programmed FPGA logic that may be programmed by different users. Any FPGA logic and the monitor includes multiple logic gates (hardware) that are programmed to perform one or more certain function.

There may be provided a method for managing a storage system, the method may include: (i) managing, by wherein an in-line hardware accelerator of the storage system, access to a solid-state drive (SSD) unit of the storage system. The storage system may include an accelerator memory module that may be coupled to the in-line hardware accelerator or belongs to the in-line hardware accelerator; and (ii) retrieving, by the in-line accelerator, data stored in a volatile memory module of the storage system and a non-volatile memory module of the storage system without involving a central processing unit (CPU) of the storage system. The in-line hardware accelerator may be directly coupled to the SSD unit, the volatile memory and the non-volatile memory. The CPU may be directly coupled to the volatile memory and to the non-volatile memory.

The storage system may include multiple CPUs, multiple in-line hardware accelerators and a controller. The method may include allocating, by the controller, tasks to the multiple CPUs and to the multiple in-line hardware accelerators.

The storage system may include may include a communication network that may be coupled to the CPU, the in-line hardware accelerator, the volatile memory module and to a non-volatile memory module of the storage system. The method may include actively initiating, only the CPU and the in-line hardware accelerator, data transfer over the communication network.

The communication network may be a peripheral component interconnect express (PCIe) root complex and wherein the in-line hardware accelerator may be coupled to the PCIe root complex via a PCI switch.

The method may include executing by the in-line hardware accelerator acceleration processes using at least one acceleration engines of the in-line hardware accelerator, wherein the accelerator engines may include at least one out of a compression engine, a decompression engine, an encryption engine, a decryption engine, a compaction engine, a de-duplication engine, a data movement engine, a replication engine, a peer-to-peer engine, a scatter-gather engine, a virtual MMU engine, or an erasure coding engine.

The storage system may include a controller, wherein the method may include instructing the in-line hardware accelerator, by the controller, to (i) perform only SSD unit related operations on one or more data units retrieved by the in-line hardware accelerator, or to (ii) perform, on the one or more data units retrieved by the in-line hardware accelerator, SSD unit related operations in addition to an additional processing operation selected out of encryption and compression.

The one or more data units may be associated with a certain application, and wherein the method may include determining, by the controller, whether to instruct the in-line hardware accelerator to perform (i) or (ii) based on an identity of the certain application.

The one or more data units may be associated with a certain application, and wherein the method may include determining, by the controller, whether to instruct the in-line hardware accelerator to perform (i) or (ii) based on an outcome of at least one previous attempt to compress or encrypt data units related to the certain application.

The one or more data units may be associated with a certain application, and wherein the method may include determining, by the controller, whether to instruct the in-line hardware accelerator to perform (i) or (ii) based on a priority of the certain application.

The method may include determining, by the controller, whether to instruct the in-line hardware accelerator to perform (i) or (ii) based on a fullness of at least one of the volatile memory and the non-volatile memory.

The accelerator memory module may include (a) a first area for storing data fetched by the in-line hardware accelerator, (b) a second area for storing data that was compressed or encrypted by the in-lime hardware accelerator, and (c) a third area for storing data that undergone SSD unit related operations.

The method may include performing, by the in-line hardware accelerator at least one out of replication, erasure coding, compression, encryption, compaction, and de-duplication.

The method may include retrieving, by the in-line hardware accelerator, data from the accelerator memory, compressing or encrypting the data to provide processed data, performing SSD unit processing on the processed data to provide SSD storage ready data and writing the SSD storage ready data to the SSD unit.

The method may include retrieving, by the in-line hardware accelerator, data from the accelerator memory, performing SSD unit processing on the data to provide SSD storage ready data and writing the SSD storage ready data to the SSD unit.

The in-line hardware accelerator may include a field programmable gate array (FPGA).

The FPGA may include multiple user programmed FPGA logic that may be programmed by different users.

A field programmable gate array (FPGA), may include a trusted FPGA logic, an untrusted FPGA logic and a monitor. The monitor may be configured to monitor the untrusted FPGA logic and prevent the untrusted FPGA logic from violating predefined constrains imposed on an operation of the untrusted FPGA logic. The predefined constraints may be stored in a memory region of the FPGA that may be not accessible to the untrusted FPGA logic.

The monitor may perform the monitoring by any known method. For example—some of the signals that are outputted and/or inputted by a FPGA logic may be sampled, probed, pass through or otherwise be accessible to the monitor. The prevention of violations may include rejecting a request of the FPGA logic, masking a request of the FPGA logic, deactivating the FPGA logic, powering down the FPGA logic. This is especially true when requests of the FPGA logic should pass through and monitor or otherwise require an approval of the monitor in order to be fulfilled or even sent to their target.

The monitor may be configured to enforce predefined access constraints.

The predefined access constraints may be related to circuits or data located outside the FPGA.

The monitor may be configured to enforce predefined constrains that prevent the untrusted FPGA logic from interfering with an operation of the trusted FPGA logic.

The FPGA wherein the monitor may be configured to enforce predefined constrains that define an allocation of FPGA resources between the trusted FPGA logic and the untrusted FPGA logic.

The monitor may be configured to enforce predefined constraints that define power consumption of the untrusted FPGA logic.

The FPGA may include additional untrusted FPGA logics, wherein the monitor may be configured to monitor each one of the the trusted FPGA logic and prevent the untrusted FPGA logic from violating predefined constrains imposed on an operation of the untrusted FPGA logic. The predefined constraints may be stored in a memory region of the FPGA that may be not accessible to the untrusted FPGA logic.

The untrusted FPGA logic may be programmed using a user interface accessible to a user.

There may be provided a field programmable gate array (FPGA), may include multiple FPGA logics, wherein different FPGA logics of the multiple FPGA logics may be programmed by different users.

The FPGA may include a monitor that may be configured to prevent the multiple FPGA logics to violate predefined constraints imposed on an operation of the multiple FPGA logics. The predefined constraints may be stored in an area of the FPGA that may be non-accessible to the multiple FPGA logics.

There may be provided a method for operating a field programmable gate array (FPGA), the method may include: monitoring, by a monitor of the FPGA, an untrusted FPGA logic of the FPGA; and preventing, by the monitor, the untrusted FPGA logic from violating predefined constrains imposed on an operation of the untrusted FPGA logic; wherein the predefined constraints may be stored in a memory region of the FPGA that may be not accessible to the untrusted FPGA logic; and wherein the FPGA further may include a trusted FPGA logic.

The method may include enforcing, by the monitor, predefined access constraints.

The predefined access constraints may be related to circuits or data located outside the FPGA.

The method may include enforcing, by the monitor, predefined constrains that prevent the untrusted FPGA logic from interfering with an operation of the trusted FPGA logic.

The method may include enforcing, by the monitor, predefined constrains that define an allocation of FPGA resources between the trusted FPGA logic and the untrusted FPGA logic.

The method may include enforcing, by the monitor, predefined constrains that define power consumption of the untrusted FPGA logic.

The FPGA may include additional untrusted FPGA logics, wherein the method may include monitoring, by the monitor, the untrusted FPGA logic and the additional untrusted FPGA; and preventing the untrusted FPGA logic from violating predefined constrains imposed on an operation of the untrusted FPGA logic. The predefined constraints may be stored in a memory region of the FPGA that may be not accessible to the untrusted FPGA logic.

The untrusted FPGA logic may be programmed using a user interface accessible to a user.

There may be provided a method for monitoring a field programmable gate array (FPGA), wherein the method may include preventing, by a monitor of the FPGA, multiple FPGA logics that may be programmed by different users to violate predefined constraints imposed on an operation of the multiple FPGA logics. The predefined constraints may be stored in an area of the FPGA that may be non-accessible to the multiple FPGA logics.

There may be provided a non-transitory computer readable medium that may store instructions that once executed by a monitor of a field programmable gate array (FPGA) causes the monitor to execute the steps of: monitoring an untrusted FPGA logic of the FPGA; and preventing the untrusted FPGA logic from violating predefined constrains imposed on an operation of the untrusted FPGA logic; wherein the predefined constraints may be stored in a memory region of the FPGA that may be not accessible to the untrusted FPGA logic; and wherein the FPGA further may include a trusted FPGA logic The non-transitory computer readable medium may store instructions for enforcing predefined access constraints.

The predefined access constraints may be related to circuits or data located outside the FPGA.

The non-transitory computer readable medium may store instructions for enforcing predefined constrains that prevent the untrusted FPGA logic from interfering with an operation of the trusted FPGA logic.

The non-transitory computer readable medium may store instructions for enforcing predefined constrains that define an allocation of FPGA resources between the trusted FPGA logic and the untrusted FPGA logic.

The non-transitory computer readable medium may store instructions for enforcing predefined constrains that define power consumption of the untrusted FPGA logic.

The FPGA may include additional untrusted FPGA logics, wherein the non-transitory computer readable medium stores instructions for monitoring the untrusted FPGA logic and the additional untrusted FPGA; and preventing the untrusted FPGA logic from violating predefined constrains imposed on an operation of the untrusted FPGA logic. The predefined constraints may be stored in a memory region of the FPGA that may be not accessible to the untrusted FPGA logic.

The untrusted FPGA logic may be programmed using a user interface accessible to a user.

There may be provided a non-transitory computer readable medium that may store instructions that once executed by a monitor of a field programmable gate array (FPGA) causes the monitor to execute the steps of: preventing multiple FPGA logics that may be programmed by different users to violate predefined constraints imposed on an operation of the multiple FPGA logics. The predefined constraints may be stored in an area of the FPGA that may be non-accessible to the multiple FPGA logics.

There may be provided a method for accessing a storage system, the method may include receiving a block call, from a processor that executes an application and by a storage engine of a computer that may be coupled to a storage system; generating, by the storage engine and based on the block call, a key value call; and sending the key value call to a key value frontend of the storage system.

The generating may include generating storage processing hints that may be included in the key value call.

The storage processing hints may be indicative of a priority of the key value call.

The storage processing hints may be indicative of whether to respond to the key value call by executing a background process.

The storage processing hints may be application-level semantic hints.

The method may include sending the block call to a block frontend of the storage system.

The method may include sending, in parallel, the block call, and the key value call.

The method may include determining whether to convert the block call to the key value call based on a state of the storage system.

The state of the storage system may include a load imposed on the key value frontend of the storage system and on a block frontend of the storage system.

The generating of the key value call may include converting the block call to the key value call.

The block call may be associated with application data; and wherein the key value call may be related to application metadata.

The method may include treating in a different manner block calls and key value calls.

The method may include associating different levels of service to block calls and to the key value calls.

There may be provided a non-transitory computer readable medium that may store instructions that once executed by a computer causes the computer to execute the steps of: receiving a block call, from a processor that executes an application and by a storage engine of a computer that may be coupled to a storage system; generating, by the storage engine and based on the block call, a key value call; and sending the key value call to a key value frontend of the storage system.

The non-transitory computer readable medium wherein the generating may include generating storage processing hints that may be included in the key value call.

The non-transitory computer readable medium wherein the storage processing hints may be indicative of a priority of the key value call.

The non-transitory computer readable medium wherein the storage processing hints may be indicative of whether to respond to the key value call by executing a background process. The non-transitory computer readable medium wherein the storage processing hints may be application-level semantic hints.

The non-transitory computer readable medium that may store instructions for sending the block call to a block frontend of the storage system.

The non-transitory computer readable medium that may store instructions for sending, in parallel, the block call, and the key value call.

The non-transitory computer readable medium that may store instructions for determining whether to convert the block call to the key value call based on a state of the storage system.

The non-transitory computer readable medium wherein the state of the storage system may include a load imposed on the key value frontend of the storage system and on a block frontend of the storage system.

The non-transitory computer readable medium wherein the generating of the key value call includes converting the block call to the key value call.

The non-transitory computer readable medium wherein block call may be associated with application data; and wherein the key value call may be related to application metadata.

The non-transitory computer readable medium that may store instructions for treating in a different manner block calls and key value calls.

The non-transitory computer readable medium that may store instructions for associating different levels of service to block calls and to the key value calls.

There may be provide a computer that may include multiple circuits that may include a processor, wherein the multiple circuits may be configured to execute the steps of receiving a block call, from the processor when the processor executes an application and by a storage engine of a computer that may be coupled to a storage system; generating, by the storage engine and based on the block call, a key value call; and sending the key value call to a key value frontend of the storage system.

There may be provided a method for operating a storage system, the method may include: receiving, by a storage system, a call selected out of a block call, and a key value call; associating different levels of service to the block call and to the key value call; and responding, by the storage system to the block call and to the key value call, based on the different levels of service.

The block call may be associated with application data, and the key value call may be related to application metadata.

The associating different levels of service may be responsive to application-level semantic hints included in at least one of the block call and the key value call.

The method may include inferring whether a call may be a block call or a key value call.

The inferring may be responsive to previous calls received by the storage system.

There may be provided a non-transitory computer readable medium that may store instructions that once executed by a storage system causes the storage system to execute the steps of: receiving a call selected out of a block call, and a key value call; associating different levels of service to the block call and to the key value call; and responding to the block call and to the key value call, based on the different levels of service.

The block call may be associated with application data, and the key value call may be related to application metadata.

The associating different levels of service may be responsive to application-level semantic hints included in at least one of the block call and the key value call.

The non-transitory computer readable medium may store instructions for inferring whether a call may be a block call or a key value call.

The inferring may be responsive to previous calls received by the storage system.

There may be provided a method for storing metadata in a solid-state drive (SSD) unit of a storage system, the method may include: storing updated metadata units in hash buckets. The updated metadata units may be indicative of a location of data within the SSD unit; storing in the SSD unit multiple snapshots of the hash buckets. The multiple snapshots were obtained at different points in time; merging the multiple points in time snapshots of the hash buckets to provide one or more merged files, wherein the merging may include replacing one or more older versions of a metadata unit by a latest version of the metadata unit.

The one or more merged file form a hierarchical structure of merged files.

The merging may include performing a log structured merge operation.

The merging may be executed by an in-line accelerator of the storage unit.

Each hash bucket may be associated with a hash value that may be calculated by applying a hash function on a part of an identifier of an updated metadata unit.

The method may include performing re-hashing when a hash bucket associated with a certain hash value may be full.]The method may include initiating a storage of a snapshot of the hash buckets based on a fullness level of at least one of the hash buckets.

The method may include virtually segmenting a metadata file to multiple smaller metadata files and associating different groups of hash buckets to different smaller metadata files.

The method may include storing the updated metadata units in a non-volatile memory module of the storage system, the non-volatile memory module differs from the SSD unit.

The method may include generating a Bloom filter for each group of hash buckets.

There may be provided a non-transitory computer readable medium may store instructions for storing instructions for once executed by a storage system cause the storage system to execute the steps: storing updated metadata units in hash buckets. The updated metadata units may be indicative of a location of data within a solid-state drive (SSD) unit of the storage system; storing in the SSD unit multiple snapshots of the hash buckets. The multiple snapshots were obtained at different points in time; merging the multiple points in time snapshots of the hash buckets to provide one or more merged files, wherein the merging may include replacing one or more older versions of a metadata unit by a latest version of the metadata unit.

The one or more merged file form a hierarchical structure of merged files.

The merging may include performing a log structured merge operation.

The merging may be executed by an in-line accelerator of the storage unit.

Each hash bucket may be associated with a hash value that may be calculated by applying a hash function on a part of an identifier of an updated metadata unit.

The non-transitory computer readable medium may store instructions for performing re-hashing when a hash bucket associated with a certain hash value may be full.

]The non-transitory computer readable medium may store instructions for initiating a storage of a snapshot of the hash buckets based on a fullness level of at least one of the hash buckets.

The non-transitory computer readable medium may store instructions for virtually segmenting a metadata file to multiple smaller metadata files and associating different groups of hash buckets to different smaller metadata files.

The non-transitory computer readable medium may store instructions for storing the updated metadata units in a non-volatile memory module of the storage system, the non-volatile memory module differs from the SSD unit.

The non-transitory computer readable medium may store instructions for generating a Bloom filter for each group of hash buckets.

There may be provided a storage system that may include a solid-state drive (SSD) unit, and at least one circuit. The at least one circuit may be configured to store updated metadata units in hash buckets. The updated metadata units may be indicative of a location of data within the SSD unit; store in the SSD unit multiple snapshots of the hash buckets. The multiple snapshots were obtained at different points in time; merge the multiple points in time snapshots of the hash buckets to provide one or more merged files, wherein the merging may include replacing one or more older versions of a metadata unit by a latest version of the metadata unit.

The one or more merged file form a hierarchical structure of merged files.

The merging may include performing a log structured merge operation.

The at least one circuit may include an in-line accelerator that may be configured to execute the merging.

Each hash bucket may be associated with a hash value that may be calculated by applying a hash function on a part of an identifier of an updated metadata unit.

The at least one circuit may be configured to perform re-hashing when a hash bucket associated with a certain hash value may be full.

The at least one circuit may be configured to initiate a storage of a snapshot of the hash buckets based on a fullness level of at least one of the hash buckets.

The at least one circuit may be configured to virtually segment a metadata file to multiple smaller metadata files and associating different groups of hash buckets to different smaller metadata files.

The at least one circuit may be configured to store the updated metadata units in a non-volatile memory module of the storage system, the non-volatile memory module differs from the SSD unit.

The at least one circuit may be configured to generate a Bloom filter for each group of hash buckets.

There may be provided a method for memory management, the method may include: receiving by a storage system and from a network interface controller, multiple write requests that may include multiple segments of a data unit, wherein the data unit may be associated with a range of virtual addresses that starts with a page-aligned virtual address; translating the multiple write requests to sub-page granularity write requests; wherein each sub-page granularity write request may be associated with a start address of sub-page granularity; and writing the multiple segments to a storage unit of the storage system by completing the sub-page granularity write requests The translating may include using translation rules.

The method may include selecting the translation rules based on an attribute of the multiple write requests.

The method may include selecting the translation rules based on a protocol related to the multiple write requests.

The method may include selecting the translation rules based on an expected pattern of the multiple segments.

The translation rules may map the range of virtual addresses to a multiple non-continuous physical address ranges.

The translating may include using one or more interval trees.

The receiving of the multiple write requests may be followed by storing the multiple segments in a non-volatile memory module. The method may include preventing from re-arranging the multiple segments within the non-volatile memory module.

The receiving of the multiple write requests may be followed by storing the multiple segments in a non-volatile memory module; writing the multiple segments in an accelerator memory coupled to an in-line hardware accelerator; rearranging the multiple segments and segments of other data units in the accelerator memory to provide write units; writing the multiple write-units to the storage unit. The storage unit may include a solid-state drive unit.

There may be provided a storage system, that may include: a frontend that may be configured to receive from a network interface controller, multiple write requests that may include multiple segments of a data unit, wherein the data unit may be associated with a range of virtual addresses that starts with a page-aligned virtual address; at least one circuit that may be configured to: translate the multiple write requests to sub-page granularity write requests; wherein each sub-page granularity write request may be associated with a start address of sub-page granularity; and write the multiple segments to a storage unit of the storage system by completing the sub-page granularity write requests.

The at least one circuit may be configured to translate by using translation rules.

The at least one circuit may be configured to select the translation rules based on an attribute of the multiple write requests.

The at least one circuit may be configured to select the translation rules based on a protocol related to the multiple write requests.

The at least one circuit may be configured to select the translation rules based on an expected pattern of the multiple segments.

The translation rules may map the range of virtual addresses to a multiple non-continuous physical address ranges.

The at least one circuit may be configured to use one or more interval trees.

The at least one circuit may be configured to store the multiple segments in a non-volatile memory module and to prevent from re-arranging the multiple segments within the non-volatile memory module.

The at least one circuit may be configured to store the multiple segments in a non-volatile memory module; write the multiple segments in an accelerator memory coupled to an in-line hardware accelerator; rearrange the multiple segments and segments of other data units in the accelerator memory to provide write units; and write the multiple write-units to the storage unit The storage unit may include a solid-state drive unit.

There may be provided a non-transitory computer readable medium for memory management, the non-transitory computer stores instructions that once executed by a storage system causes the storage system to execute the steps of: receiving from a network interface controller, multiple write requests that may include multiple segments of a data unit, wherein the data unit may be associated with a range of virtual addresses that starts with a page-aligned virtual address; translating the multiple write requests to sub-page granularity write requests; wherein each sub-page granularity write request may be associated with a start address of sub-page granularity; and writing the multiple segments to a storage unit of the storage system by completing the sub-page granularity write requests.

The non-transitory computer readable medium wherein the translating may include using translation rules.

The non-transitory computer readable medium that may store instructions for selecting the translation rules based on an attribute of the multiple write requests.

The non-transitory computer readable medium that may store instructions for selecting the translation rules based on a protocol related to the multiple write requests.

The non-transitory computer readable medium that may store instructions for selecting the translation rules based on an expected pattern of the multiple segments.

The non-transitory computer readable medium wherein the translation rules may map the range of virtual addresses to a multiple non-continuous physical address ranges.

The non-transitory computer readable medium wherein the translating may include using one or more interval trees.

The non-transitory computer readable medium that may store instructions for storing the multiple segments in a non-volatile memory module. The non-transitory computer readable medium may include preventing from re-arranging the multiple segments within the non-volatile memory module.

The non-transitory computer readable medium that may store instructions for storing the multiple segments in a non-volatile memory module; writing the multiple segments in an accelerator memory coupled to an in-line hardware accelerator; rearranging the multiple segments and segments of other data units in the accelerator memory to provide write units; writing the multiple write-units to the storage unit. The storage unit may include a solid-state drive unit.

Any reference to at least one circuit should refer to at least one hardware circuit. The at least one circuit can include one or more units and/or components of the storage system illustrated in the specification and/or drawings—such as an in-lime accelerator, a CPU, any processor or controller, any portion of the in-line accelerator, any portion of the CPU or any other processor or controller.

Any processor or controller illustrated in the specification and/or claims and/or drawings is a hardware processor or controller such as but not limited to a CPU, a graphic processor, a general purpose processor, a hardware accelerator, an ASIC, a FPGA, and the like.

Any combination of any steps of any method illustrated in the specification and/or claims and/drawings may be provided.

Any combination of components/units/circuits illustrated in any of the the specification and/or claims and/drawings may be provided.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 21 is an example of a method.

DETAILED DESCRIPTION OF THE DRAWINGS

Figure 1:
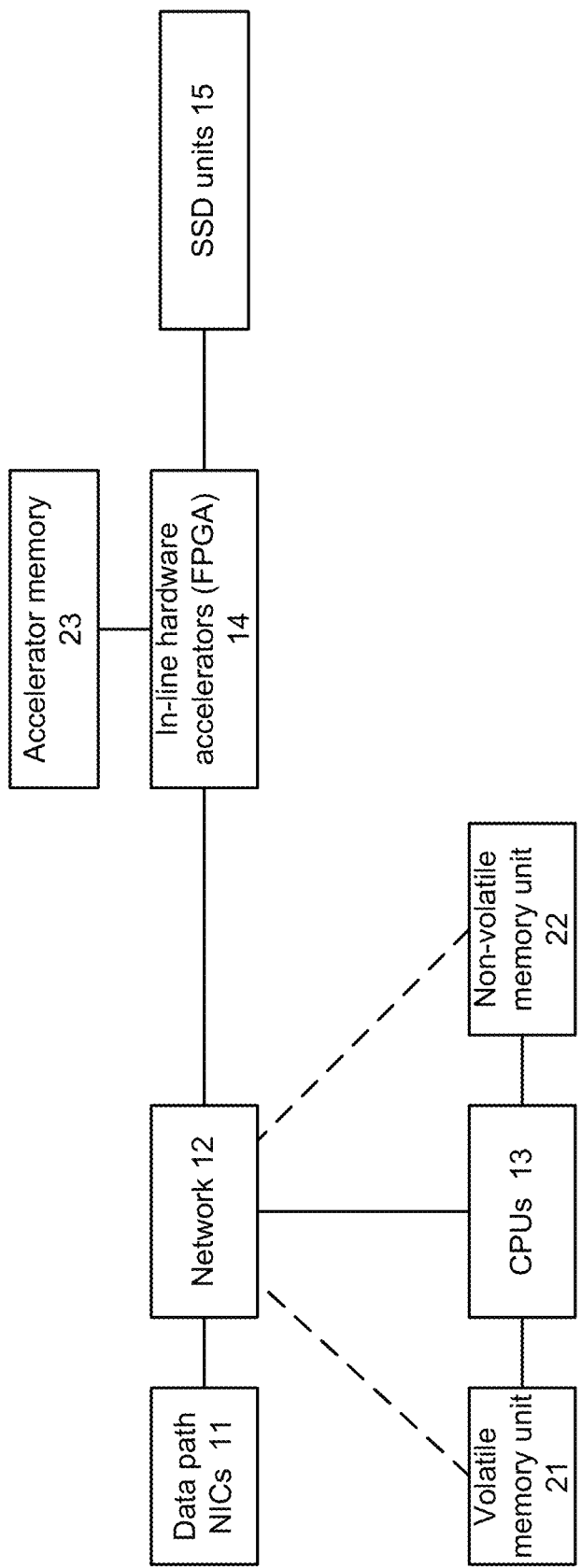
FIG. 1 illustrates an example of a storage system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

There may be provided a storage system (hereinafter—"system"). The storage system may be an open accelerated storage system for modern hyper-scale cloud service providers. The system may may be an open system, may have extensive in-memory processing capabilities and support unstructured data, with a goal to significantly accelerate native cloud applications.

The system is open in the sense that it is an open software and hardware platform with the flexibility and programmability, via well-defined interfaces, to enable customers to adapt its hardware and software to meet their unique requirements. In plain words, the system hardware and software are designed so that they can be changed easily. The system provides in-storage processing facilities via dedicated CPUs and FPGAs that implement acceleration for data services such as compression, encryption, and erasure coding.

Using the system's in-storage processing capabilities, customers can run their code both as part of the data path and as separate side applications that run on the system with full access to the user's data. We put special emphasis on making it both secure and easy to adapt the system to suit each cloud provider's specific needs.

The system open platform has various features:
a. Hardware acceleration for storage processing.
b. In-storage processing for moving computation close to the data.
c. Access to unstructured data (e.g., key/value or storage-as-memory).
d. Ultra-low write latency.
e. Software defined flash.

Referring to FIG. 1—data is exchanged with a one or more data path NICs 11 that are coupled to a network 12 such as but not limited to PCIe. The network is also coupled to one or more CPUs 13 and to one or more in-line hardware accelerators 14 (that may include one or more FPGAs). The network and the one or more CPUs are also coupled to volatile memory 21 and non-volatile memory 22. The volatile memory and non-volatile memory are passive in the sense that they may respond to a request to exchange data but do not initiate a data exchange. The in-line hardware accelerator is coupled to one or more SSD units 15 and to accelerator memory. The connection to the network and the SSD units may be via a switch such as an PCIe switch (not shown).

Due to this connectivity the in-line hardware accelerator may access all mentioned memory module (including volatile memory and non-volatile memory) without using resources of the one or more CPUs.

The storage system may have two functional parts housed in the same server: a control/compute unit, such as a server that does the heavy computational lifting running data services, and the storage unit, a collection of of dense NVMe SSDs. Initial releases of the system may use off-the-shelf of lightly-customized SSDs, while later versions are expected to co-design the SSDs and the control/compute unit.

The system achieves high-performance I/O through architectural design and a combination of state of the art software and hardware techniques.

One such technique is spatial partitioning of compute cores, where each core or set of cores are dedicated to performing specific tasks asynchronously.

Communication between cores occurs over producer/consumer shared memory queues. A subset of the system cores may run standard Linux kernel and userspace code, while another subset of the cores may run dedicated datapath processing code. Another technique is the construction of custom hardware processing units in the form the accelerator FPGA to accelerate specific datapath functions and offload compute cycles from the main CPU cores.

The system may support multiple access protocols such as but not limited to NVMe-over-Fabric block access protocol over both TCP/IP, RDMA, key/value protocols and Storage-as-Memory protocols. The protocol handling modules of the system are extensible, to enable support for new storage access protocols that cloud providers may use internally in their storage stacks.

Figure 2:
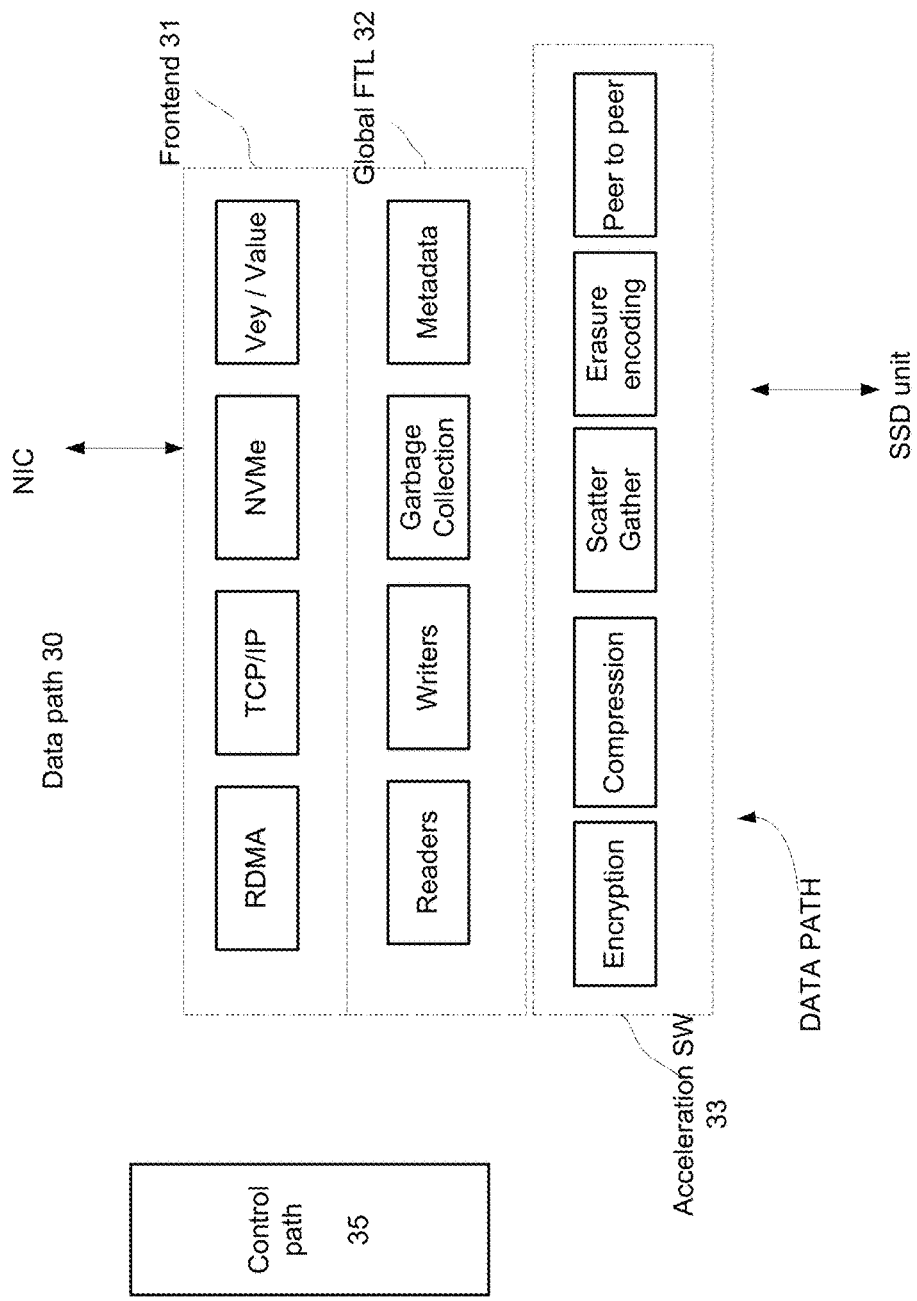
FIG. 2 illustrates a control path 35 and a data path.

FIG. 2 illustrates a control path 35 and a data path 30. The data path includes a frontend 31, a global FTL 32 and acceleration software module 33. The frontend 31 includes various modules such as RDMA module, TCP/IP module, NVMe module and key value module—for managing various communication and/or access protocols. Other protocols can be supported—and other modules may be included in the frontend.

The global FTL includes readers, writers, garbage collection and metadata modules.

The acceleration software may control various acceleration operations such as encryption, compression, gather scatter, erasure coding and peer to peer.

The system may acknowledge storage writes as soon as they hit the non-volatile memory layer inside the system, providing response latency that can be measured in microseconds. The non-volatile memory may serve as a large write back cache of user data as well as system metadata tables.

The system may aggregates and manage its internal flash storage, in the form of NVMe SSDs, in a global FTL (Flash Translation Layer). Managing flash via software can yield significant advantages in terms of performance, latency and overall system cost. One of the challenges of using SSD's is the unpredictable variability in performance that is a result of internal garbage collection and data management processes.

With the global FTL, these processes are now under the system's control and can be managed to provide more predictable and consistent performance. The system Global FTL arranges writes to the SSDs such that the SSD performance is optimal. For example, even when using low cost consumer-grade SSDs, the Global FTL can generate from the SSDs their best sequential write performance even when the clients' writes are completely random.

The system may run a Linux based operating system that may include a management and control and a data-path.

The system data processing is organized in a collection of pipelines, where data flows from one stage in the pipeline to the next, with minimal as possible copying of the data. Data is copied into the system once (or few times) when it arrives from the network and from that point on, it remains in system memory (non volatile memory) or transferred to the accelerator memory—such as accelerator FPGA's internal DDR until flushed to the storage subsystem (SSDs). Customer reads may be served from data in NVRAM or in DRAM; customer writes are always written to NVRAM first, to maintain persistence in the presence of unexpected software bugs or power loss.

Broadly speaking, each system datapath pipeline has the following stages—frontends, global FTL, in-line hardware accelerator (such as one or FPGA) and the SSD unit.

Frontends—may include one or more block frontend, e.g., serving data blocks via the NVMe-over-Fabrics protocol over network interconnects such TCP/IP or ROCEv2, and or a key/value frontend, or a memory-semantics frontend, or another kind of frontend.

The frontends (FEs) are optimized for network access and for specific protocol/application implementations. The frontends receive customer read/write requests via a block access protocol such as NVMeoF or object get/set requests via a key/value access protocol over the network. They handle the request inside the frontend if possible (e.g., if the data to be read is already cached by the frontend) and communicate with the backend if the data needs to be read from or written to storage.

The frontends may run on a set of separated CPU cores running in various modes—as as in polling mode (without interrupts), each core or set of cores serving traffic going through a subset of NIC ports.

The frontends may reduce latency. One approach for reducing latency for customer writes is the system Fast Ack. With Fast Acks, customer writes are acknowledged as soon as they hit the NVRAM inside the system, long before they are written to storage. Another technique used by the system to reduce latency is that customer metadata reads are returned from the caches the system maintains in DRAM and NVRAM whenever there is a cache hit.

Global FTL. The system Global FTL may be optimized for storage access and specifically for NVMe SSDs. It receives read/write requests from the frontends and reads from the SSDs or writes to the SSDs, as needed. Same as the frontends, it too runs on a set of CPU cores running in polling mode without interrupts. It is focused on SSD throughput. One key technique it uses to achieve high throughput is to always write data to SSDs sequentially, striping the data across all SSDs. The Global FTL includes the following functions: readers, writers, metadata, and garbage collection (GC).

FPGAs. The Global FTL uses the FPGAs to accelerate specific tasks, performing them in hardware much more efficiently than they can be performed on general purpose CPU cores. The FPGA can perform the following operations as part of the datapath pipelines: compression/decompression, encryption/decryption, protecting data via erasure codes, and optimized memory-management via scatter/gather for host CPU and storage access. (FPGAs may also perform other functions.)

In-storage processing. With the system, the customer can run her own processing on the system itself. This customer specific processing runs directly on the system. By running part of the customer's workload directly on the system, there is no network processing cost for shipping the data from the system to remote clients over the network. Furthermore, no network bandwidth is used, reducing congestion and freeing up the network for other tasks.

Each part of the datapath pipeline may work asynchronously, communicating with adjacent stages over shared-memory submission/completion queues. For each queue, there is a producer which produces commands/data/completions, and a consumer which consumes those commands/data/completions. Usually one queue is used for submission of commands and another queue is used for completions. For example, a frontend core running NVMeoTCP processing may submit a command on the submission queue to a backend reader core asking to read some data from the SSDs. The reader core will handle the command and then return a completion to the NVMeoTCP core on the completion queue. A pair of submission/completion queue is often referred to as a queue pair (QP).

Figure 3:
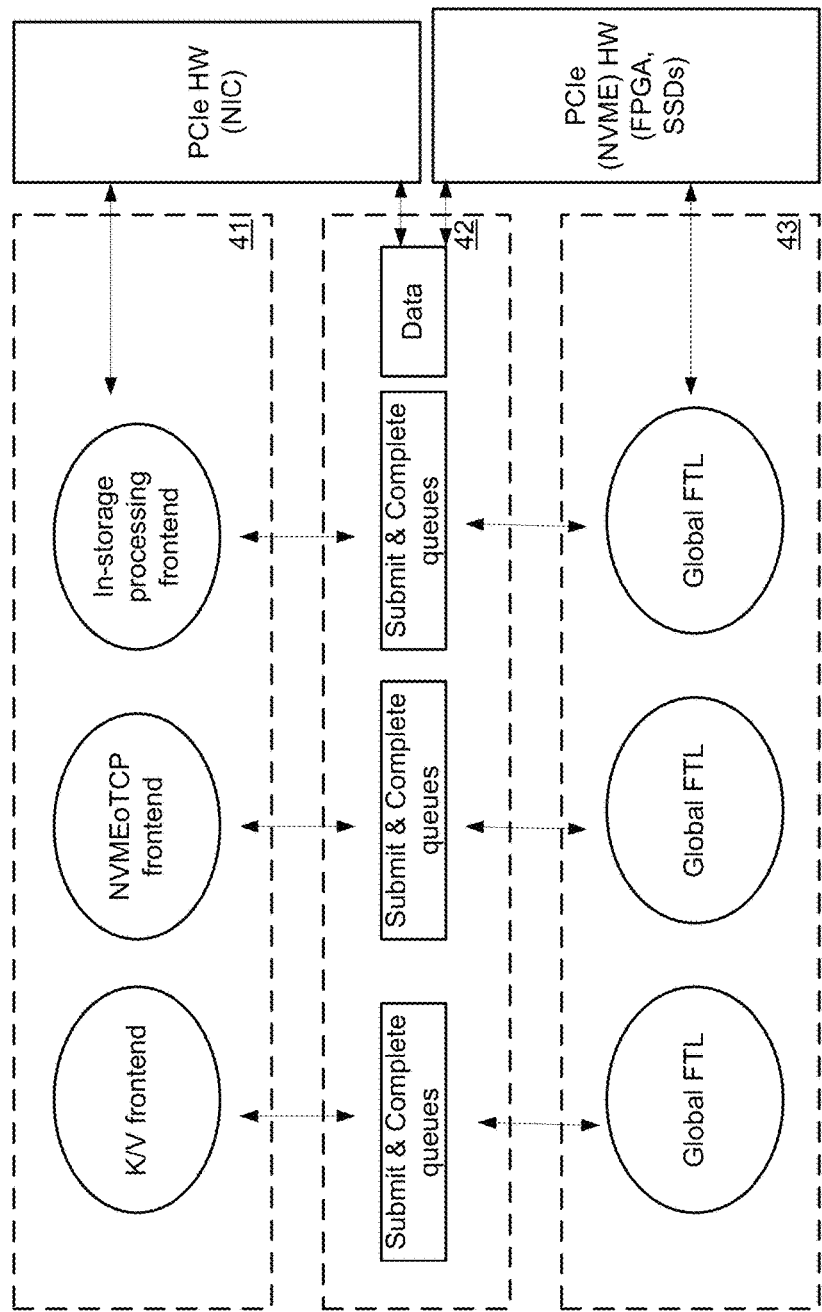
FIG. 3 illustrates a shared layer, a first layer and a second layer.

FIG. 3 illustrates a shared layer 42 as well as a first layer 41 of various frontends and a second layer 43 of global FTL—the shared layer 42 may include queues for storing commands and statuses—such as submission/completion queues. This figures also illustrated that various hardware components such as but not limited PCIe hardware such as the NIC may interact with the first layer and the shared layer 42.

FIG. 3 also illustrated that various hardware components such as but not limited PCIe hardware such as the FPGA and the SSD unit may interact with the third layer and the shared layer Communication over submission/completion queues is non-blocking, asynchronous, and has zero kernel overhead, since no kernel involvement is needed for data transfer over the queue. (The kernel is involved in queue setup and teardown, which does not happen on the fast datapath). Data is passed between cores via pointers to shared memory.

The frontend, Global FTL, and in-memory processing activity/cores are managed from the system's control and management plane, which is in charge of core allocation and execution, memory and queues allocation (RAM, NVRAM), SSDs/devices allocation, and setting and tuning various other configuration and runtime parameters.

The front-ends may be implemented in userspace as DPDK ("Data Plane Development Kit") application. The application has one or more cores dedicated to it and exclusive access to one or more network devices. It uses DPDK's device driver for those NICs to drive them directly from user-space, transmitting and receiving packets without any kernel involvement.

The front-ends may do all the TCP/IP processing in user-space, using an optimized TCP/IP stack based on the lwIP TCP/IP stack.

A given front-end core can serve one or more protocols. Different protocols listen on different IP addresses/ports and use a protocol-optimized networking stack. Running different protocols in the same CPU core and NIC enables dynamic resource balancing and sharing across protocols. However, if resource partitioning per protocol is desired, the system can be configured to run different protocols on different CPU cores. In such case CPUs and NICs used by a given protocol cannot be used by other protocol.

The NVMe-Over-Fabric Frontend

The NVMe-oVer-Fabric frontend may run as a thread on a dedicated core. This frontend can handle two transports: either RDMA (more specifically ROCEv2) or TCP/IP. The frontend thread receives NVMe admin and data command, for example to read or write blocks, from remote clients, over either RDMA or TCP/IP. It handles the transport specific operations such as packet reception and network protocol processing using RDMA and TCP/IP stacks, as appropriate, and passes the NVMe commands to a generic NVMe handler that is shared between the different NVMe-oF transports.

The frontend thread and can be thought of as a smart pipe connecting the generic NVMe handler with the Global FTL. It abstracts away the details of the Global FTL such as the specific cores the Global FTL's functionality is running on, it handles the details of the shared memory queues and it implements important functionality such as the FE write-buffer.

The FE write-buffer receives incoming write requests and writes them to non-volatile memory. As soon as a request has been written, it can be acknowledged back to the client. Thus the write-buffer implements the system Fast Ack. In due time, when the write-buffer needs to free up space for incoming blocks, it will flush the written blocks to the backend for storing. To provide the customer with the NVMe-mandated consistency semantics, reads of blocks which are currently written to the write-buffer but have not yet been flushed to storage are returned directly from the write-buffer.

As noted earlier, the FE thread receives events from the network (e.g., incoming NVMe commands). It also receives events from Global FTL cores (e.g., notification that a block has been read from or written to storage). Although the transport-specific and NVMe-specific parts of the frontend have no shared state and can run on any core in the system and on multiple cores in parallel, FE write buffer is shared between cores. This shared write buffer is used to synchronize the state of blocks that are being read/written by different cores.

NVMe Over TCP/IP

The NVMeoF specification deals with access to NVMe devices over a transport ("fabric"). The primary available implementation is that of NVMe over RDMA, which the system fully support. NVMe over TCP uses the same NVMe protocol stacks on the initiator and the target, while transferring NVMe commands and data over TCP/IP rather than RDMA. Broadly speaking, TCP/IP is a slower network protocol than RDMA and is less conductive to high performance and low-latency data transfers. But it is also ubiquitous and can be used in any data center.

Much like the block-over-RDMA frontend, the block-over-TCP frontend presents the system as an NVMeoF (NVMe over Fabrics) target, except that the communication protocol between the initiators and the system target is done over TCP/IP.

The Key/Value Frontend

Whereas the NVMeoF frontends deals in fixed sized blocks, the key/value (KV) frontend exposes variable-sized objects to remote clients.

Clients can "get" (read) a variable-sized object, "set" (write) a variable-sized object, "delete" an object, and so on. Key/value-based protocols deal in unstructured data and thus provide additional flexibility when compared with block (fixed-size) protocols. A variety of cloud applications, including Amazon S3 and Google Cloud Storage use them as the native storage access protocol, and key/value backends are becoming the default standard for NoSQL databases.

The system K/V protocol is implemented over TCP/IP, although mappings to other transports are also possible. Once a packet has been received, the KV frontend processes the transport protocol headers and then parses the K/V command. The KV frontend then passes those commands directly to the Global FTL. Much like the block front-end, the K/V front-end implements a write-buffer on top of non-volatile memory to fast-ack "set" requests.

The KV frontend may not keep metadata or translation tables mapping from objects to storage. This mapping is done by the Global FTL and is described in the Global FTL chapter.

Packet Steering from NIC to Core

Each core may serve a specific function. As such, only specific cores should handle network traffic, and different cores should handle different flows.

The operating system may use each NIC's flow steering capabilities to direct each network flow to the right core. Where the NIC provides programmable flow tables, the operating system uploads programmable flow steering rules and the NIC make flow steering decisions on its own. Where the NIC provides the capability to inform software about new flows, the operating system makes the flow steering decisions in software and updates the NIC's flow steering tables. Where the NIC provides simple flow steering (e.g., via simple 5-tuple hash or checksum), The operating system uses that. Only in the cases where the NIC does not provide any flow steering capability, the operating system dedicates a core per storage node for handling incoming network flows, adding another stage (core) to the datapath pipeline. It is expected that the system network-facing functionality will perform best when provided with NICs with programmable flow steering or where software can program the flow steering tables.

Flow Control

The front-ends implement a flow control mechanism to ensure system does not consume more requests from the network than the system is capable of handling.

The flow-control works separated for reads and writes. However, front-ends can receive over the same network connection both read and write requests, making impossible to know in advance if a request queued in the network stack is going to be a read or write. Thus, system tracks the read/write ratio of the latest request using a moving time window to estimate the read/write ratio of incoming requests.

Write-flow control works by limiting the number of write request front-end processes from the network. The limit is imposed by the speed the Global FTL garbage collection mechanism. The motivation here is that system should not write faster than the speed it manages to free space.

Read-flow controls works by limiting the number of read requests front-end processes from the network. The limit is calculated dynamically based on the latency of latest read requests (user or system internal) to ensure the front-end do not consume more read-requests than the read throughput the system can sustain.

Using the read/write ratio estimation, the write limit and the read limit the front-end knows how fast it should process request.

The system Global FTL may be optimized for storage access and specifically for NVMe SSDs. It receives read/write requests from the frontends and reads from the SSDs or writes to the SSDs, as needed. Its key responsibility is to organize the data such that the SSDs are utilized to their full capacity.

The Global FTL currently includes the following four functions: reader, writer, metadata (MD), and garbage collection (GC).

Each Global FTL thread may run from one to four of these functions, depending on how the system was configured at run time. For best performance, it is recommended that each thread will only run a single personality. Each thread runs an event loop which polls multiple queues. As can be seen in the following diagram, a reader or writer, for example, will have at least one frontend, one metadata thread, the SSDs and the FPGAs to communicate with. It might also have a GC thread communicating with it at the same time.

Figure 4:
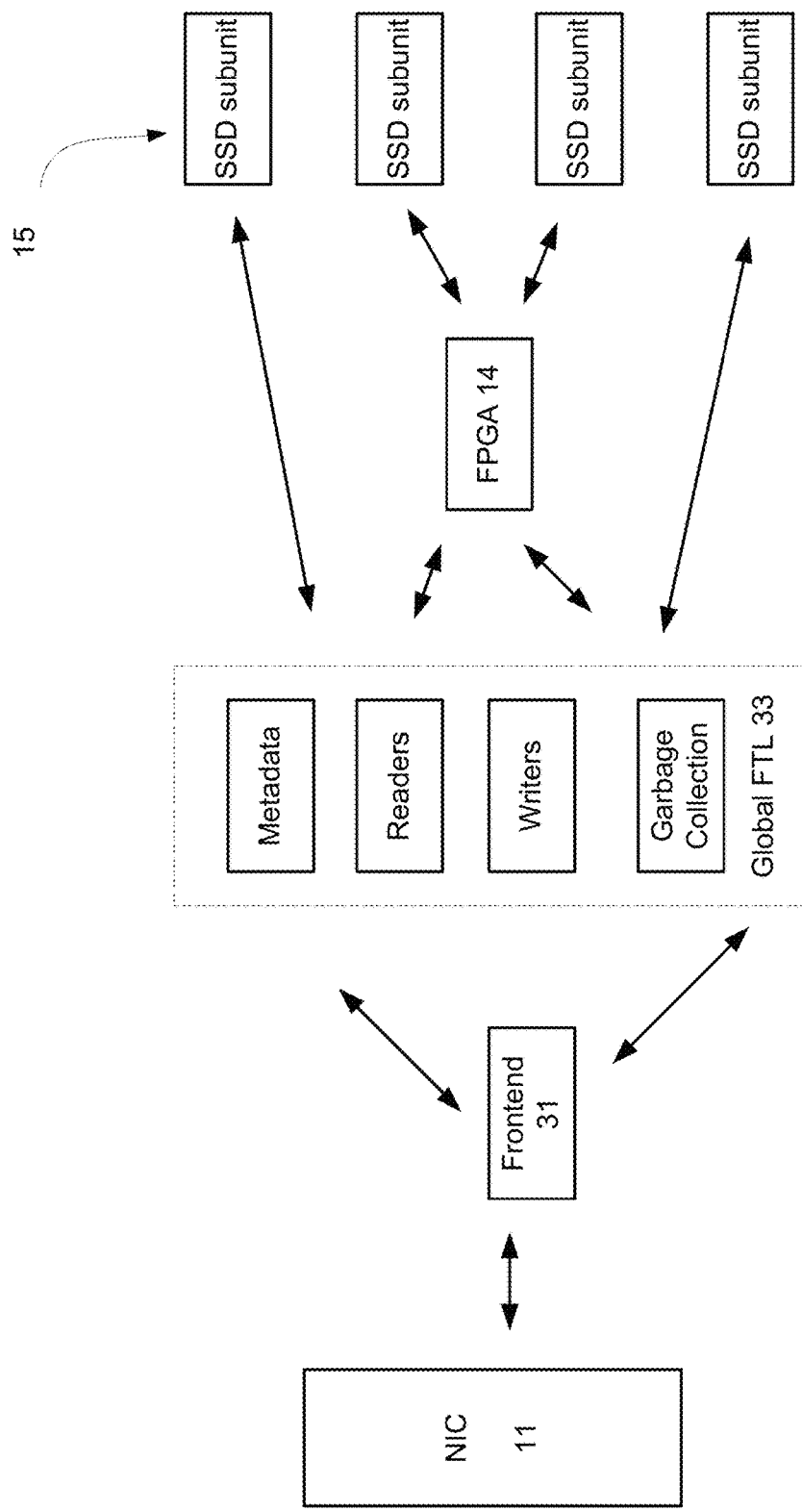
FIG. 4 illustrates an example of a storage system and of a NIC.

FIG. 4 illustrates an example of a storage system and of NIC. NIC 11 that communicates with frontend 31 that in turn communicates with global FTL 33. The global FTL 33 includes metadata modules, readers, writers and garbage collection module. Global FTL 33 may interact with one or more SSD subunits 15 directly or indirectly (via FPGA 14).

Addressing

The system deals in multiple addresses. For block protocols, the client provides block addresses in the form of NVMe namespace ID (equivalent to a traditional LUN or volume ID) and client Logical Block Address (CLBA) in that namespace. For key/value, client addresses take the form of (volume, bucket, object key) tuples. A volume is a container of multiple buckets. A bucket is a container of multiple objects.

Block or K/V data stored in the system belongs to a logical volume. Each logical volume has configuration attributes (e.g. compression enabled/disabled), size and protocol (e.g Block or K/V). Logical volumes can be created, deleted and modified using the management interface.

Any client Logical Block Address belong to a single system logical volume. In the case of block the logical volume is identified by the namespace ID. The current system version supports one bucket and one volume per NUMA node for K/V thus the K/V volume is identified by the IP address serving the K/V requests but future versions will enable multiple K/V volumes.

Internally, the system uses "Storage Virtual Addresses" (SVA) which are addresses in a single, large, contiguous address space. A client (NSID, CLBA) or (volume, object bucket/key) address is translated into a range of bytes in the SVA address space. SVA addresses are in turn converted into offset within SSD block also known as Storage Logical Block Address (SLBA). The SVA to SLBA translation is done by a bijective function and does not require any additional translation tables. Each SVA has a corresponding SLBA on a specific SSD and each SLBA on a specific SSD has a corresponding SVA.

Readers

Global FTL readers are in charge of reading data from the SSDs. They receive read requests and bring that data from the SSDs into memory. If a client request from the frontend was to read some specific blocks, the Global FTL metadata will first convert the client (NSID, CLBA) addresses or (volume, object key) tuples into SLBAs on the SSDs.

The Global FTL reader will then use the NVMe driver to read those blocks from the SSD into the FPGA memory. Once the NVMe driver signals that the blocks have been transferred into the FPGA memory, the reader will instruct the FPGA to process them (e.g. decompress) and transfer them into system memory. Once FPGA processing is done, the reader will notify the frontend that requested to read these blocks that the data is ready in system memory.

A single Global FTL reader may be used by multiple frontends simultaneously. It may also be used by metadata threads at the same time. Thus it is important for the reader to avoid starving any queues and to decide intelligently when and in which order to process each queue.

Media Write Process

The Global FTL manages the raw storage using write-units. Each write-unit represents a fixed size chunk of contiguous blocks striped across the SSDs. Blocks belonging to different SSDs which have the same LBA number are part of the same write-unit. The typical size of a write-unit is 6 MB but it may vary depending on the system configuration. Each block or object stored by Global FTL is placed in a write-unit. The write-unit holds the data of CLBAs/objects, the identifier for the data (Volume ID+CLBA in case of block or unique hash in case of K/V) and erasure-coding information to recover data in case of SSD failure.

System Global FTL uses cyclic writing mechanism for achieving best performance and optimized flash utilization. It writes to the SSDs sequentially starting from the first write-unit (first SLBAs). After reaching the last write-unit (last SLBAs), the Global FTL rolls back to the first write-unit. The system takes care of freeing write-units before they are re-used as part of the Global FTL garbage collection mechanism. This cyclic writing pattern ensures that the SSDs will not perform internal garbage collection, achieving sequential write throughput, regardless of the client write pattern (e.g. random or sequential) and regardless the internal overprovision of the SSD.

Garbage is generated when user data becomes stale. For example, when the user has written a new version of an object, all of the data stored for the old version of the object becomes stale and should be reclaimed, to avoid wasting storage space. The Global FTL writes write-units starting from the write-head and reclaim stale data starting from the GC-tail. The aggressiveness of the garbage collection mechanisms varies depending on the distance between the write-head and the GC-tail. The smaller the distance, the more aggressive GC will be. If the distance is large, GC will be idle.

Writers system uses a pipelined write path architecture to take advantage of multiple cores. The write pipe is divided in 3 stages:

Stage 1: consume write requests sent by front-ends or metadata and transfer them to the accelerator for processing.

Stage 2: consume write requests already processed by the accelerator and prepare write-units.

Stage 3: issue NVMe write requests to store write-units and notify metadata when the SSDs acknowledge the writes Typical configurations use 3 cores, one for each stage. However, more or less cores can be used depending on the system configurations and required performance.

Writers are in charge of handling frontend, metadata and garbage-collection write requests.

Unlike readers which deal with read requests to locations which are essentially random, writers work hard to collect and aggregate all write requests into write-units, writing a single write-unit at a time to the SSDs. A single write-unit will be striped across multiple SSDs. The writers aggregates all front-ends or metadata write requests into the next available write-unit, and at some point, will write the write-unit to the SSDs. Available and used write-units are managed cyclically as described later in the garbage collection section.

When writing blocks or objects to the SSDs, the writer will instruct the accelerator to fetch the data of the object or block either from system DRAM or from system NVRAM into the accelerator internal memory for processing (Stage 1).

Once the data has been processed the writer instructs the accelerator to prepare a write-unit (Stage 2). The write-unit data is stored as a continuous buffer in the accelerator internal memory and will include additional parity information if erasure coding is enabled.

Last, the writer will instruct the SSDs to read the write-unit data from accelerator internal memory (Stage 3) and write it into the right location on the SSDs. A single writer may be used by multiple frontends simultaneously. It may also be used by the Global FTL metadata and garbage collection threads at the same time. Thus it is important for the writer to avoid starving any queues and to decide intelligently when and in which order to process each queue.

Note GC threads prepare write-units directly thus they bypass Stages 1 and 2 and use only Stage 3.

Metadata

The metadata handler knows, for each piece of user data, where to find it on the SSDs. Given an (NVMe namespace, Client LBA (CLBA)) or (Volume, bucket, object key), the metadata translates that block/object identifier into an SVA. The SVA uniquely identifies a write-unit and offset in that write-unit, and the write-unit and the offset uniquely identify the participating SSDs and the blocks on those SSDs where the user or system data is stored.

Since user data may be stored in various formats (e.g., raw, compressed, encrypted) the metadata also stores for each piece of user data the format it is stored in.

The metadata handler runs as one or more threads on dedicated cores, without any shared state. Metadata entries are arranged by hash. When the system has multiple metadata handlers, each one owns a shard of the hash address space.

Metadata threads serve readers, writers, and gc threads. There are three metadata requests: query, update, and delete. "query" is used to look up the metadata entry with information of a piece of user data (e.g. its SVA and whether it is compressed or encrypted); "update" is used to update the metadata entry associated with a piece of user data (e.g. because a new version of an object has been written by the user, or because gc moved some blocks on the SSDs), and "delete" is used to mark a piece of user data as deleted.

The system's metadata must be persisted in case of sudden power failures. To that end, updated metadata entries are kept in NVRAM until they are written to disk.

As the system's overall storage capacity grows, the metadata becomes too large to hold in memory. The metadata handler can use reader and writer threads to read/write metadata from the SSDs.

Metadata handler is split in 2 roles running in separated threads:
a. Data Path Role: responsible for handling query, update and delete requests.
b. Persistence Role: responsible for flushing latest modifications kept in NVRAM into SSDs and for merging old data stored in the SSDs with newer data.

Each metadata shard has one MD data-path thread running on a dedicated CPU. MD persistence threads also run in dedicated CPUs but a single MD persistence thread can serve more than one metadata shards. A typical configuration will require 6 metadata shards (data path threads) and 2 MD persistence threads Garbage Collection (GC)

The garbage collection handler keeps utilization statistics for each write-unit, i.e., how much of each write-unit holds valid data and how much of each write-unit is stale. We call the amount of valid data held in a write-unit its occupancy.

GC checks all write-units one by one cyclically, from the first one to the last one. If the occupancy of a write-unit is high, GC skips the write unit and keep it marked as used (writers cannot write there). Otherwise, GC reads the write-unit data into the accelerator internal memory. Once GC read sufficient valid data to fill an entire write-unit, GC instructs the accelerator to prepare a new write-unit and asks the writer to store the new write-unit in the SSDs. This process leverages accelerator peer-to-peer functionality and the SSDs read the data directly from the accelerator internal memory, bypassing the system memory. After the new write-unit is written, GC marks the collected write units as free so they can be re-used in the future.

The MD is responsible for updating the GC whenever an object is deleted or overwritten. This update happens lazily to avoid adding latency to the critical write/delete paths. A "deleted" object is one which is marked in the GC metadata as deleted; after being marked as deleted, its data is still there, until the write-unit is overwritten.

Metadata Persistence

Metadata is responsible for maintaining the location of each block or object stored in system. This critical information must be persisted continuously to deal with unexpected power failures. System uses NVRAM to persist latest metadata updates without inducing additional SSD accesses in the write-path. In the read path, system uses both NVRAM and RAM to cache metadata and minimize the number of IOPs required to retrieve the data. There is at least one metadata entry for each user block or object stored in the system, thus depending on the total system capacity and its utilization, all the metadata may or may not be fit entirely in RAM.

The system may support two metadata modes depending on the system configuration:
a. Performance Mode: system has enough RAM to hold the entire metadata. NVRAM is still limited and cannot hold all metadata above certain capacity utilization. In this mode the system periodically flushes latest changes kept in NVRAM to a journal stored in the SSDs and free NVRAM space to keep future changes.
b. Capacity Mode: system does not have enough RAM to hold all metadata. In this mode the system uses Log Structured Merge (LSM) mechanism to store and retrieve metadata from the SSDs.

metadata of single block or object is much smaller than SSD block-size. Thus, NVRAM is also used to aggregate many small metadata updates into block-size write requests.

Metadata Entries and Buckets

Each block or object stored in the system has a metadata entry. The entry includes an identifier, the location of the data and a few control parameters. The identifier is unique and is composed by the volume id and the hash of the CLBA or Object Key. Keys can be large (e.g. 1 KB or more). Using a hash instead of the original key reduces the metadata entry size, improving cache efficiency and key comparison performance.

metadata entries are grouped in buckets of fixed size (1 KB in a typical configuration). Entries belonging to the same bucket have the same partial-identifier (it means that a group of bits, out the identifier, has the same value for same bucket). In case all the entries sharing same bits occupies more than bucket size, some of the objects will be remapped (sometimes it is called re-hashed) to another bucket. In order to reduce the remapping the average fill of the bucket should be Bucket-Fill-Level (typically 70%).

Journaling

Each metadata update is stored twice, in RAM and NVRAM. In the background, the system periodically flushes the latest changes kept in NVRAM buckets into a Journal in SSDs based on the NVRAM bucket utilization. The entries flushes to the SSDs are released from NVRAM to free the bucket for future writes. The copy in RAM is used as a cache to avoid additional IOPs in case the data is later read. In addition, the system periodically clean the journals by storing the latest metadata kept in RAM into the SSDs. The journal is only read in the case there was a power failure before it was cleaned.

FPGA

The accelerator may be configured to execute at least some of the following acceleration functions:

a. Scatter/gather support
b. Encryption/decryption
c. Compression/decompression
d. Erasure coding
e. Object metadata acceleration Scatter/gather acceleration support refers to the accelerator collecting small buffers of data spread around system memory into a single contiguous buffer for the SSDs to consume. Since many commodity SSDs do not support scatter/gather functionality, the accelerator acceleration can perform this operation on their behalf. The alternative is for the CPU to copy the small buffers into a single large contiguous buffer in system memory. This would waste CPU cycles and memory bandwidth that significantly reduce the overall system performance Encryption/decryption refers to encrypting data while it is being written to the SSDs and decrypting it while it is being read from the SSDs. By doing encryption/decryption on the accelerator FPGA, the system CPUs are freed to do other work.

Compression/decompression acceleration refers to compressing data while being written to SSD and decompress while being read from SSD. Data compression is a critical acceleration function as it increases the effective user capacity, increases SSD endurance and improves overall system performance.

Erasure coding is used to protect data, by storing additional information that enables the system to recover from disk failure and keep customer data safe. Erasure coding requires mathematical operations (primarily matrix multiplication) which can be done on the CPU, but it is much more efficient to do it in hardware on the FPGA as the data is being read from/written to the SSDs.

Object metadata acceleration refers to merging LSM trees and calculating the bloom filters used by the metadata layer when looking up the SLBAs where objects are stored.

The accelerator FPGA provides high speed, in-line, data path functions that operate on the data going between the CPUs and the SSDs. The data path functions can operate and change the data itself, for example compression and encryption, or can be such that just scan the data and output a result, for example doing a string search or computing a signature.

Device Driver and Accelerator Memory Spaces

The accelerator device driver runs in the Linux kernel and is the entity responsible for initializing and driving the accelerator. The driver begins by initializing the accelerator, setting up its four ports and allocating the necessary control structure. The accelerator has four ports, two "upstream" to system memory and two "downstream" to the SSDs.

The accelerator also has an internal DRAM memory space, which is split between 3 spaces: read space (for data being read from the SSD), processing space (for data being processed by the FPGA) and write space (for data being written to the SSD).

After initializing the accelerator, the driver acts as a pipe between the Global FTL and then accelerator. It runs in the context of the Global FTL and takes commands from the readers/writers, converts them into accelerator syntax, and sends them to the accelerator.

The accelerator memory spaces serve as temporary storage for data on its way from system memory to the SSDs or vice versa. They also serve as a temporary storage for peer-to-peer data transfers which bypass the system memory. While data arrives to the processing space, the data may be manipulated by the FPGA, e.g., to compress or to encrypt data that will be written to the SSDs.

The read space, processing space and the write space are handled differently by the driver and the accelerator.

Accelerator Objects and Scatter-Gather Support

Data is transferred by the driver to/from the the accelerator and processed by the accelerator in the form of accelerator objects. Accelerator objects can have different sizes, up-to 128 KB. Global FTL is responsible for splitting client K/V objects bigger than 128 KB into multiple accelerator objects (up-to 128 KB each). Each accelerator object is processed (e.g compressed/decompressed, encrypted/decrypted) independently.

Accelerator objects can be represented using scatter-gather structure. This important capability allows the Global FTL to merge an accelerator object which data is spread in non-contiguous pieces in system memory (e.g. due to Ethernet fragmentation in the receive path) into a continuous buffer in the accelerator write space. The key benefit is that the FTL software running in the CPU does not need to perform data copies in case the SSDs do not support SGLs. This capability also allows the opposite, to spread the data of an accelerator object stored in the accelerator read space to multiple non-contiguous pieces in system memory. Useful to transfer an accelerator object bigger than Ethernet MTU size without requiring additional copies in case TSO is not supported or limited.

Accelerator Write Flow

The Global FTL first requests the driver to DMA an accelerator object from system memory to the accelerator processing space and apply a given set of operations (e.g. compression, encryption).

The FPGA performs the processing in-band (while doing the DMA), stores the results in the processing space and posts a completion to the driver which is polled by the Global FTL.

The completions include the location of the object in the processing space and its size (which could have changed after it was processed).

After enough accelerator objects were accumulated in the processing space, the Global FTL requests the driver to copy a given set of accelerator objects to the write space.

The FPGA copy the requested accelerator objects to the write space. During the copy process, if requested by the driver, the FPGA calculates and stores erasure coding information than can be later used by the Global FTL to recover lost data. Erasure coding information is calculated in chunks of fixed size (typically 32 KB) and not per accelerator object. This is because the data is stored in the SSDs per write-unit and not per-object.

After each copy is completed the FPGA posts a completion to the driver.

The Global FTL polls the completions from the driver and sends requests to the SSDs to write the data directly from the accelerator write space. Once the write requests are acknowledged by the SSDs, the Global FTL and the driver re-use the processing and write space used by the already written accelerator objects for new accelerator objects.

Read Flow

The Global FTL sends read requests to the SSDs to store the data in the accelerator read space. Once the SSDs acknowledge the data was read, the Global FTL asks the driver to process and DMA the accelerator objects read by the SSDs to system memory.

The FPGA performs the processing (e.g decompressions/decryption) in-band, while DMA-ing the data from the accelerator read space to the system memory. Once the data is transferred, the FPGA posts a completion to the driver which is polled by the Global FTL.

The completions includes the size of the data after it was processed, which may be different than the side of the data in the SSDs. The read space is reused once the accelerator objects read were consumed (e.g. transferred to the client or processed by Global FTL metadata.

Peer-to-Peer Flow

Peer-to-peer accelerator capability is used by the Global FTL garbage collection mechanism to re-write data bypassing the CPU PCIe root complex and system memory.

Global FTL sends read requests to the SSDs to store accelerator objects in the accelerator read space. Such objects may belong to different write-units and may or not be valid. The Global FTL merges valid blocks/objects together in the same write-unit to reclaim free space from the SSDs. After the accelerator objects are read into the accelerator read space, the Global FTL asks the driver to copy valid objects to the accelerator write space so they can be re-written in a new location. This copy process behaves similar to the copy process described in the write flow and the SSDs read and write data from the accelerator memory spaces directly, bypassing completely the system memory.

Accelerator Commands

The accelerator exposes the following commands to the driver:

a. Read: process (e.g. decompress) and DMA from the accelerator memory read space to the system memory. This commands also includes additional parameters to reconstruct data using erasure coding information b. Write: process (e.g. compress) and DMA from system memory to accelerator memory process space c. Copy: copy from accelerator memory process space to accelerator memory write space System Level Operation Data Compression Every user CLBA or K/V object stored in system belongs to a logical volume. System compression capability can be enabled per-volume using the management interface.

When compression is enabled for a given volume, every block or K/V object belonging to that volume is compressed individually. The data arrives to the front-ends uncompressed, but during the write-flow, the global FTL instructs the accelerator to compress the accelerator object (user-data). If the accelerator object size after compression is smaller than the original size, accelerator keeps the compressed data in the processing memory address space. Otherwise accelerator keeps the original data.

When the Global FTL polls the accelerator completions, it retrieves the size of the objects after compression (if it's the same, this means the object was not compressed). The Global FTL stores in the metadata the size of the objects before and after compression. These sizes are used to maintain the storage effective utilization (after compression) and logical utilization (before compression) per volume as well as for more efficient buffer allocation in the data-path. The compressed accelerator objects stored in the accelerator memory processing address space are copied to the memory write address space and stored to the SSDs.

During the read flow, Global FTL reads the compressed data from the SSDs into the accelerator memory read address space. After the SSDs completes the read, the Global FTL requests the accelerator to decompress and DMA the accelerator objects from the accelerator memory read address space to the system memory. accelerator does the decompression in-band as part of the DMA process.

Global FTL garbage collection mechanism uses peer-to-peer capability to reclaim unused space. Data is re-written as it was stored in the SSDs without requiring any compression or decompression operation.

The accelerator is capable of doing simultaneously in-band compression of 100 Gb/s and in-band decompression of 100 Gb/s (200 Gb/s with two accelerator in a single system). Thus, write/read throughput and latency are not affected if compression is enabled.

System compression has two key benefits. The first one is increased effective capacity of the system. The second is better performance because compression can be used to improve the overprovision of the system, reduces the PCIe utilization between the accelerator and SSDs and reduces the number of IOPs against the SSDs.

Data Resiliency and Recovery

User data stored on the system is protected against sudden power failure and against single or dual SSD failures. Whenever user data is written to the system, the system stores redundant information using Erasure Coding (EC). In a 24 SSD configuration, the system is split into two groups of 12 drives. Of each 12 drives, 11 drives store regular user data and 1 drive stores redundant EC information. The EC information is calculated by the accelerator as the data is written to the SSDs. The system rotates the drive uses to store EC information for every write-unit. Thus, all drives holds both user data and EC information but for a given write-unit the drive holding the EC information always remains the same.

A system with a failed drive continues operating. The drive "fails in place". After a single drive fails, the system uses the EC information to reconstruct the missing data and return it to the user. The reconstruction is done by the accelerator as the data is being read from the SSDs. Nevertheless, reconstructing missing data requires to read data from 11 SSDs and thus system system peak performance is significantly reduced while the system is in failed drive state.

The system differentiates between block read failures and full drive failure. In the case only a block read failed, the system reconstructs the data and rewrites it to a new location. SSDs has their own internal mechanism to handle bad blocks once a read failure occurred.

After a drive was declared as failed drive, new writes are done using a 10+1 schema. Per write-unit, 10 drivers are used for data and 1 drive is used to store erasure coding information. In the background, the system reconstructs lost data re-writes existent data using 10+1 schema. Once this background process finishes, system will be able to survive other full drive failure and system peak performance will be back to normal. Nevertheless, peak performance will still be affected by the fact the system will continue working with 11 SSDs instead 12 SSDs, meaning part of the over-provisioned capacity of the system was lost and aggregated read and write throughput of the SSDs was reduced. If another drive fails, the same process will be handled but this time moving to a 9+1 schema.

Drives can be replaced after they were declared by the system as a failed drive. In this case, the system will start writing new data using the new drives. In the background, new data will be re-written using the new schema. Moving from 10+1 to 11+1, or from 9+1 to 10+1 or from 9+1 to 11+1. Last refers to the case two drives were replaced at the same time. Once the background process finishes, the system will regain lost capacity and peak performance will be improved. Driver may be replaced using any other scheme. For example—dual drive failures can be recovered. The system may start with 10+2 and go down to 9+2, 8+2, etc.

Figure 6:
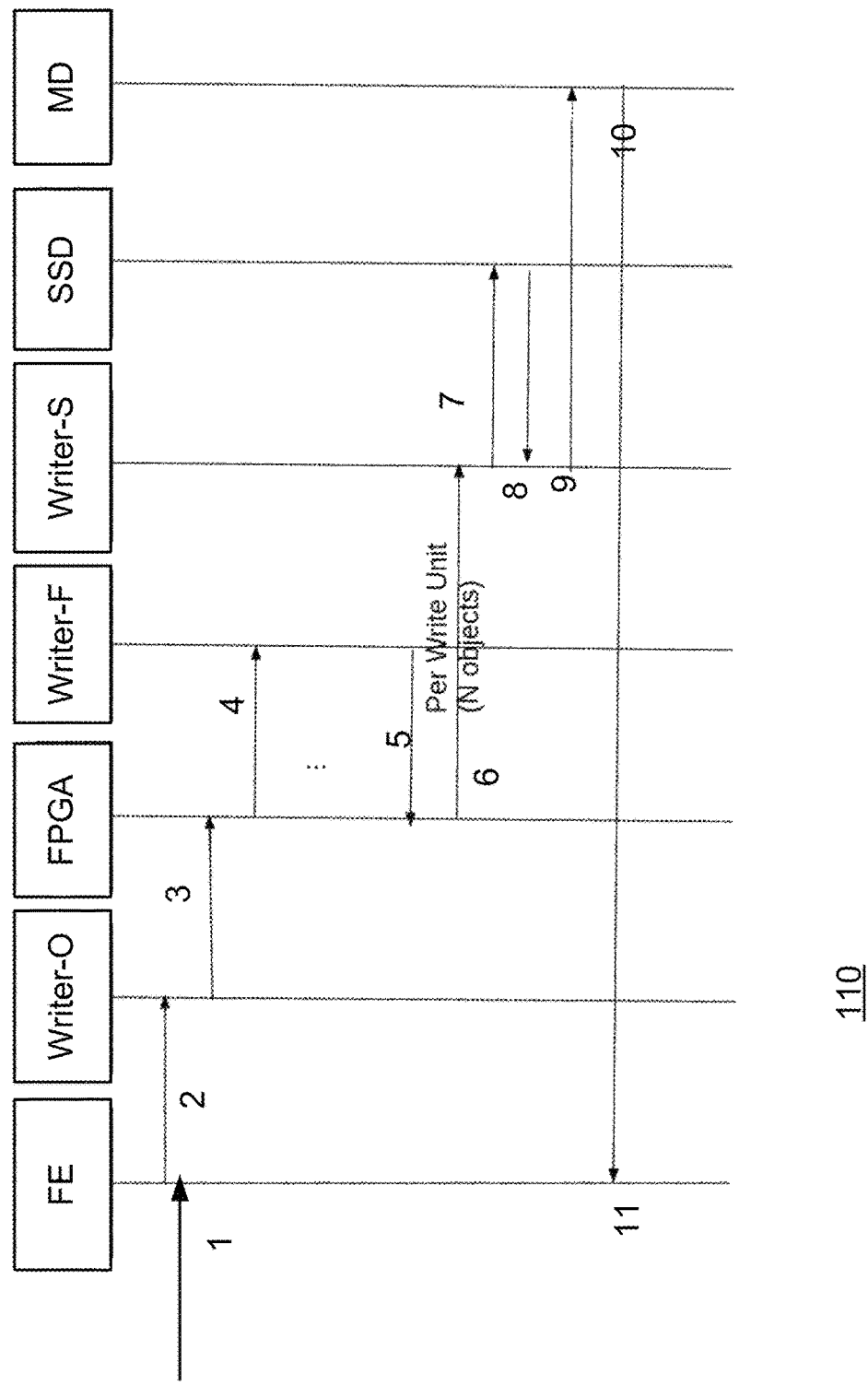
FIG. 6 illustrates an example of a write flow.

If a single drive is replaced, the system we go to X+1. If both failed drives are replaced at the same time, we go back to normal operation FIG. 6 illustrates an example of a write flow. The participants are a frontend (FE), FPGA, SSD and various elements of the global FTL—Writer-O, Writer-F, Writer-S, and MD (metadata).

Figure 7:
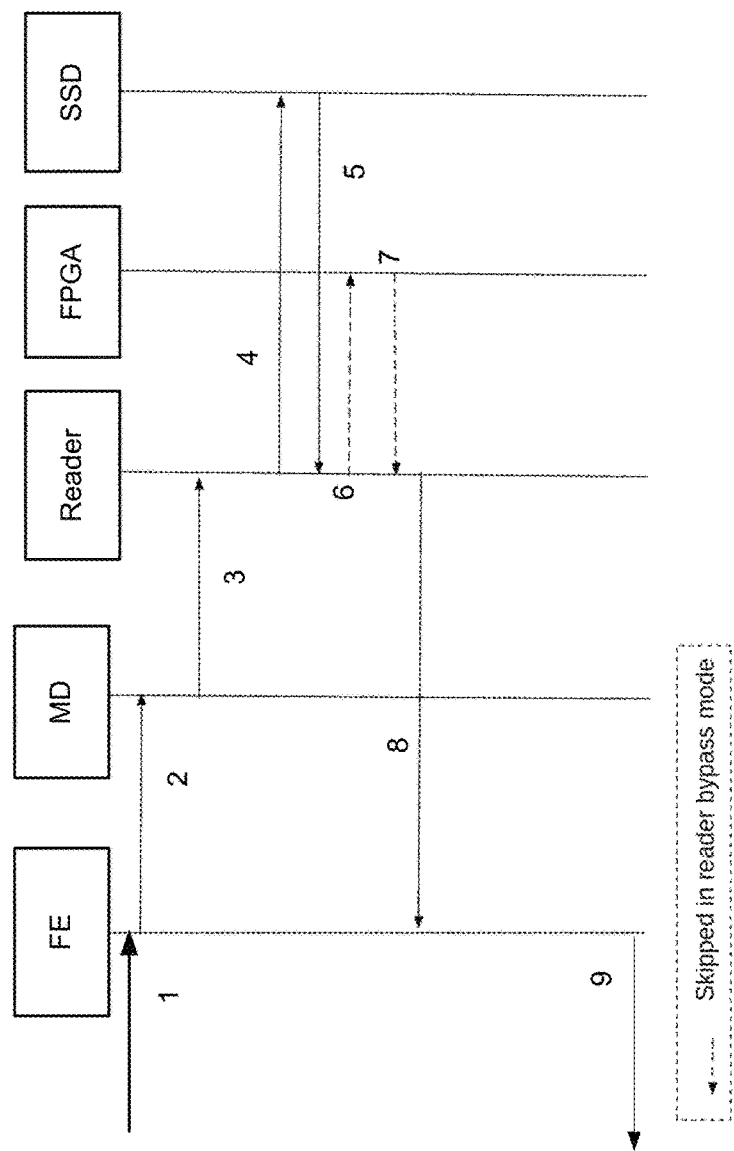
FIG. 7 illustrates an example of a read flow.

The flow 110 includes the following steps:
1. FE receives write request and add to write-buffer and reply to the client (fast-ack)
2. FE sends write request to Writer-O (aka writer-FE)
3. Writer FE sends write request to FPGA
4. FPGA completes (e.g. after compression) the write request with Writer-F (aka Writer-LF)
5. Once Writer-F accumulated enough BLKs/object to fill a write unit, Writer-F sends to FPGA request to copy all objects (preparation for writing)
6. FPGA completes copy with Writer-S
7. Writer-S send write requests (pointing to FPGA buffers) to the SSDs
8. SSDs complete writes with Writer-S
9. Once Writer-S got all completion of write-unit, send to MD (sharded) the write-unit
10. MD update the location of all objects in the write unit and send completion to FE
11. FE removes objects from write-buffer FIG. 7 illustrates an example of a read flow. The participants are a frontend (FE), FPGA, SSD and a reader of global FTL.

The flow 120 includes the following steps:
1. FE receives read request (if BLK or object is in write buffer return data and finish)
2. FE sends read request to MD (sharded)
3. MD lookup of the BLK/object storage address and send request to reader to retrieve the data
4. Reader send request to the SSD/s to retrieve the data
5. SSDs complete the request with Reader
6. Reader asks FPGA to decompress
7. FPGA complete decompress with reader
8. Reader send completion to FE
9. FE sends completion to client (wire)

Figure 8:
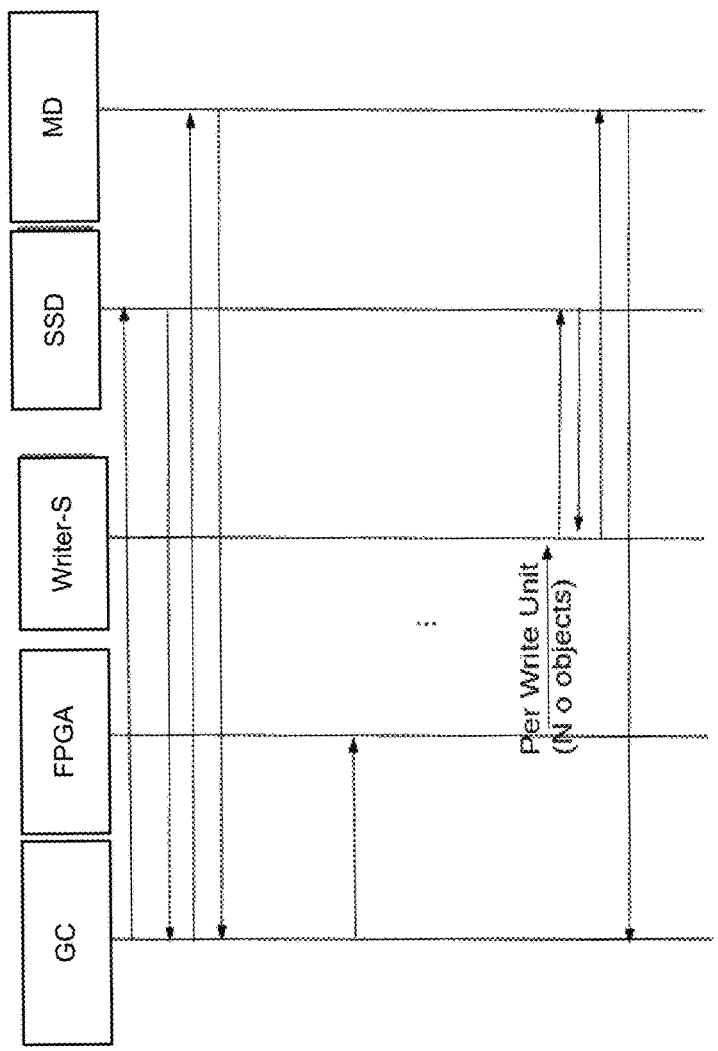
FIG. 8 illustrates an example of a read flow.

FIG. 8 illustrates an example of a read flow. The participants are a frontend (FE), FPGA, SSD and a reader of global FTL.

Figure 9:
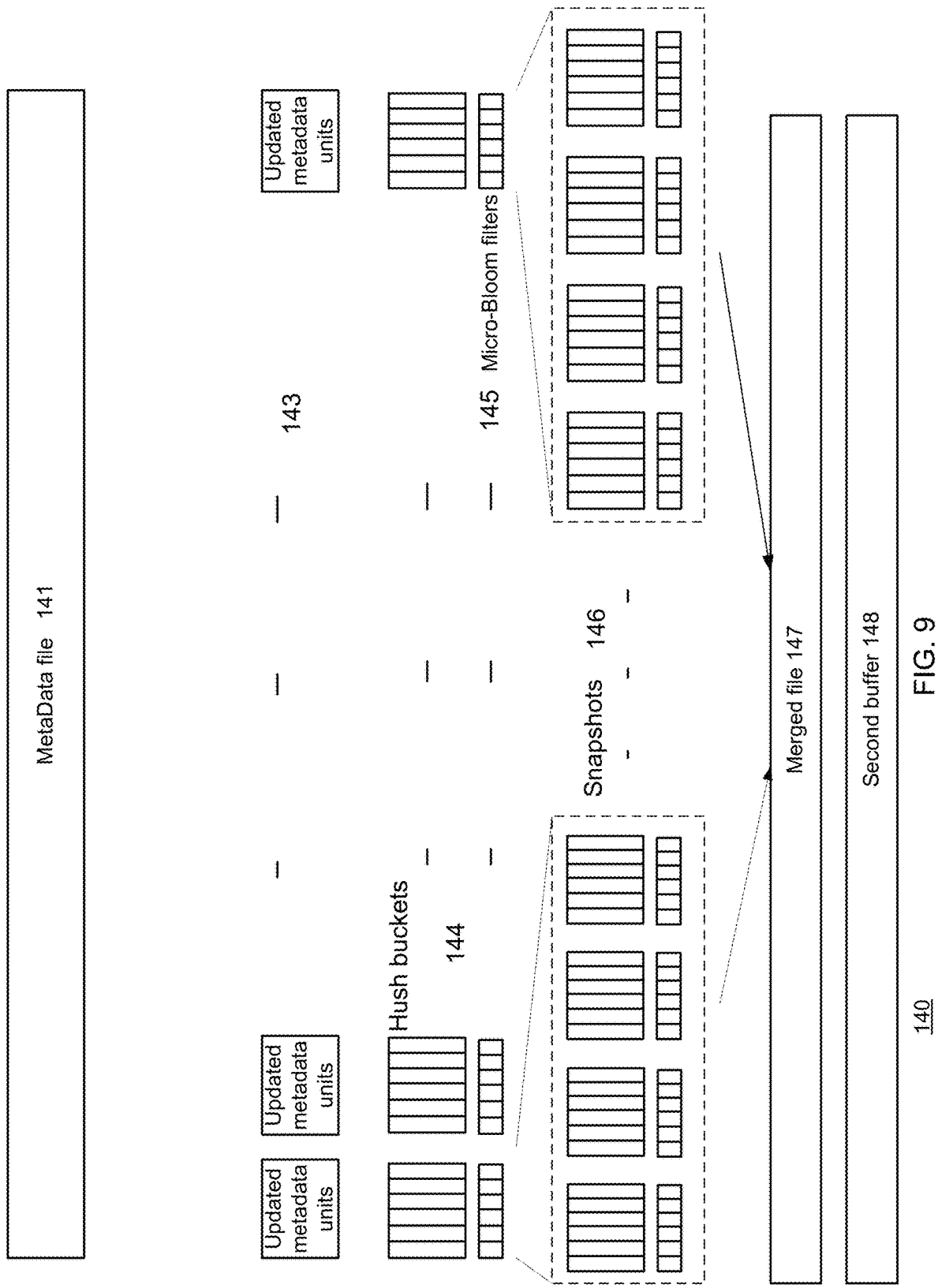
FIG. 9 illustrates an example of managing metadata.

The flow 130 includes the following steps:
1. GC reads write-units from SSD (include valid and invalid BLKs/objects in write-unit).
2. SSDs complete reads with GC (note data is written directly to FPGA and kept compressed as it is in the media)
3. GC ask MD for valid BLKs/objects information (Compressed?size?location?)
4. MD returns to GC the requested information
5. Once GC accumulate in FPGA enough valid objects to fill a write unit, GC asks FPGA to copy the valid objects (preparation for writing)
6. FPGA completes copy with Writer-S
7. Writer-S send write requests (pointing to FPGA buffers) to the SSDs
8. SSDs complete writes with Writer-S
9. Once Writer-S got all completion of write-unit, send to MD (sharded) the write-unit
10. MD update the location of all objects in the write unit and send completion to GC Managing of Metadata FIG. 9 illustrates an example of managing metadata.

A large data file may be associated with a large metadata file 141.

Metadata is updated over time—and updated metadata are stored in hash buckets 144.

Each hash bucket is associated with a hash value that is obtained when applying a hash function of a part of an identifier of a metadata unit.

If a certain hash bucket (indexed by a certain hash value) is full the system may perform re-hashing and open another hash bucket to store new metadata units that have the certain hash bucket. The location of the other hash bucket is known to the storage system (for example the hash bucket that immediately follows or precedes the certain hash bucket and may mark the certain hash bucket as full—in order to easily retrieve any metadata units that are stored in the other hash bucket.

Multiple hash-buckets may form a micro-file.

The micro-files are much smaller than the large metadata file. The metadata file may have a size of hundreds of megabytes till gigabytes and the micro-files may be much smaller—for example be of about 1 megabyte each.

A micro-file is associated with a micro-Bloom filter that indicates which metadata units are not included in the micro-file.

The micro-files may be stored in non-volatile memory 22.

Snapshots 146 of the micro-files are taken at different points in time.

The snapshots 146 may be merged to a merged file 147 using one or more merging processes—such as de-duplication and log structured merge. A second buffer 148 is used to store the older merged file. Merged file 147 is stored in a first buffer. The first and second buffers store, in an alternating manner, the new file and an old file. The snapshots may be merged with the content of the second buffer to generate the merged file. After the merged file 147 is fully updated it becomes the old file and in another point in time the content of new snapshots 146 (during the next merge process) may be merged with the content of the first buffer to provide a new merged file in the second buffer.

The SSD unit may maintain a double buffer that may be used for storing a current merged file, and for storing a new merged file that will store the outcome of a merge process between different snapshots.

The hashing that is used to create the hash buckets provides ordered snapshots and ordered merge file. Accordingly—the merging operations may be executed on certain hash buckets and few parts of the merged file at a time.

It should be noted that the merging process may generate multiple layers of merged files. The LSM can have any number of levels and any number of files per level.

Whereas in a classical LSM implementation the metadata is stored in tree structures, in the present disclosure the metadata may be organized and stored in hash buckets based on the digest of the metadata. Reading data from hash buckets when looking up an entry in the LSM can be performed in constant time, whereas reading data from a tree structure takes time that is proportional to the size of the tree. For Example—1024 hashes (or any other number of hashes) may be stored per bucket. The total size of a micro-bloom-filter may or may not be few megabytes (for example 8 MBs).

The size of the Micro-Bloom-filter may be designed to fit into CPU caches.

Merge operation are done on the Micro-Files The merge operation merges metadata objects based on their digests, rather than sorting them as done in classical LSM.

After merging Micro-Files, the relevant storage used by those Micro-Files can be re-used for other purposes (no need to wait till the merge of the whole relevant file is completed).

The memory allocated for Micro-bloom filter can be reused for other purposes as the merge-operation of the Micro-Files is completed.

The LSM can be divided to sub-LSM, each sub-LSM contains sub-group of all digest. Each sub-LSM is processed by different processor, creating multi-processing.

The storage system may perform parallel processing of merge operations, while each processor deals with different group of Micro-Files.

Log Structured Merge (LSM) is a data structure that combines two operations in a single method. The first operation is logging operation; normally it is used to follow up the latest changes in the data structure. In most case logs are not structured, it is just list of operations. The second operation is generating update of well-organized structured data.

The LSM combines the 2 operations by having hierarchical logs chuck of data (for simplicity those chunks will be called files). Each new file is generated by latest log operation. The file is (at least to some degree) sorted. Generating new file(s) pushes old files into deeper levels in hierarchy. The push process includes in most of the cases merge with older file (while maintaining the sorting). The deepest file(s) are the largest.

A new file is generated by merging of 2 (or more) files. The merged file includes all the elements that were in previous files. If we have the same two records in different files, only the updated record will be preserved after the merge. In other words, the merge discards old data. The new file is sorted as well (in most cases).

The latest version of each object can be found in one of the files. In order to retrieve the updated version of the element we should find in which file is it and then read it. The standard process is to scan the files from newest to oldest. Finding a record within the file is relative easy as the records are sorted.

Bloom-filters are data structure that helps detecting if an object is found in certain data chunck. Combining Bloom filters with LSM helps to check in which file (out of the hierarchical file structure) the latest version of the object is found. It reduces significantly the number of read operation needed to find an object in the LSM structure.

LSM is widely used in many modern systems (RocksDB in Facebook, LevelDB, Cassandra). In many cases LSM manages Key/Value (K/V) pairs. The LSM enable managing huge number of small values and converting them to large write chunks (that fits HDD and SSD characteristics). In most of the LSM cases the Key (out the K/V pair) is string of characters (can be file name for example) describing the value. The K/V stored in the LSM sorted, this way the search for specific key is easy. In many cases the LSM stores both the Key and the value.

There are some works that replaces the character-string-key with cryptographic HASH function i.e. generating (almost) unique digest from the key or from the K/V pair. The digest (160 bits for example) is generated, in many cases, using HASH function. The Hash (digest) is used as the new key. As the potential number of digests is huge, the way to store them efficiently, is by organizing them in buckets. Each bucket stores range of digests. The design is done in a way that average bucket is partially full. Special treatment is given to full bucket.

The LSM in the present disclosure is used to store mainly the metadata (just in cases that that the data is very short, it will be appended to the data). That metadata includes the data-name and its logical location (with few additional parameters). The data-name is unique. It is the data digest (or the digest of the alphabet data name). The digest is performed by HASH function and generates random number.

The system divides the metadata into buckets. The metadata objects in the same buckets have the same partial-HASH signature (it means that a group of bits, out the hash signature, has the same value for same bucket).

In case all the objects sharing same bits occupies more than buckets size, some of the objects will be remapped (sometimes it is called re-hashed) to another bucket.

In order to reduce the re-mapping the average fill of the bucket will be limited in a way that the remapping percentage will be small.

The files that will be managed by the LSM will be relatively large (32 GB and 8192 GB). In order to manage them conveniently, the files are divided to small chunks called Micro-Files (~1 MB each). Per each Micro-File there is associated Micro-Bloom filter. The Micro-Bloom filter is small enough to fit in CPU caches for fast processing.

In order to accelerate performance in multi-core environment the method may use digest sharing and/or micro-file sharing.

Digest sharing may include—dividing the entire LSM to sub-LSMs. Each sub-LSM will manage predefine range of digests. Example: For the case of 2 LSM, one LSM will be used for the even digests and the other will be used for the odd digests.

The micro-file sharing may include allowing different processors to process each group of Micro-Files.

It is used to follow up the latest changes in the data structure. In most case logs are not structured, it is just list of operations. The second operation is generating well-organized structured data. The LSM combines the 2 operations by having hierarchical logs file. Each new file is generated by latest log operation. The file is (at least to some degree) sorted. Generating new file(s) pushes old files into deeper levels in hierarchy. The push process includes in most of the cases merge with older file (while maintaining the sorting). The deepest file(s) are the largest Merging Files Merging is done by generating a new file that includes the elements of 2 (or more) other files. The merged file is sorted as well. If we have the same two records in different files, only the updated record will be preserved after the merge. In other words, the merge discards old data.

Files are written once and always written sequentially.

Read Process

The latest version of each object can be found in one of the files. An object may appear in few files, the latest value is found in the newer file. In order to retrieve the updated version of the element we should find in which file is it and then read it.

Bloom Filters

Combining bloom filters with LSM helps to check in which file the latest version of the object is found. It reduces significantly the read amplification. Note that Bloom-filters might have false-detection that causes dummy reads (reads for an object that is not found in the file).

Metadata Micro-File & Micro-Bloom

The files that will be managed by the LSM will be relative large (32 GB up 8192 GB). In order to manage them conveniently, the files are divided to Micro-Files, each Micro-File is Micro-File-Size. Per each Micro-File there is associated Micro-Bloom filter. The Bloom filter helps finding an object in multi-file system.

Rehashing is done within Micro-file. In case the bucket is full, an indicator in the bucket descriptor will be set. The additional objects will be moved to the other buckets. For example: (1) if the LSB of the hash is even the object will be moved to the bucket before; if the LSB is odd it will be moved to the bucket after. The bucket followed the last bucket is the first one (cyclic arrangement) and vise-versa. (2) Using 1023 linear-pseudo-random-shift-register move over the different buckets Build File Process The merge process is done using Micro-Files. The whole Micro-files are read to memory and merged Micro-file(s) are generated in memory. After generation of Micro-files it can be moved to storage. While moving object to the new file, the relevant bits in Micro-Bloom are set. The input is sorted files and the output is sorted file. If 2 inputs has same value, the newest object is selected and the oldest is dropped.

The detailed mechanism is described herein:

Definition: File-Index is a pointer to the next object to be checked within the file.

a. Each file has its own File-Index and the target-file has file-index.

b. If 2 objects have the same value, move to the merged file the newest and increment the file index of old and new file c. If one object is smaller than other, move the smaller object to merged file and increment the file index of the smaller value.

Storage and Memory Management During Merge

In order not to occupy significant storage and memory, merge process is done using Micro-Files and Micro-Bloom. Each step new Micro-Files are generated and old Micro-Files becomes free. The relevant storage and memory of the freed Micro-files can be reused for other purposes.

Bloom Filter Creation

Bloom filters will be created using Micro-Bloom units (~16 KB to 128 KB). Creating the filter is done using multiple bits setting operations in that memory. An efficient way implementing it, is by allocating some part of the CPU cache as local SRAM, manipulating all the bits locally in CPU memory without accessing to DRAM at all. After finishing the Bloom calculation the content should be copied to DRAM Files Metadata is Stored in the NVRAM.

Figure 5:
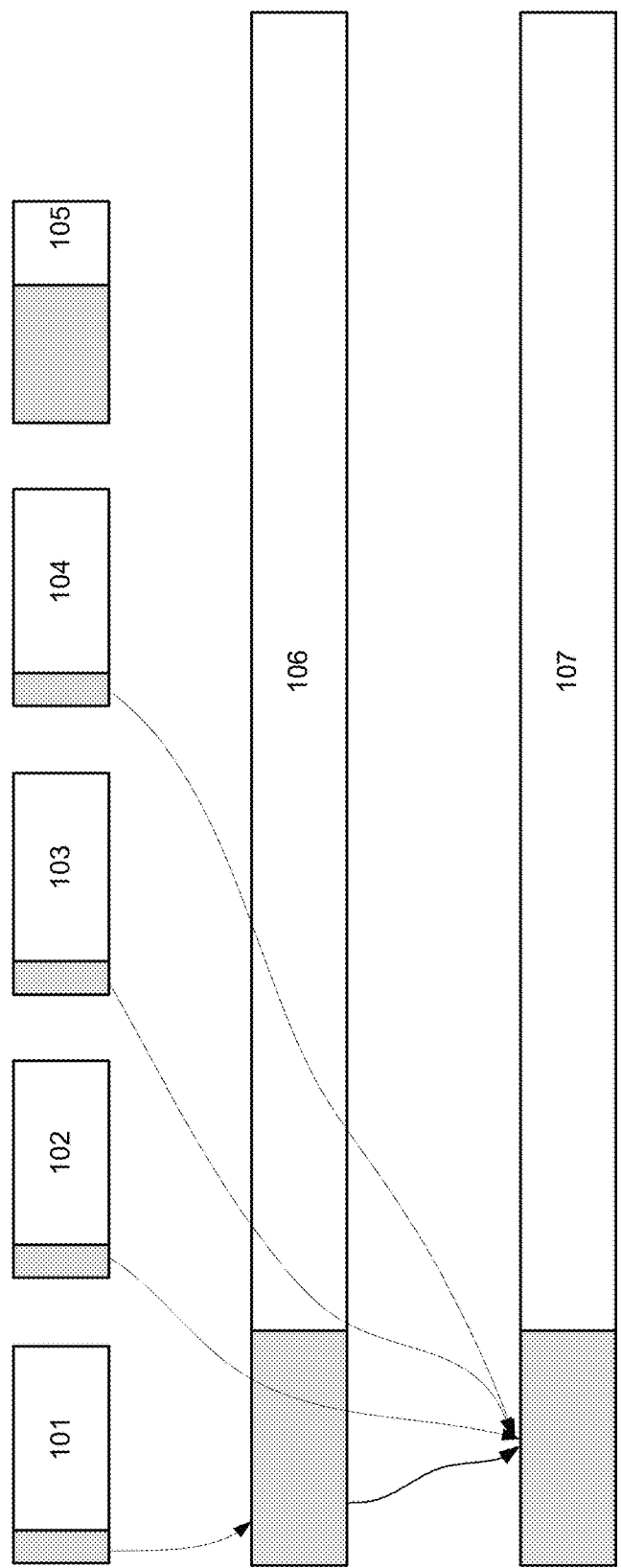
FIG. 5 illustrates an example of files that participate in an LSM process.

FIG. 5 illustrates files 101-107 that participate in an LSM process. The merges areas are marked in gray.

Because the files 101-107 include sorted hash buckets—the LSM process may be executed on one portions of the files at the time.

These files include mid-files 101-104 (that includes content from many micro-files) and old large file 106 and a new large file. The mid-files and the old large files undergo an LSM process to provide the new large file 107. Non-limiting example of sizes include mid-files of 512 GB and large files of 4096 GB. Mid-file 105 may be used as a temporary buffer.

In the steady state of the LSM some files are being built (one file per level) and some files are being "deleted". The process is done gradually, which means that sorted part of hash buckets can be found in either old files or in the new files but never in both. Visually it can in FIG. 5, the merge process is executed for hash buckets associated with a low hash-values (hash values that are below a certain threshold)—while hash buckets associated with higher hash-values will be merged in another point in time. The gray areas of FIG. 5 illustrates hash buckets associated with the low-hash values.

When, during the merge process, a request to retrieve metadata having a low hash value is received—then the metadata is searched either in the new-largest-file or in the new Mid-files. On the other hand, metadata having a high hash-value should be searched in the old-files. At the end of each build process the metadata should be update in atomic way per file, unless there is just one entity approaching the metadata.

Accordingly the LSM process may include merging metadata associated with a certain range of hash-values—the merging involves accessing parts of files that are associated with the certain range of hash-values. When metadata is requested after the merging of certain range of hash-values is completed then the request involves searching in the metadata in updated files that were generated during the merging. When metadata is requested before the merging of certain range of hash-values is completed then the request involves searching in the metadata in older files. For example—after completion of the merging of the gray areas—a request to retrieve metadata from the gray areas will involve searching the gray area of file 107—and a request to retrieve metadata that was not merged yet—involves searching files 101-104.

As there might be some accesses to the LSM "in-flight" when the relevant file metadata is updated, the relevant memory & storage should remain intact till those accesses are finished. One method to manage it is to use reference-counter per micro-file with the relevant overhead of accessing those reference-counter. Alternate approach (and recommended) is to delay the storage release for fix reasonable time. For example, memory & storage are released by 1 Micro-File-step merge delay File Mapping Update Process There is mapping between Metadata_Physical_Unit and the physical media. Per each unit-write the metadata manager provides the Metadata_Physical_Unit name to the writer and the writer returns the physical address in the storage after write-process is completed. The writer, writes the names of the units on the media itself (for reverse mapping).]

Each time the Metadata_Physical_Unit becomes invalid the metadata manager send "trim" command to the writer in order make the GC operations more efficient. The command parameter is the physical address.

Each time the GC manager moves Metadata_Physical_Unit to other physical location it notifies the metadata manager for the new address.

Figure 10:
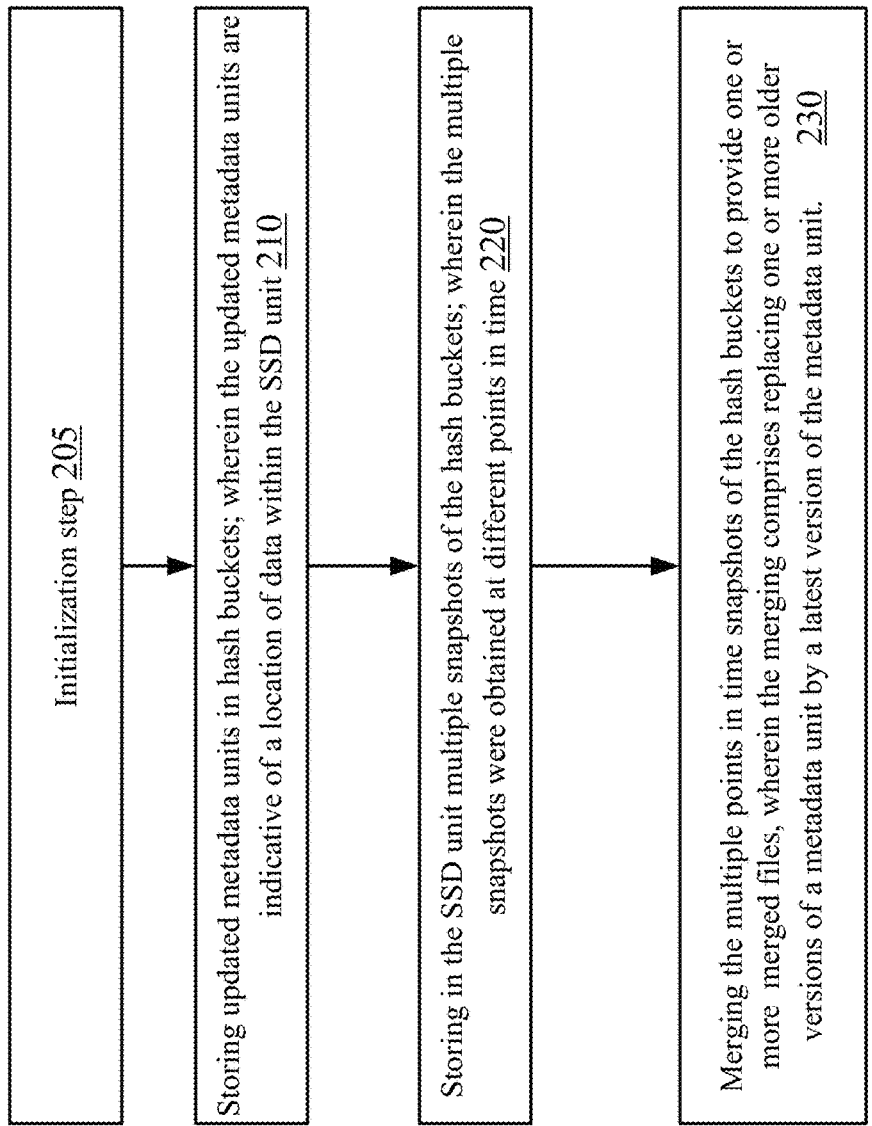
FIG. 10 is an example of a method.

FIG. 10 illustrates method 200.

Method 200 is for storing metadata in a solid-state drive (SSD) unit of a storage system.

Method 200 may include:

a. Step 210 of storing updated metadata units in hash buckets; wherein the updated metadata units are indicative of a location of data within the SSD unit.

b. Step 220 of storing in the SSD unit multiple snapshots of the hash buckets; wherein the multiple snapshots were obtained at different points in time.

c. Step 230 of merging the multiple points in time snapshots of the hash buckets to provide one or more merged files, wherein the merging comprises replacing one or more older versions of a metadata unit by a latest version of the metadata unit.

The one or more merged file may form a hierarchical structure of merged files.

Step 230 may include performing a log structured merge operation.

Step 230 may be executed by an in-line accelerator of the storage unit.

Each hash bucket may be associated with a hash value that is calculated by applying a hash function on a part of an identifier of an updated metadata unit.

Step 210 may include re-hashing when a hash bucket associated with a certain hash value is full. The full hash bucker may be tagger as full and the location of the new hash bucket that will stores the remaining updated metadata that should have been stored in the full hash bucket may be known in advance. It may be located at a predefined distance from the full hash bucket. For example—the new hash bucket may immediately follow the full hash bucket. There may be provided a sequence of hash buckets that are associated with the same full hash bucket.

Step 230 may be initiated based on a fullness level of at least one of the hash buckets. For example—when at least one of the hush buckets reaches a predefined fullness level (for example 78 of 80 percent—although any other value may suffice) then step 230 may be initiated.

Method 200 may include an initialization step 205. The initialization step may include virtually segmenting a metadata file to multiple smaller metadata files and associating different groups of hash buckets to different smaller metadata files. Managing smaller metadata files is easier.

Step 205 may include storing the updated metadata units in a non-volatile memory module of the storage system. The non-volatile memory module differs from the SSD unit.

Step 205 may also include generating a Bloom filter for each group of hash buckets.

FPGA

A field-programmable gate array (FPGA) is an integrated circuit designed to be configured by a customer or a designer after manufacturing—hence "field-programmable". The FPGA configuration is generally specified using a hardware description language (HDL), similar to that used for an application-specific integrated circuit (wikipedia.org).

FPGAs contain an array of programmable logic blocks, and a hierarchy of reconfigurable interconnects that allow the blocks to be "wired together", like many logic gates that can be inter-wired in different configurations. Logic blocks can be configured to perform complex combinational functions, or merely simple logic gates like AND and XOR. In most FPGAs, logic blocks also include memory elements, which may be simple flip-flops or more complete blocks of memory.

To define the behavior of the FPGA, the user provides a hardware description language (HDL) or a schematic design. The HDL form is more suited to work with large structures because it's possible to just specify them numerically rather than having to draw every piece by hand. However, schematic entry can allow for easier visualization of a design.

Then, using an electronic design automation tool, a technology-mapped netlist is generated. The netlist can then be fit to the actual FPGA architecture using a process called place-and-route, usually performed by the FPGA company's proprietary place-and-route software. The user will validate the map, place and route results via timing analysis, simulation, and other verification methodologies. Once the design and validation process is complete, the binary file generated (also using the FPGA company's proprietary software) is used to (re)configure the FPGA. This file is transferred to the FPGA/CPLD via a serial interface (JTAG) or to an external memory device like an EEPROM.

The most common HDLs are VHDL and Verilog, although in an attempt to reduce the complexity of designing in HDLs, which have been compared to the equivalent of assembly languages, there are moves to raise the abstraction level through the introduction of alternative languages. National Instruments' LabVIEW graphical programming language (sometimes referred to as "G") has an FPGA add-in module available to target and program FPGA hardware.

To simplify the design of complex systems in FPGAs, there exist libraries of predefined complex functions and circuits that have been tested and optimized to speed up the design process. These predefined circuits are commonly called IP cores, and are available from FPGA vendors and third-party IP suppliers (rarely free, and typically released under proprietary licenses). Other predefined circuits are available from developer communities such as OpenCores (typically released under free and open source licenses such as the GPL, BSD or similar license), and other sources.

In a typical design flow, an FPGA application developer will simulate the design at multiple stages throughout the design process. Initially the RTL description in VHDL or Verilog is simulated by creating test benches to simulate the system and observe results. Then, after the synthesis engine has mapped the design to a netlist, the netlist is translated to a gate level description where simulation is repeated to confirm the synthesis proceeded without errors. Finally, the design is laid out in the FPGA at which point propagation delays can be added and the simulation run again with these values back-annotated onto the netlist.

More recently, programmers are using OpenCL to take advantage of the performance and power efficiencies that FPGAs provide. OpenCL allows programmers to develop code in the C programming language and target FPGA functions as OpenCL kernels using OpenCL constructs.[42]

There is growing need to improve the utilization of a FPGA.

Figure 11:
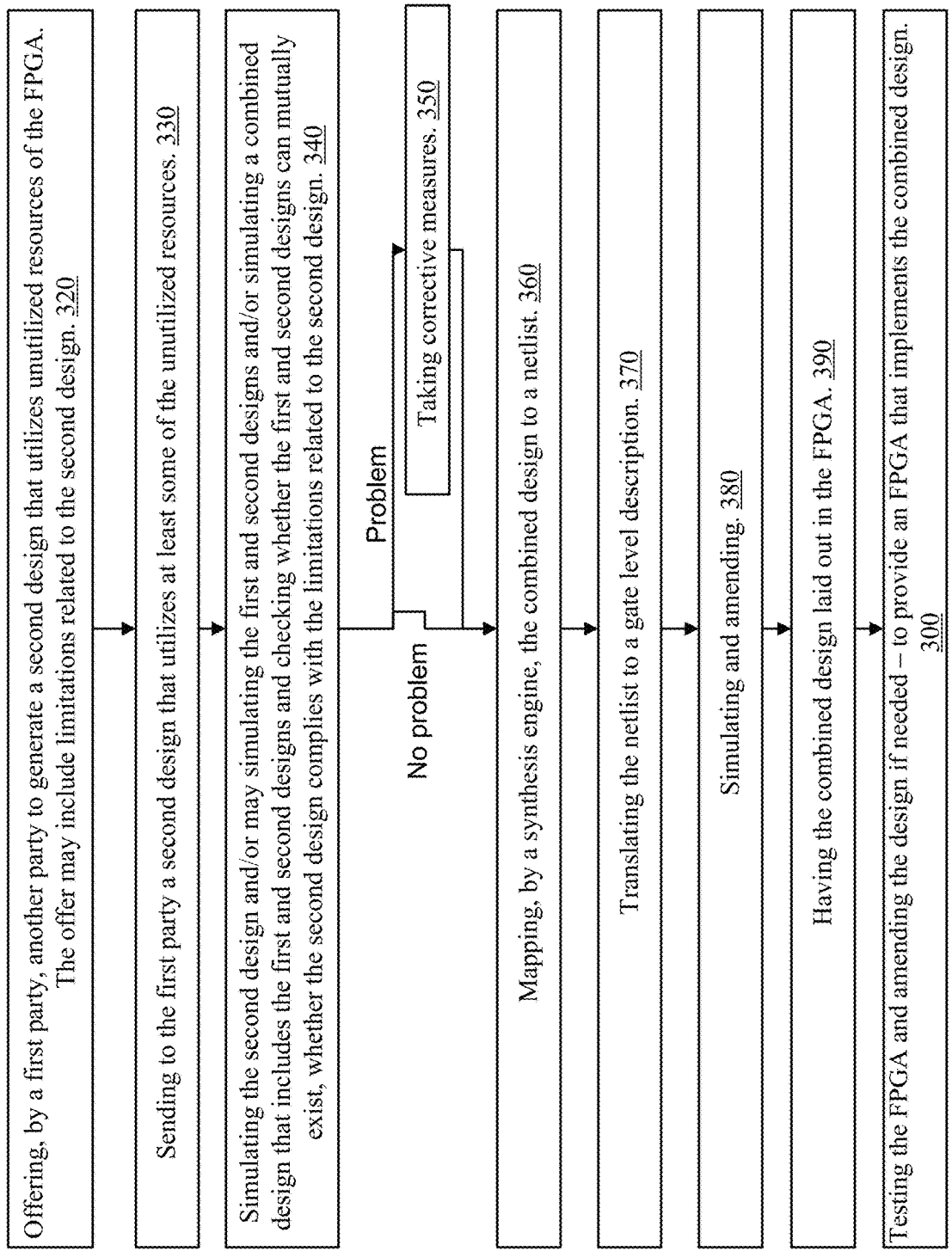
FIG. 11 is an example of a method.

There may be provided a method for programming an FPGA. A first party may generate a first design that utilizes only some of the resources of the FPGA. The method 310 is illustrated in FIG. 11.

The first party may offer (320) another party to generate a second design that utilizes unutilized resources of the FPGA. The offer may include limitations related to the second design-such as but not limited to power consumption limits, amount of available unutilized resources, operating frequency, clock signals features, timing constraints, and the like.

The second party may send (330) the first party a second design that utilizes at least some of the unutilized resources.

The first design and the second design may be expressed in a hardware description language such as HDL, Verilog, OpenCL, and the like.

The first party may then simulate (340) the second design, may simulate only the first design, only the second design, simulate both the first and second designs and/or simulate a combined design that includes the first and second designs. The first party may check whether the first and second designs can mutually exist and/or whether the second design complies with the limitations related to the second design.

If the second design does not comply with the limitation then corrective measures may be taken (50) second party may be requested to amend the second design, the first party (if authorized) may amend the second design, and/or the first party may amend the first design in order to compensate for the incompliance of the second design.

The first and second parties can agree on interfaces between the first and second designs. These interfaces may allow an exchange of information between the first and second designs.

The first party may also design a monitor that will monitor the compliance of the second design with the limitations related to the second design, and the like.

The first party may also design access control circuits for securing the data that is fed to the second design or is outputted by the second design.

A successful simulation may be followed by a mapping (360), by a synthesis engine, the combined design to a netlist.

The netlist is translated (370) to a gate level description.

The gate level description can be simulated and amended if necessary (380).

This is followed by having the combined design laid out in the FPGA (390).

This is followed by testing the FPGA and amending the design if needed (300)—to provide an FPGA that implements the combined design.

Any of the mentioned above steps may be optional. For example—one or more of the mentioned above simulations may be skipped or another simulation may be added, one or more other tests and/or verifications steps may be skipped or added.

The first party may be a vendor and the second party may be client of the vendor. The vendor virtually offers his client the FPGA as a service.

The first party may be aware of the content of the second design (for example—the functionality of the second design) or may not be aware of the functionality of the second design.

The user may provide the vendor the second design and the vendor may check the second design (may take few iterations).

Alternatively, the vendor may provide to the user constrains on all signals on the user area boundary. The user may design the second design accordingly. The compliance of the second design with the constraints may be checked by the user, vendor, or both. The user may provide the vendor some certification that the design doesn't exceed power requirement or similar.

It is noted that the unused resources of the FPGA may be allocated to multiple parties—not just to a single second party.

Figure 12:
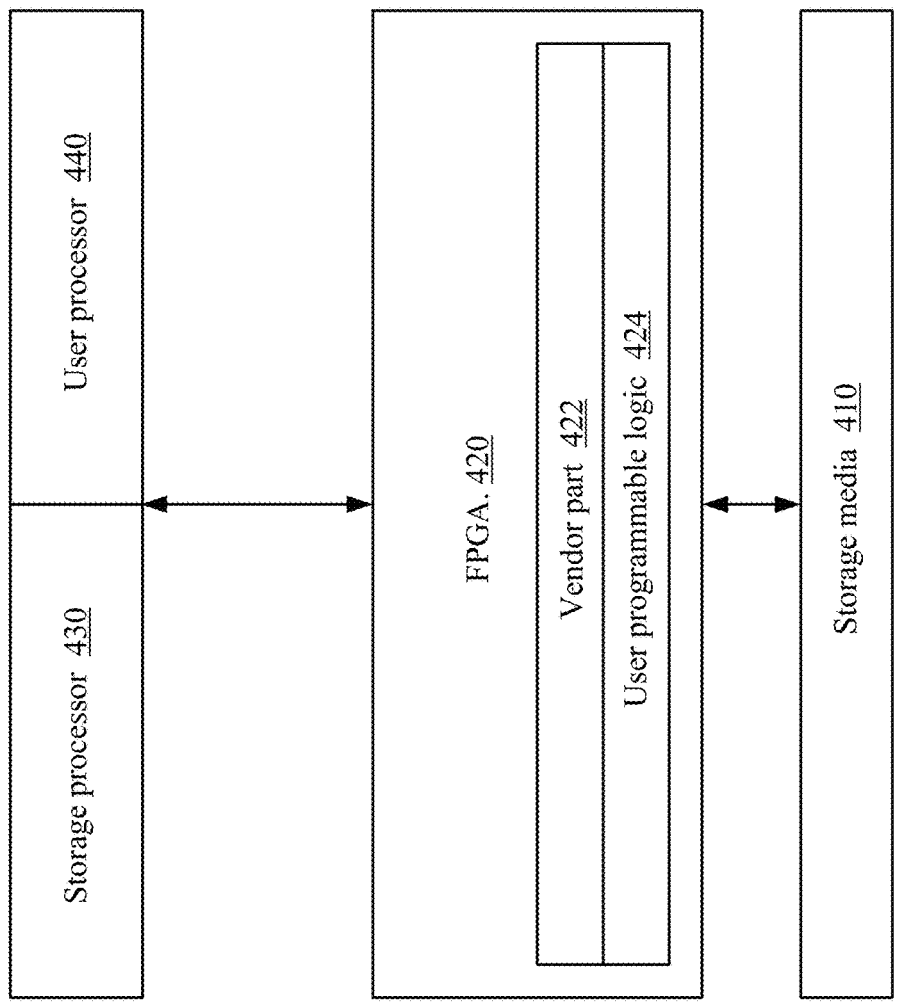
FIG. 12 illustrates an example of a storage system.

When there are multiple users then each user programmable logic in the FPGA may be interconnected to relevant data paths of the FPGA and/or to data paths that are coupled to other devices of circuits (such as data paths connected between the FPGA and a storage media of FIG. 12 or one of the processors of FIG. 2).

The FPGA may include one or more first areas that follow the first design and one or more second areas that follow the second design.

The one or more first areas may form a hard wire dedicated logic, while the one or more second areas may form a user programmable logic.

The FPGA, hard wire dedicated logic and the user programmable logic may be of any kind and may be used for any purpose.

For example:

a. The FPGA may be included in a storage system.
b. The user programmable logic may be a data path sniffer (read path).
c. The user programmable logic may be a data manipulator (read & write path).
d. The FPGA may include a data path that is used for storage purposes.
e. The access control circuit may be a multi-user isolation logic (for isolating data exchanged between user programmable logics of different users).
f. The isolation logic may expose only the appropriate data to the relevant user using proprietary logic.
g. The FPGA (first and/or second parts) may include a monitor for monitoring the power consumption limit and may also enforce power consumption limitations.
h. The user programmable logic can exchange data with a user software package running in the same system or in other external system.

The vendor may provide a dedicated design tool to the user, the design tool may check that the second design meets the limitations (for—example may fit a target environment that includes the first design).

The vendor may provide dedicated design services to the user that checks that the second design complies with limitations.

The second design can be installed on multiple vendor systems.

The second design can be migrated from one platform to other via virtual machine or container live migration, as the system is running, or via "cold" migration when the system is shut off. In any case the design is not tied to a specific physical machine and can run on any physical machine provided it has the FPGA hardware.

In FIG. 12 it is assumed that the FPGA 420 is a part of a storage system 402. It should be noted that this is merely an example and the FPGA can be positioned in other systems and/or used for other purposes.

The FPGA that is positioned between storage media 410 and one or more processors such as a storage processor 430 and a user processor 440.

The storage media may be volatile or non-volatile (SSD, HDD or similar).

The storage processor may be configured to perform most of the high levels storage management tasks and/or some random logic implemented by FPGA. The random logic performs logic manipulations that are too heavy for the storage processor.

The FPGA includes unused parts.

Those parts (or at least some of these parts) may be programmed by the method illustrated above.

The second design may be a user programmable logic 424 that accelerates significantly storage access. For example, the user programmable logic may search for specific pattern in data that is transferred between one of the processors and the storage device. The first design may be a vendor part 422 that may perform encryption, compression and/or error correction or detection processes.

The storage processor may include additional processors/tasks that may implement dedicated logic of the user (s). Those processor/task can communicate directly with the user programmable logic in the FPGA.

The suggested approach enables heavy data crunching on the data path to/from the physical storage. Such data crunching, by FPGA HW, enables (a) making customized HW storage system; (b) Much higher crunching throughput compared to processor; (c) Much lower power per crunched byte; and (d) Potentially reduces the bandwidth needed at higher level (for example search patterns, and move up only recognized patterns).

Figure 13:
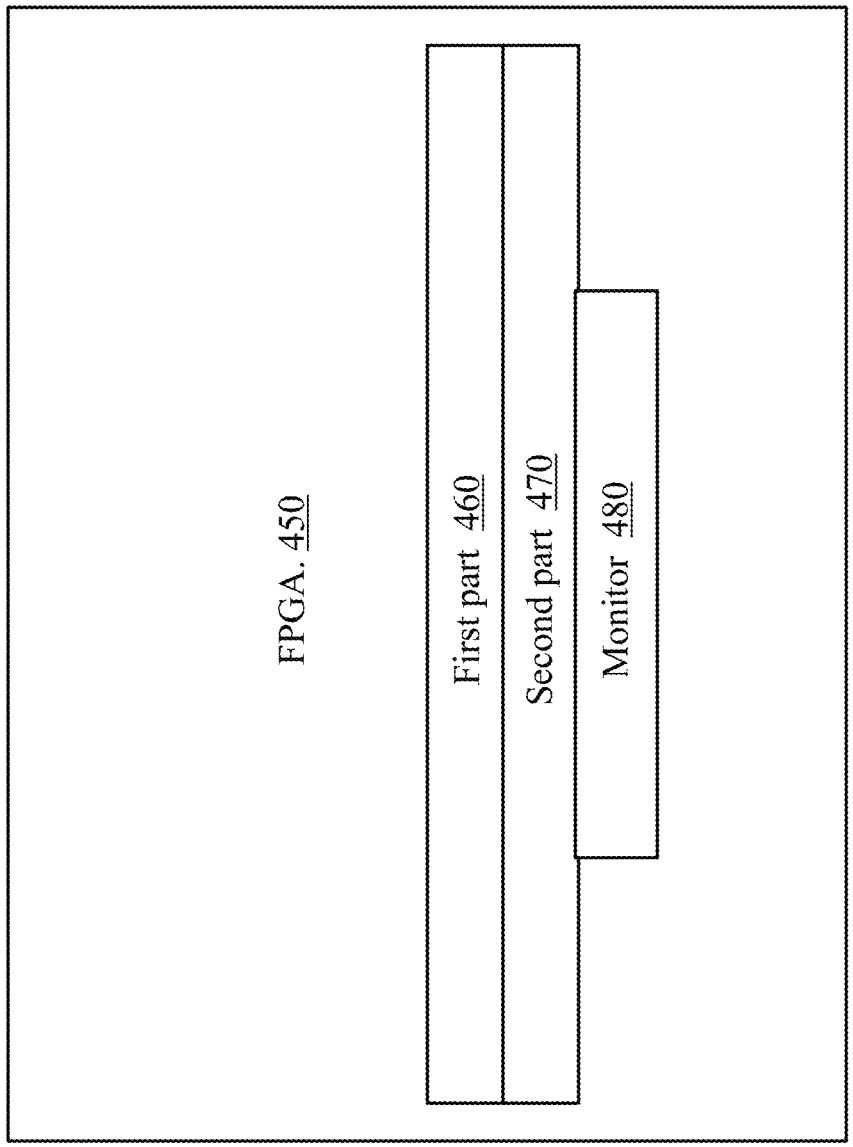
FIG. 13 illustrates an example of an FPGA of a storage system.

FIG. 13 illustrates an FPGA 450 that include first part 460, second part 470, and a monitor 480 for monitoring and/or enforcing power constraints (or any other limitations) imposed on the second part. The first part is associated with the first design, the second part is associated with the second design.

For example, and assuming that the first part is referred to as a vendor part and the second part is referred to as the user part. The FPGA may be programmed to find a string in huge file starting with the prefix of "bomb".

The vendor part is configured to read from media (including decompression, error correction etc.') transfer the content to user part. The user part is configured to search for the string and transfer to the user host program for more analysis.

The vendor may define in advance, what appears on the boundary of the user part (data read from storage, signals & timing). The user designs search machine in its part.

Yet for another example, the FPGA doesn't have to be between the storage and the host processor, it can be (for example) on the side bus.

It should be noted that FPGA internal logic is determined by loading the configuration to the FPGA internals through special process and dedicated FPGA HW. Typically, the load process is done by feeding the FPGA bit-stream that describes the related logic.

FPGA with Partial Reconfiguration.

In legacy FPGA, the whole FPGA should be configured. As FPGA became large the configuration process includes exchange of a lot of data. There is provided an FPGA that includes partial reconfiguration to enable smaller data exchange and easier management of FPGA. It means that the FPGA is divided to parts; each part can be configured separately. While one part is "running", the other part can be configured without interfering the first part.

According to an embodiment of the invention there is provided an FPGA that includes un-configured parts. Those parts are related to the partial configuration. Those parts may be programmed to include dedicated logic supplied by some user. One FPGA can include multiple user parts associated with more than one user.

Assuming that the first party is a vendor and the second party is a client then following process may take place:
a. The vendor may bring to the boundary of users-part relevant signals (in the storage system example, signals that related to the storage side of the system and signals related to user processor side). The vendor will provide signals descriptions and timing constrains on those signals. The vendor will provide power constrains. These power constrains relates to FPGA limits, vendor part power consumption and board power supply limits.
b. User part design. The user will make its own design. The design is based on the signals appears on the user-part boundary. The user logic will accelerate significantly the operations compared to SW implementation of similar logic. The storage processor may include additional processors/tasks that may implement dedicated logic of the user (s). Those processor/task can communicate directly with the user logic in the FPGA. The user will provide the user-part configuration bit-stream. The bit-stream will be loaded to the FPGA by the system described above when the user starts its operation. When the operation ends, another user bit-stream can be loaded.

A design example: the vendor part includes compression/de-compression logic. The user part includes search engine for specific pattern.

The storage processor may include additional processors/tasks that may implement dedicated logic of the user (s). Those processor/task can communicate directly with the user logic in the FPGA.

Isolation Logic.

The vendor parts include logic that will provide the user access just to the necessary logic. The purpose is not to expose the user to data that is not related to the specific user.

The isolation logic will include at least (but not limited):
1) Comparators on the storage data path that directs only user data to the user area 2) Comparators on the processor signals that feeds only user control and data to the user area
3) If the FPGA has access to other external parts (such as memory) the logic will include permission-logic that enable access to certain sub-parts of the external part (certain address space in the case of memory)

User Resource Monitoring

The vendor will provide logic that measures the usage of shared resources such as (but not limited) storage-processor bandwidth, storage bus bandwidth, external-parts interconnect bus, burst sizes on each bus side. The monitor can be used to limit the usage of those resources.

User power managements. In the absence of other methods, the user will provide power simulation that shows the worst-case power consumption of the user part.

FPGA with Dedicated Power Arrangement

Future FPGA may include dedicated power pins for each configuration area. By monitoring the power those pins the vendor can enforce some power policy.

Adaptive Resources Management

The vendor-part-user-part interface may include signals/logic that enable adaptive management of shared resources.

Adaptive Power Management (Example)

The user may request through the adaptive-management-logic additional power, the vendor-part will grace this request after enforcing/checking that other parts (including vendor part) power consumption is limited. Such management provides better power utilization Other Resources Management Similar to the power management logic, other resources can be managed adaptively. For example, (and not limited to those examples):
1) Storage-processor bandwidth
2) Storage bandwidth
3) Other external resources.

The suggested approach enables heavy data crunching on the data path to/from the physical storage. Such data crunching, by FPGA HW, enable
1) Making customized HW storage system
2) Much higher crunching throughput compared to processor
3) Much lower power per crunched byte
4) Potentially reduces the bandwidth needed at higher level (for example search patterns, and move up only recognized patterns)

Therefore—there may be provided a system that may include "hard wire dedicated logic" (vendor part) and partially programmable logic (user part) where: both share same FPGA or FPGAs group.

Signals of interest (important signals) are defined by the vendor and/or user and are brought to the user-part boundary. The vendor may provide signals description and constrains to the users.

The system may be a part of a storage system.

The system may include an isolation logic for isolating data of a user (user logic).

The isolation logic may expose only the appropriate data to the relevant user using proprietary logic The isolation logic may monitor the power consumption of the user logic and may guarantee (or alert) the user logic doesn't consume too much power The vendor parts may include monitoring logic of shared resources.

The monitoring logic may alert/stop violations of shared resources usage.

The user design can be installed on multiple vendor systems.

The user design can be migrated from one platform to other via virtual machine or container live migration, as the system is running, or via "cold" migration when the system is shut off. In any case the design is not tied to a specific physical machine and can run on any physical machine provided it has the FPGA hardware.

The FPGA may have dedicated power pins for each configured part (for each user logic).

The FPGA may include a monitor for monitoring the power consumed via the dedicated power pins to verify that the configured area doesn't consume too much power.

The FPGA can include collaboration logic to manage more efficiently shared resource.

Figure 14:
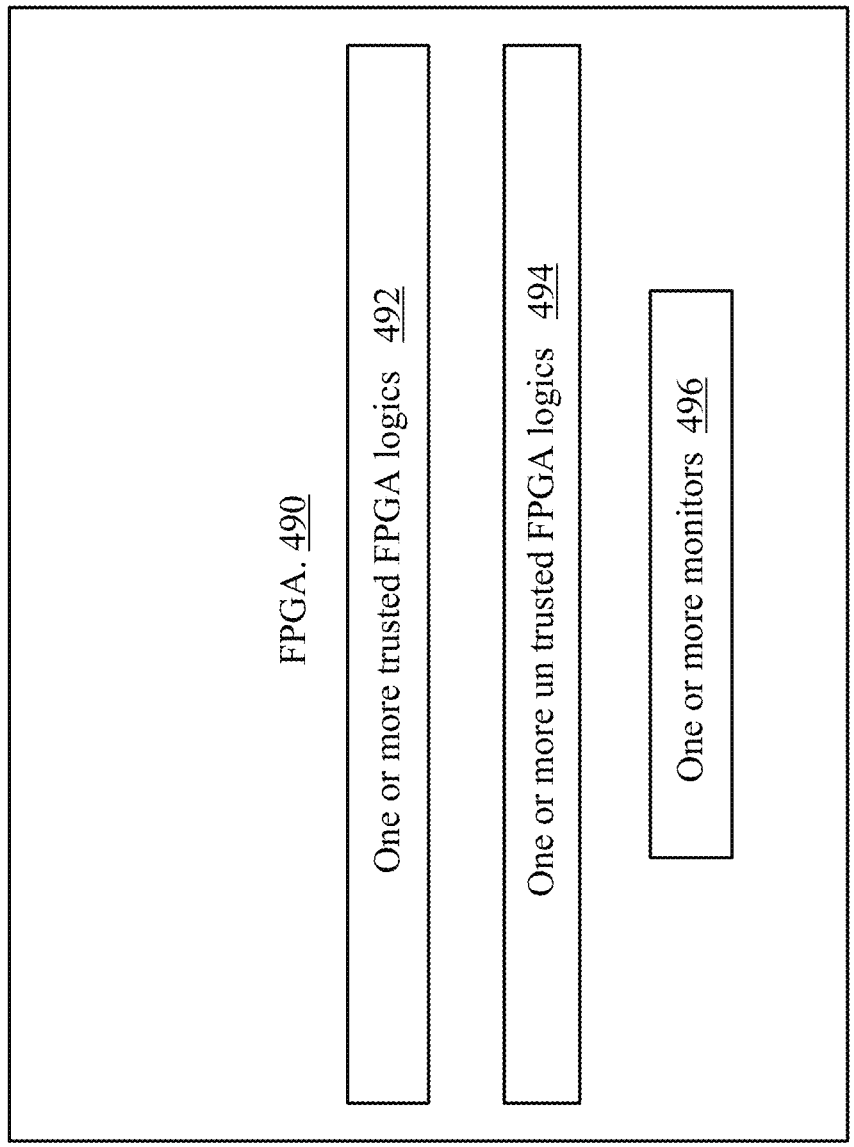
FIG. 14 illustrates an example of an FPGA of a storage system.

FIG. 14 illustrates FPGA 490 that includes one or more trusted FPGA logics 492, one or more untrusted FPGA logics 494, and one or more monitors 496. The FPGA may interface with various components or units such as SSD unit, volatile memory, non-volatile memory, peripherals, computers, and the like.

A trusted FPGA logic is associated with a higher trust level than the untrusted FPGA logic. For example—the trusted FPGA logic may be programmed by a vendor while the untrusted FPGA logic may be programmed by a user. The untrusted FPGA may be programmed by a program that is not known (its high-level programming content is unknown) to the manufacturer of the storage system that includes the FPGA.

Figure 15:
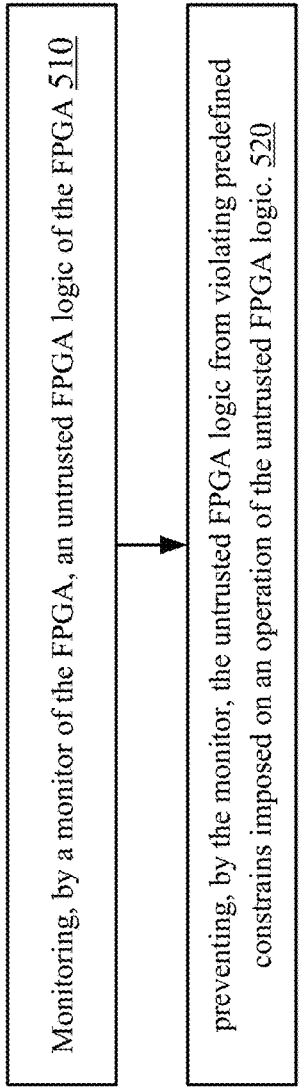
FIG. 15 is an example of a method.

FIG. 15 illustrate method 500.

Method 500 may be for operating a field programmable gate array (FPGA).

Method 500 may include step 510 of monitoring, by a monitor of the FPGA, an untrusted FPGA logic of the FPGA.

Step 510 may be followed by step 520 of preventing, by the monitor, the untrusted FPGA logic from violating predefined constrains imposed on an operation of the untrusted FPGA logic.

The predefined constraints are stored in a memory region of the FPGA that is not accessible to the untrusted FPGA logic; and wherein the FPGA further comprises a trusted FPGA logic.

Step 520 may include enforcing, by the monitor, predefined access constraints.

The predefined access constraints may be related to circuits or data located outside the FPGA.

Step 520 may include enforcing, by the monitor, predefined constrains that prevent the untrusted FPGA logic from interfering with an operation of the trusted FPGA logic.

Step 520 may include enforcing, by the monitor, predefined constrains that define an allocation of FPGA resources between the trusted FPGA logic and the untrusted FPGA logic.

Step 520 may include enforcing, by the monitor, predefined constrains that define power consumption of the untrusted FPGA logic.

The FPGA may include additional untrusted FPGA logics. In this case step 510 may include monitoring, by the monitor, the untrusted FPGA logic and the additional untrusted FPGA. Step 520 may include preventing the untrusted FPGA logic from violating predefined constraints imposed on an operation of the untrusted FPGA logic; wherein the predefined constraints are stored in a memory region of the FPGA that is not accessible to the untrusted FPGA logic.

The untrusted FPGA logic may be programmed using a user interface accessible to a user.

There may be provided a for monitoring a field programmable gate array (FPGA), wherein the method may include preventing, by a monitor of the FPGA, multiple FPGA logics that are programmed by different users to violate predefined constraints imposed on an operation of the multiple FPGA logics; wherein the predefined constraints are stored in an area of the FPGA that is non-accessible to the multiple FPGA logics.

Application Aware Storage Processing

In the following text the terms application metadata, database metadata and DB metadata are used in an interchangeable manner. The application metadata is metadata generated by or used by the application—and it may differ from the metadata generated by the storage system itself.

Applications such as databases, whether traditional SQL databases (e.g., MySQL) or NoSQL databases (e.g., MongoDB) typically use a single storage interface when accessing the underlying storage. This may be a file system interface (e.g., reading from and writing to files) or a block storage interface (e.g., reading from and writing to a raw block device).

When the underlying storage is network-attached, using a single storage interface may limit the application's performance since a single operation at the application's level (e.g., modifying an object or updating a single row of a database table) may be translated by the application host's storage stack into multiple file-level network operations (e.g., open, read, write, close file) or multiple block-level network operations (e.g., read/write a set of blocks). Furthermore, when the network-attached storage system receives the file-level or block-level calls, it has no semantic context for the application's intent, only file-level or block-level information. Thus, while some operations are more important from the application's point of view and should be carried out faster or sooner by the storage system, from the storage system's point of view, there is no way to differentiate between different file-level operations or block-level operations.

There is a growing need to provide improved manners for utilizing storage resources.

There may be provided a storage system and a method that may modify applications to access their storage systems through multiple interfaces simultaneously, where some of the interfaces may carry application-level semantics or where the application-level semantics may be automatically inferred from the interface used.

For example, a database system such as MongoDB supports multiple storage back-ends, known as storage engines. A storage engine in the part of the database system software that reads and writes to the underlying storage media. The storage engine source code may be modified such that instead of using file systems calls (open a file, read a file, write a file, close a file, truncate a file, and so on) to read and write the database data, the storage engine source code instead uses both file system calls (as above) but also key/value-type calls (get/set object, delete object) to access the database data.

An example of using both together would be storing the database metadata (where can each database table be found? where can each object in each database table be found?) in files and storing the objects themselves using key/value-type calls.

The object-level calls may then include object-specific application-level semantic hints to the storage systems (e.g., the instead of using a "get object" key/value call to get the object, the application would use a "get object as quickly as possible" call, where the "as quickly as possible is an application-level semantics. Other potential semantics are "get object in the background" or "get object in X milliseconds". Same goes for write and delete.) In the cases where the application does not supply application-level hints, the storage system may infer them based on the interface used. For example, the storage system may prioritize file-level operations (which may be commonly used for application metadata) over object-level operations (which may be commonly used for data). Such priority may include completing operations faster or storing redundant copies of application metadata.

The method may build application metadata that allows you to "convert" (by the storage engine) a file system call to a pair of calls—(a) the file system call and (b) key-value call s. You need to build in advance the DB metadata in files and store the objects using key-value calls.

As an example, an application may use both block and object accesses simultaneously; the application may mark the object accesses as either data or application metadata, and the storage system may classify on its own (without application input) as the block accesses as either data or application metadata.

The storage system may do this by observing the specific addresses of the blocks that are being written, where some ranges of addresses are classified as data and other ranges are classified as application metadata, or by looking at the contents of the blocks being written, where blocks that include specific signatures (specific bit patterns) are classified as application metadata and all others are classified as data There may be provided a storage system and a method that may modify the storage system to take the application requests context/classification into account when processing them and thus provide differentiated service to different application requests.

Taking a specific classification as an example, an application request may be tagged as "handle slowly" or "handle fast" or "don't care". The application may provide the classification directly, as noted above in the case of objects, by asking the storage system to "get object as fast as possible" or the storage system may tag the object as "fast" because its contents match the storage systems' heuristics for "these objects should be handled as quickly as possible" (as an example). In any case, once an object (or more generally, a request) has been tagged, the storage systems will handle it differently than other objects. For example, where a read/get request is put on a queue for an SSD to return the data, the storage system may put objects/requests tagged as "fast" at the front of the queue, untagged objects at the end of the queue, and "slow" or "background" objects on a separate queue which is only serviced when there are no other outstanding requests.

As an example, a host may run a NoSQL database such as MongoDB as its application with MongoDB using the RocksDB storage engine plugin or any other storage engine plugin. A host may also run an SQL database such as MySQL, with or without a storage engine. The database or its storage engine may use storage services provided by a storage system.

The storage system may expose to the application or its storage engine two parallel interfaces over a network: a block storage interface and an object-based interface.

The storage system and the application are connected over a network. The storage system may use a network protocol such as TCP/IP to expose services to its hosts. In the TCP/IP protocol, each endpoint (a host is an endpoint and the storage system is an endpoint) is identified by an IP address and an IP port. A connection between endpoints is identified by a 5-tuple: source IP, source port, destination IP, destination port, and protocol. Thus, the storage system may export on one IP and one port one interface and on the same or different IP and on the same port (if different IP) or different port another interface. The host (the source) would then send requests over the TCP/IP connections to the storage system (the destination). By observing which destination IP and destination port the storage system receives a request on, the storage system knows which interface to associate this request with. Alternatively, the storage system may receive all requests, including those coming from different interfaces, on a single TCP/IP connection, and differentiate between different interfaces based on the content of the request. A block interface request may include a bit pattern indicating that it is a block interface request, whereas an object request may include a different bit pattern indicating it is an object request.

The storage system may include a CPU, an FPGA, a DRAM and an SSD. Other configurations may be provided. For example—the storage system may include other and/or additional storage media and/or processors.

Traditionally, RocksDB utilizes LSM files for data storage and the LSM files contain both data (the objects MongoDB stores) and application metadata (the object's metadata and the LSM file structure itself).

RocksDB reads from and writes to the storage system the LSM files using file-level or block-level accesses, mingling application metadata, and data together in the same accesses, making it impossible for the storage system to differentiate between data accesses and application metadata accesses. By mingling data and application metadata together we mean that requests that pertain to data (requests to read or write data) and requests that pertain to application metadata (requests to read or write application metadata) are sent together on the same interface with no reasonable way to determine which are data requests and which are application metadata requests When the storage system exposes to RocksDB both a block-level interface and an object-level interface, RocksDB can continue to write the application metadata using the block-level interface while storing the data (the MongoDB objects) using the more efficient object-based interface.

RocksDB may be used both a block-level and an object-level interface for this to work, yes (as detailed above). SSD controllers today only support a block level interface, so the storage system in this case would receive requests using both a block-level interface and an object-level interface and write them to the SSDs using the single block-level interface that the SSD knows. In our system we do this by controlling where the data is written (so we write both "block" data and "object" data to the same SSDs) and making note in internal system metadata whether each piece of data (whether block or object) arrived as block-level data or object-level data, so that we can retrieve it and return it to the hosts appropriately when the hosts request that block or that object.

The storage system can provide differentiated service to the different interfaces and even to different objects by serving different interface using dedicated resources (e.g., a set of compute cores dedicated to a specific interface).

One example is dedicating a set of computing cores to only serving requests to get/set/delete objects or even only serving requests to get/set/delete *specific* objects. Another example is having dedicated queues between different parts of the system (e.g., between different compute cores) where objects are transferred over these queues. Some objects may only be transferred over a slow queue. Other objects may get higher priority and be transferred over a fast queue. Another example is that the system may include hardware acceleration for speeding up the processing of specific objects. Most objects may be compressed and decompressed using CPU processing, which is fairly slow; high-priority objects may be compressed and decompressed using special compression hardware acceleration, which is faster and more efficient.

For example, assuming a storage system that has a set of compute cores dedicated to serving network traffic and protocol parsing ("frontend"), another set of cores dedicated to serving SSD storage ("backend") and an FPGA for accelerating certain operations, the storage system may allocate a specific set of cores with some amount of memory to block traffic, and second set of cores with another amount of dedicated memory to "low-importance" objects, and a third set of cores with dedicated memory and FPGA acceleration resources to "high-importance" objects, where objects are classified as low-importance or high-importance based on application hints.

For example, assuming a storage system that has a set of compute cores dedicated to serving network traffic and protocol parsing ("frontend"), another set of cores dedicated to serving SSD storage ("backend") and an FPGA for accelerating certain operations, the storage system software logic may allocate at runtime a specific set of cores with some amount of memory to block traffic, and second set of cores with another amount of dedicated memory to "low-importance" objects, and a third set of cores with dedicated memory and FPGA acceleration resources to "high-importance" objects, where objects are classified as low-importance or high-importance based on application hints.

The storage system software logic may change the core assignments in response to user inputs or administrative commands, or in response to changing workload conditions. For example, if there are no high-priority objects to process, the software control logic may choose to reallocate the set of cores which is dedicated to high-priority objects, moving them to processing all other objects.

Another example is that the storage system, given that it has limited memory resources, may decide to keep metadata in memory to the extent that memory is available while flushing data immediately to slower storage tiers, thereby clearing up memory for metadata.

Yet another example is for the storage system frontend to dispatch metadata requests to the system's backend component via short latency sensitive queues and dispatch data requests via throughput-oriented queues, which are longer and have higher latency.

Yet another example is for the storage system to store application metadata and application data on different SSDs or in different streams on the same SSDs, to provide differentiated QoS from the disks (e.g., to avoid interference due to garbage collection for metadata read requests but allow garbage collection to interfere with data read/write requests).

Another example is for the storage system may use different data resiliency or compression algorithms for data and for metadata, since it may be acceptable to lose data partly or entirely, but it may not be acceptable to lose any metadata.

Another example is for the storage system to expose logical "streams" of data to the application, where data written to a stream does not mingle with data written to another stream while it is being processed by the storage system and written to the underlying storage. The application controls which stream each piece of data is written to If an object wasn't found in all upper level, the largest file will be approached (it doesn't have bloom). If the object is not found in this one as well, read-null is returned.

Figure 16:
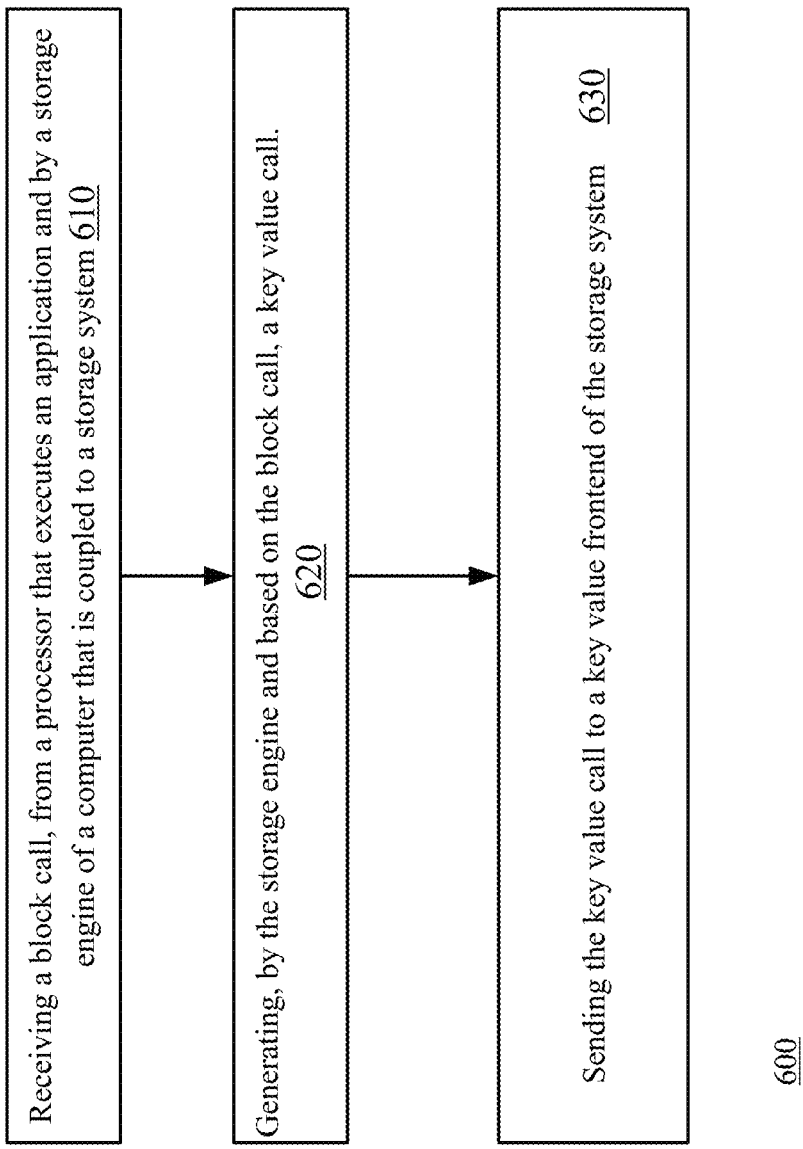
FIG. 16 is an example of a method.
Figure 17:
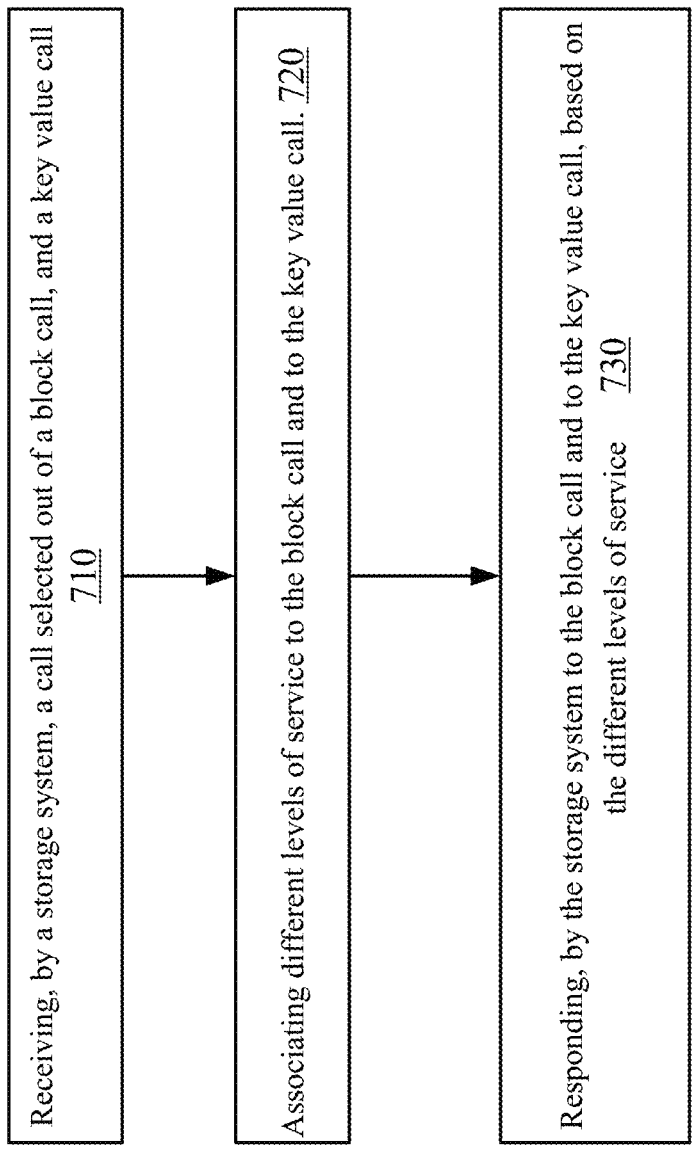
FIG. 17 is an example of a method.
Figure 18:
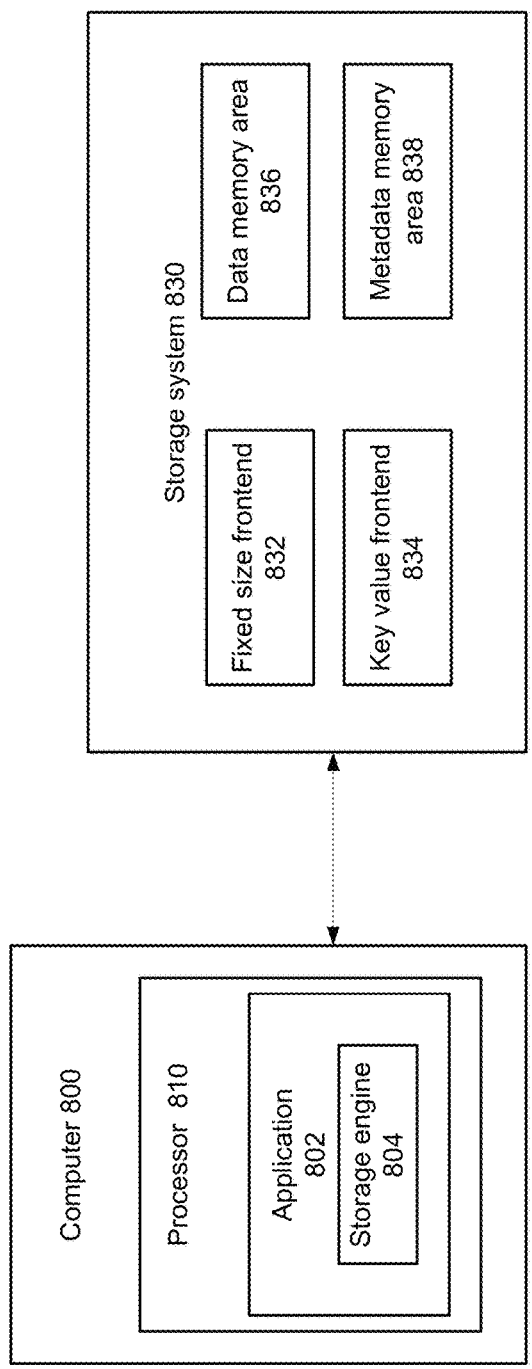
FIG. 18 illustrates an example of a storage system and a computer.

FIG. 18 illustrates a computer and a storage system 830 that may participate in the execution of any one of the methods of FIGS. 16 and 17. For example—computer 800 includes a processor 810 that executes application 802 and a storage engine 804 of the application.

Storage system 830 may include frontends such as fixed size frontend (for managing block protocols) 832 and key value front end 834. The storage system may include an application data memory area 836 and an application metadata memory area.

FIG. 16 illustrates method 600 of accessing a storage system.

Method 600 may include steps 610, 620 and 630.

Step 610 may include receiving a block call, from a processor that executes an application and by a storage engine of a computer that is coupled to a storage system. The storage engine is executed by the processor that executes the application or by another processor of the computer.

Step 620 may include generating, by the storage engine and based on the block call, a key value call.

Step 630 may include sending the key value call to a key value frontend of the storage system.

Step 620 may include generating storage processing hints that may be included in the key value call.

The storage processing hints may be indicative of a priority of the key value call.

The storage processing hints may be indicative of whether to respond to the key value call by executing a background process.

The storage processing hints may be application-level semantic hints.

Method 600 may also include sending the block call to a block frontend of the storage system.

Method 600 may also include sending, in parallel, the block call, and the key value call.

Method 600 may also include determining whether to convert the block call to the key value call based on a state of the storage system.

The state of the storage system may include a load imposed on the key value frontend of the storage system and on a block frontend of the storage system.

The generating of the key value call may include converting the block call to the key value call.

The block call may be associated with application data and the key value call may be related to application metadata.

Method 600 may also include treating in a different manner block calls and key value calls. For example— allocating different level of service, different priority levels to these different types of calls.

FIG. 17 illustrates method 700 of operating a storage system.

Method 700 may include steps 710, 720 and 730.

Step 710 may include receiving, by a storage system, a call selected out of a block call, and a key value call.

Step 720 may include associating different levels of service to the block call and to the key value call.

Step 730 may include responding, by the storage system to the block call and to the key value call, based on the different levels of service.

The block call may be associated with application data, and the key value call may be related to application metadata.

Step 720 may be responsive to application-level semantic hints included in at least one of the block call and the key value call.

Method 700 may include inferring whether a call is a block call or a key value call.

The inferring may be responsive to previous calls received by the storage system.

Byte Granular Virtual Mapping

There is a growing need to provide improved manners for utilizing storage resources.

A memory management unit (MMU), sometimes called paged memory management unit, is a hardware component that is responsible for translation of a virtual address to a physical address. This component is usually implemented in the CPU Like MMU, IOMMU translates device virtual addresses to physical addresses for IO devices that can perform direct access to the host main memory (DMA).

Usually device mappings are arranged in page granularity for simplicity of the translation operation, for example most modern PCI attached SSD devices support host memory mappings in the form of a page vector. Few newer devices support scatter-gather list mappings with double-word alignment. This requirement limits the host memory arrangements for memory locations that are used for DMA.

A common example where this limitation is evident is presented in a storage server that receives data from a remote client via TCP and stores it to a local SSD device. Logical entities (e.g. disk sector of a key-value object) are incoming from the TCP fabric are usually fragmented to different memory buffers. The memory fragmentation is governed by several components such as the size of the entity itself, the Ethernet fabric MTU, the TCP connection segmentation size, the network device segmentation and fragmentation capabilities and more. The memory layout of these entities is not likely to align the local SSD mapping alignment requirements which forces the host to align the memory on its own usually by performing a memory copy. Performing a memory copy in high probability is a very expensive operation because it occupies the CPU and prevents it from serving other stores that are incoming from the clients and also consumes DDR bandwidth.

This limitation is amplified when the storage server offers features like data compression, which usually creates unaligned data due to another level of entropy added to the system. In fact, the memory buffer is usually over-allocated because the size of the compressed data is unknown prior to the compression operation which also creates a non-efficient memory usage. Moreover, if a parallel compression engine is used, the host must take care of memory alignment after the compression operation is completed A system may support peer-to-peer data transfers of IO devices within the PCIe fabric. One example where peer-to-peer data transfer can be used is a host that contains a smart network interface with internal memory exposed as a PCIe BAR space, and a PCIe attached storage device or alternatively a processing device such as a GPU. The smart NIC, able to implement an application protocol, receives data entities from clients and transfers the data on the peer device in a peer-to-peer fashion for storage or processing purposes. Unlike the host CPU, the NIC does not necessarily have an IOMMU component for Modern systems support peer-to-peer data transfers of IO devices within the PCIe fabric. In case the peer device presents memory alignment limitations, the NIC must take care of memory alignment on its own.

Storage disks support IO operations in sector granularity (usually 512 or 4096 bytes). Data length must be aligned to the disk sector size. If a host application wishes to store objects (K/V objects or compressed disk blocks) that are smaller than the sector size, it is the application responsibility to store many objects in a single sector and store it to the disk. Alternatively, objects can be aligned to sector size (1 object per sector), however this approach is not space efficient. Once the objects are deleted, unused space will become fragmented and dispersed in sectors. The host application can reclaim unused space by compacting valid objects into a new sector, which will create many non-contiguous memory segments that should to be written back to a new sector.

By being able to create a byte granularity virtual mapping, all discontinuous segments can be presented as a sector aligned memory address and the host application can write the data back to the disk without performing memory alignment operations.

There may be provide a method and system that apply sub-page granularity VMMU (Virtual Memory Management Unit)—especially byte-granularity. For example—a storage server may receive an object from a remote client via TCP and stores it to a local SSD device. The data arriving over the network is usually fragment to different memory buffers on a byte-granularity. For example, the object may reside in address 0xc0000001, which is not page-aligned. The VMMU can map it to address some address that is page aligned, e.g., 0xfffff000. Then, when the SSD reads from address 0xfffff000, it gets the data that is actually at address 0xc000001

The VMMU translates incoming device I/O requests to read or write memory on a per-byte granularity, potentially directing two adjacent non-page-aligned byte accesses to different, non-adjacent bytes in main memory. This is in contrary to page-based VMMUs.

The byte granular virtual mapping represents a byte granular scattered list of memory buffers as a single virtually contiguous memory buffer or as a collection of virtually contiguous memory buffers.

The VMMU translates incoming device I/O requests to read or write memory on a per-byte granularity, potentially directing two adjacent non-page-aligned byte accesses to different, non-adjacent bytes in main memory. Accordingly—each byte of data that is the subject of the I/O request is associated with a unique mapping rule that maps this byte to a certain byte in the memory.

The mapping operation can be done in a static fashion by an explicit mapping operation or in a dynamic fashion where the mapping "grows" with incoming store operations.

This method allows the host to represent a byte-addressable dispersed list of memory buffers as a single virtually contiguous memory space and provide it to the IO device. In turn, the IO device can request transfers from that mapping and the virtual memory mapping unit (VMMU) will gather the relevant memory scatters to satisfy the transfer operation.

The memory buffers containing the data can be stored as DRAM extension attached to the VMMU or the VMMU can pull the information from other IO device or CPU RAM connected to the same PCIe bus.

One benefit of such approach is that it frees the host from memory alignment constraints that are presented by its different IO devices, thus optimizing its pipelining operation by saving the host related memory copies. Another advantage of this approach is that IO devices can optimize their data-transfers and/or simplify their corresponding state machine because they are given a single address and length rather than an address vector. Freeing the host from alignment constraint frees the host software from having to copy the data so that it fits the constraints of the device. Using the example above, instead of copying the data to some page-aligned address, we instead use the VMMU to map the data in its original (non-page aligned address) to a page-aligned address.

This approach can also be implemented in as an IOMMU residing on the PCIe bus or as a co-processor extension, residing either in a CPU socket or as a device on the PCIe bus A VMMU translation table can be implemented in the form of an interval tree (wikipedia.org) where each (byte-granularity) interval (A, A+B)→K is a translation from device virtual addresses A of B bytes to physical address K of B bytes.

Alternatively, VMMU can be rule-based, where instead of having an interval tree for translation table, the VMMU translation logic has a list of rules that govern the translation, with each virtual address associated with a list of rules. In this model, each virtual address A of B bytes is associated with a list of physical addresses and a list of rules that govern the translation.

For example, given a data unit that starts with a virtual address A, and assuming that the segments (of the data unit) are stored in two non-continuous physical address ranges— one starting at physical address P1 and includes 500 bytes of the data unit—and a second starting at physical address P2 and includes up to 10000 bytes.

This data unit may be associated with the following rules
R1 [offset 10, length 5]
R2 [offset 100, length 1000]
R3 [offset 1500, length 500]
The list of rules state that:
R1—The first five bytes (length=5) of the data unit are associated with a range of physical addresses that starts at an offset of 10 (offset 10) from the start address of P1.
R2—The next thousand bytes (length=1000) of the data unit are associated with a range of physical address that starts at an offset of 100 (offset 100) from the start address of P1.
R3—The last bytes (length=10000) of the data unit are associated with a range of physical address that starts at an offset of 1500 (offset 1500) from the start address of P1.

Under these terms, when the device accesses the virtual address A, the byte-granularity translation is:

$(A+0 \rightarrow P1+10)$ $(A+1 \rightarrow P1+11) \ldots$ $(A+5 \rightarrow P1+100)(A+6 \rightarrow P1+101) \ldots$ $(A+499 \rightarrow P1+100+499-5)(A+500 \rightarrow P2+100+500-5)$.
...

The mapping rules can be fixed (e.g., to strip out the TCP and IP headers out of a packet, since the headers are always in fixed locations) and there will be only a few rules for all translations. So, if a packet with data arrives in memory with parts of its data in physical address P1 and parts in P2, given the translation as above, the device can access virtual address A sequentially and get all the data in P1 and P2, with the headers stripped out.

Figure 19:
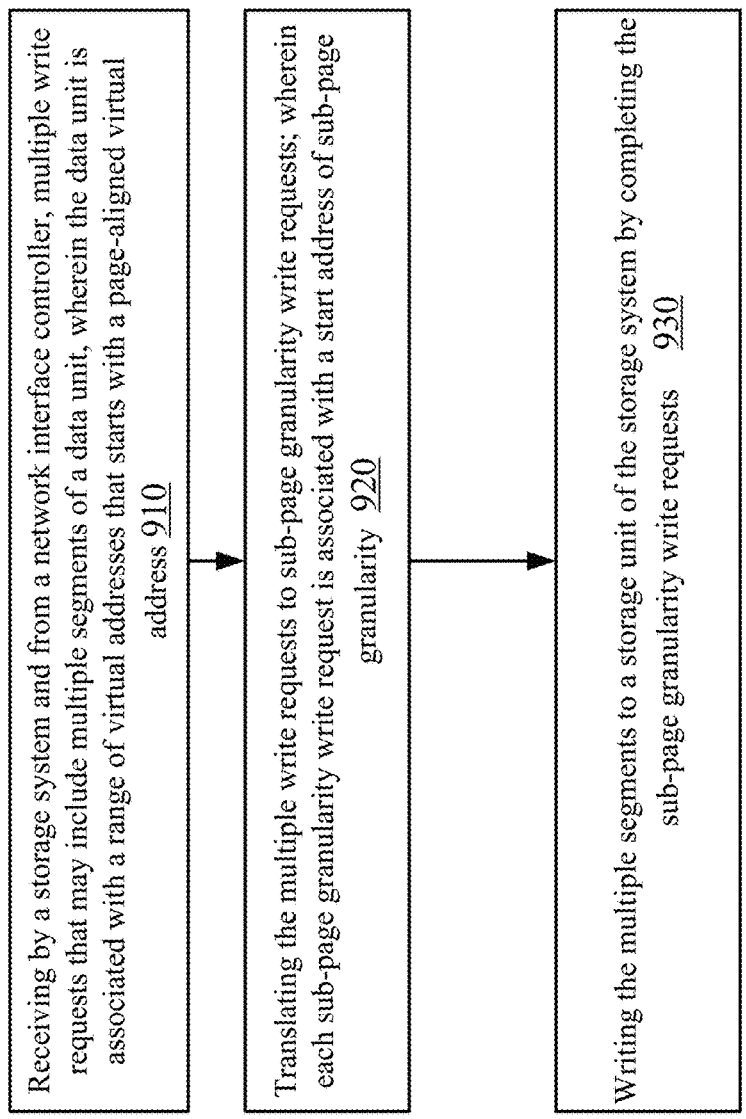
FIG. 19 is an example of a method.

FIG. 19 illustrates a method 900 for memory management.

Method 900 may include steps 910, 920 and 930.

Step 910 may include receiving by a storage system and from a network interface controller, multiple write requests that may include multiple segments of a data unit, wherein the data unit is associated with a range of virtual addresses that starts with a page-aligned virtual address. The network interface controller interfaces between a computer and the storage system.

Step 920 may include translating the multiple write requests to sub-page granularity write requests; wherein each sub-page granularity write request is associated with a start address of sub-page granularity.

Step 930 may include writing the multiple segments to a storage unit of the storage system by completing the sub-page granularity write requests.

The translating may include using translation rules.

The method may include selecting the translation rules based on an attribute of the multiple write requests.

The method may include selecting the translation rules based on a protocol related to the multiple write requests.

The method may include selecting the translation rules based on an expected pattern of the multiple segments.

The translation rules may map the range of virtual addresses to a multiple non-continuous physical address ranges.

The translating may include using one or more interval trees.

The receiving of the multiple write requests is followed by storing the multiple segments in a non-volatile memory module; wherein the method may include preventing from re-arranging the multiple segments within the non-volatile memory module.

The receiving of the multiple write requests may be followed by storing the multiple segments in a non-volatile memory module; writing the multiple segments in an accelerator memory coupled to an in-line hardware accelerator; rearranging the multiple segments and segments of other data units in the accelerator memory to provide write units; writing the multiple write-units to the storage unit; wherein the storage unit may include a solid-state drive unit.

Figure 20:
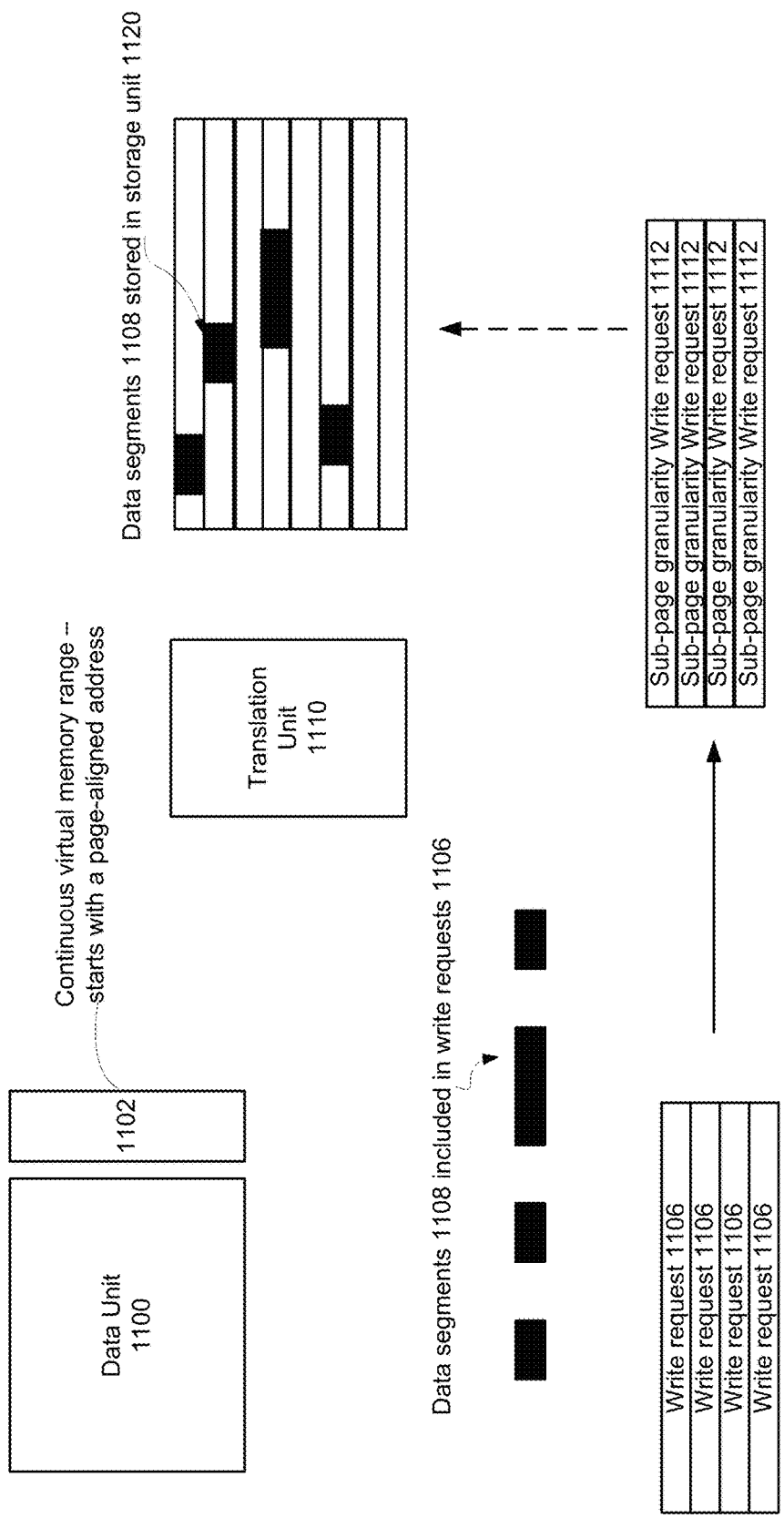
FIG. 20 is an example of a various components of a storage system and of various data structures.

FIG. 20 illustrates a data unit 1100, a virtual address memory range 1102, translation unit 1110, write requests 1106, sub-page granularity write requests 1112, data segments 1108 and storage unit 1120.

IN-LINE

FIG. 21 illustrates method 1200.

Method 1200 may include steps 1210 and 1220.

Step 1210 may include managing, by wherein an in-line hardware accelerator of the storage system, access to a solid-state drive (SSD) unit of the storage system; wherein the storage system may include an accelerator memory module that is coupled to the in-line hardware accelerator or belongs to the in-line hardware accelerator.

Step 1220 may include retrieving, by the in-line accelerator, data stored in a volatile memory module of the storage system and a non-volatile memory module of the storage system without involving a central processing unit (CPU) of the storage system; wherein the in-line hardware accelerator is directly coupled to the SSD unit, the volatile memory and the non-volatile memory; wherein the CPU is directly coupled to the volatile memory and to the non-volatile memory.

Method 1200 is highly effective and prevents the CPU from allocating resources for data transfers between the in-line hardware accelerator. When using method 1200 that CPU or the connections between the CPU and various memory modules (volatile and/or non-volatile) are not a bottle neck and do not limit the communication between the in-line accelerator and various memory units.

The storage system may include multiple CPUs, multiple in-line hardware accelerators and a controller.

Method 1200 may include step 1230 of controlling various components of the storage system by the controller.

Step 1230 may include allocating, by the controller, tasks to the multiple CPUs and to the multiple in-line hardware accelerators.

The storage system may include may include a communication network that is coupled to the CPU, the in-line hardware accelerator, the volatile memory module and to a non-volatile memory module of the storage system. Method 1200 may include actively initiating, only the CPU and the in-line hardware accelerator, data transfer over the communication network. Step 1220 may include initiating by the in-line hardware accelerator data transfers.

The communication network may be a peripheral component interconnect express (PCIe) root complex and the in-line hardware accelerator may be coupled to the PCIe root complex via a PCI switch.

Method 1200 may include step 1240 of executing by the in-line hardware accelerator acceleration processes using at least one acceleration engines of the in-line hardware accelerator, wherein the accelerator engines may include at least one out of a compression engine, a decompression engine, an encryption engine, a decryption engine, a compaction engine, a de-duplication engine, a data movement engine, a replication engine, a peer-to-peer engine, a scatter-gather engine, a virtual MMU engine, or an erasure coding engine.

Step 1230 may include instructing the in-line hardware accelerator, by the controller, to (i) perform only SSD unit related operations on one or more data units retrieved by the in-line hardware accelerator, or to (ii) perform, on the one or more data units retrieved by the in-line hardware accelerator, SSD unit related operations in addition to an additional processing operation selected out of encryption and compression.

The one or more data units are associated with a certain application. Step 1230 may include determining, by the controller, whether to instruct the in-line hardware accelerator to perform (i) or (ii) based on an identity of the certain application.

The one or more data units are associated with a certain application. Step 1230 may include determining, by the controller, whether to instruct the in-line hardware accelerator to perform (i) or (ii) based on an outcome of at least one previous attempt to compress or encrypt data units related to the certain application.

The one or more data units are associated with a certain application. Step 1230 may include determining, by the controller, whether to instruct the in-line hardware accelerator to perform (i) or (ii) based on a priority of the certain application.

Step 1230 may include determining, by the controller, whether to instruct the in-line hardware accelerator to perform (i) or (ii) based on a fullness of at least one of the volatile memory and the non-volatile memory.

The accelerator memory module may include (a) a first area for storing data fetched by the in-line hardware accelerator, (b) a second area for storing data that was compressed or encrypted by the in-lime hardware accelerator, and (c) a third area for storing data that undergone SSD unit related operations.

Method 1200 may include step 1250 of accessing the accelerator memory module by the in-line hardware accelerator.

Step 1250 may include storing in the first area data fetched by the in-line hardware accelerator, storing in the second area data that was compressed or encrypted by the in-lime hardware accelerator, and storing in the third area data that undergone SSD unit related operations Step 1240 may include performing, by the in-line hardware accelerator at least one out of replication, erasure coding, compression, encryption, compaction, and de-duplication.

Step 1220 may include retrieving, by the in-line hardware accelerator, data from the accelerator memory, step 1240 may include compressing or encrypting the data to provide processed data, performing SSD unit processing on the processed data to provide SSD storage ready data and step 1210 may include writing the SSD storage ready data to the SSD unit.

SSD unit processing may involve any operation that is required for preparing the processed data to be written to the SSD unit. For example—generating write-words. Various accelerated processed such as error correction may be regarded as SSD unit processing.

Step 1250 may include retrieving, by the in-line hardware accelerator, data from the accelerator memory, step 1240 may include performing SSD unit processing on the data to provide SSD storage ready data and step 1210 may include writing the SSD storage ready data to the SSD unit.

The in-line hardware accelerator may include a field programmable gate array (FPGA).

The FPGA may include multiple user programmed FPGA logic that are programmed by different users.

The term in-line may mean that the hardware accelerator in included in the path between the CPU and the SSD.

Many data processing functions such as encryption and compression are central processing unit (CPU) and input output (I/O) bandwidth intensive. A common practice for accelerating/offloading these tasks involves a co-processor that has dedicated hardware engines that can perform these tasks more efficiently than a CPU.

General Purpose Vs. Inline Hardware Acceleration Engines.

Co-Processors with dedicated and specialized hardware acceleration engines have been around for a while. These co-processors are typically used as special purpose acceleration engines, alongside general-purpose CPUs. However, this co-processor architecture is limited in its performance due to the added latency of the round-trip copy of data to/from the main CPU to the Co-Processor and back.

For example, an inefficient process may include:
1. Data Ingress.
2. Data copied over to storage media by CPU.
3. Data read back to CPU.
4. Data copied over by CPU to Co-Processor for processing.
5. New (post-processing) data is read back by CPU from Co-Processor
6. New data is copied over to Storage Media.

Data movement can be done by the CPU or by direct memory access (DMA) engines programmed by the CPU or the Co-Processor. In either case, data has to traverse twice between the CPU and Co-Processor as well between the CPU and the Storage Media.

Figure 22:
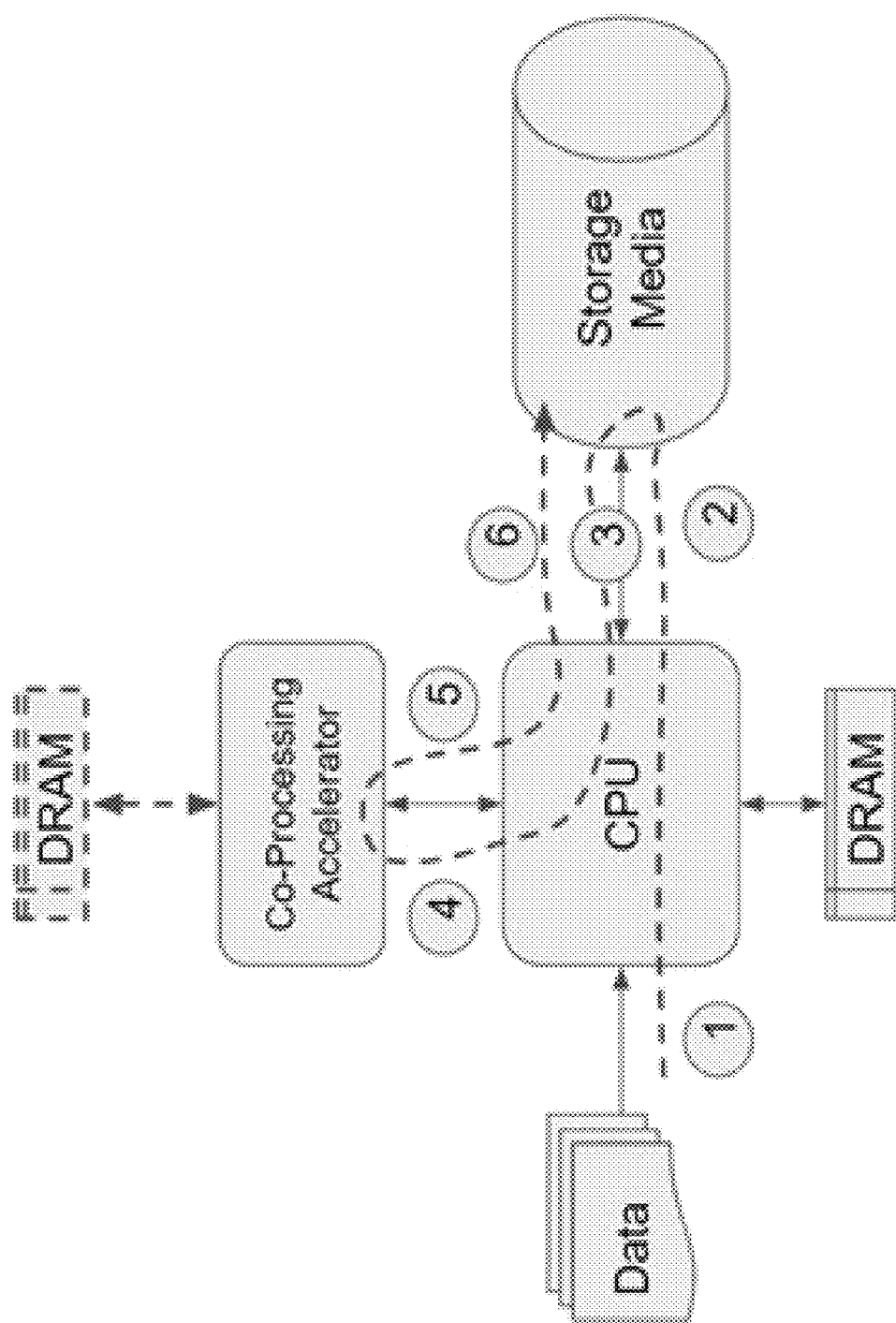
FIG. 22 illustrates an example of data flows.

A concrete example may be a Co-Processor the implements a lossy compression algorithm like JPEG. On the Ingress, the original data has to be written to media, read back from media through the CPU to the co-processor, compressed by the co-processor compression engines and the written back through the CPU back to media. In this sequence, the original data is copied between the CPU and the Storage twice before the compressed data gets copied again. These round trips through the CPU waste bandwidth on the CPU, add latency and as a result, slows down the system overall. —See FIG. 22. The CPU is connected to the DRAM, co-processor and SSD units- and the co-processor must use the resources of the CPU to access the SSD unit.

Figure 23:
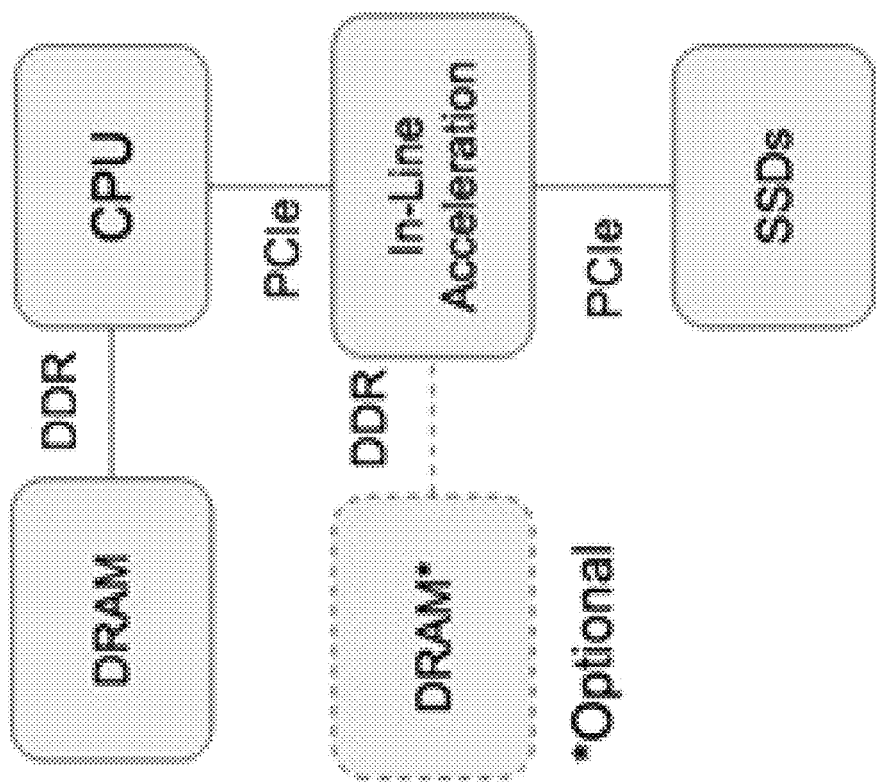
FIG. 23 illustrates an example of a system with an in-line accelerator.
Figure 24:
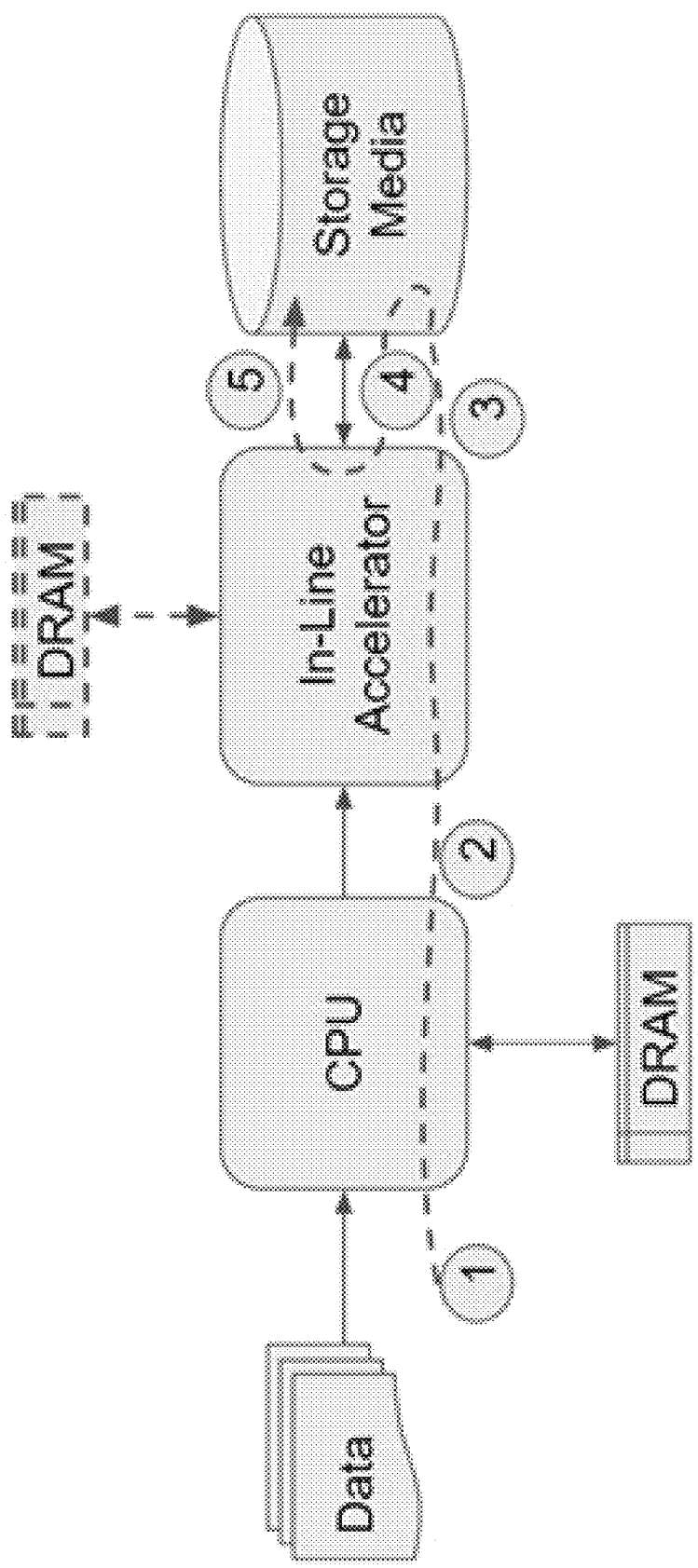
FIG. 24 illustrates an example of data flows.
Figure 25:
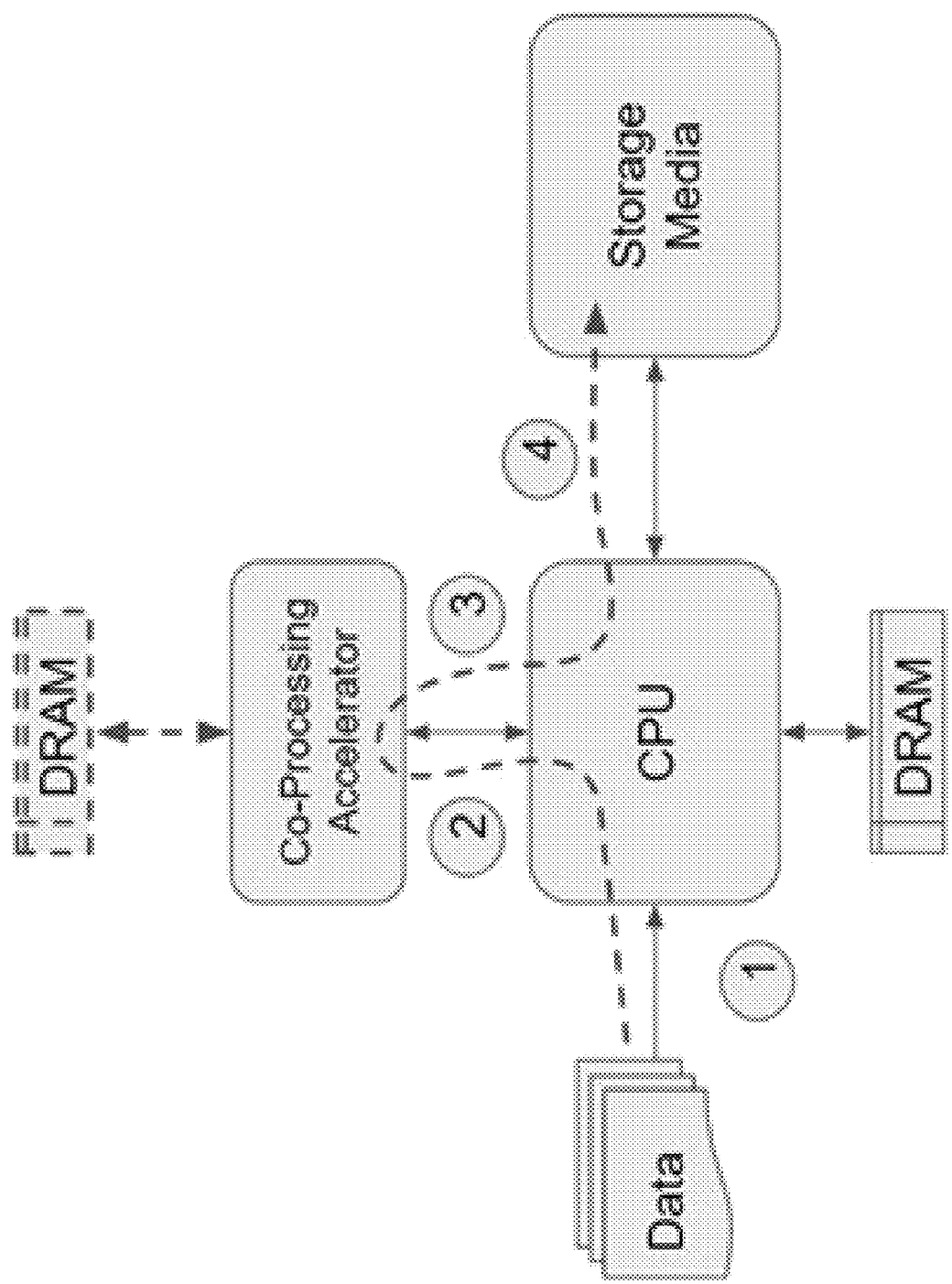
FIG. 25 illustrates an example of data flows.

FIG. 23 illustrates an example of a system with an in-line accelerator and FIG. 24 illustrates improved data flows using the system with the in-line accelerator.

The system of FIG. 23 can be regarded as an in-line equivalent of the data-staging flow. The data movements in the system between processing elements are—
1. Data Ingress towards the CPU
2. Data copied over from CPU to In-Line Accelerator.
3. The accelerator can perform DMA without host intervention. The copying may be viewed as streaming and/or pipelining the data.
4. Data written by In-Line Accelerator to Storage Media
5. Data read back by In-Line Accelerator for processing
6. New (post-processing) data is written over to Storage Media There are multiple advantages to the In-Line architecture
Data traverses through the CPU only once, reducing load on the CPU and freeing up CPU resources for other tasks.
There are less data movements across processing elements in the system, thus reducing latency and load on the system overall as well as reducing the total internal bandwidth required to perform the same tasks.

Data Processing Flow without Data-Staging.

Not all data processing flows require staging data at a persistent storage media first. In some case the original data does not have to be stored first and can processed immediately and the original data can be discarded. This could be, as an example, an encryption algorithm or a streaming lossless compression algorithm that can recover the original media from the encrypted or compressed data. In this case, a more streamlined data processing flow using co-processors is possible, as illustrated below—

Figure 26:
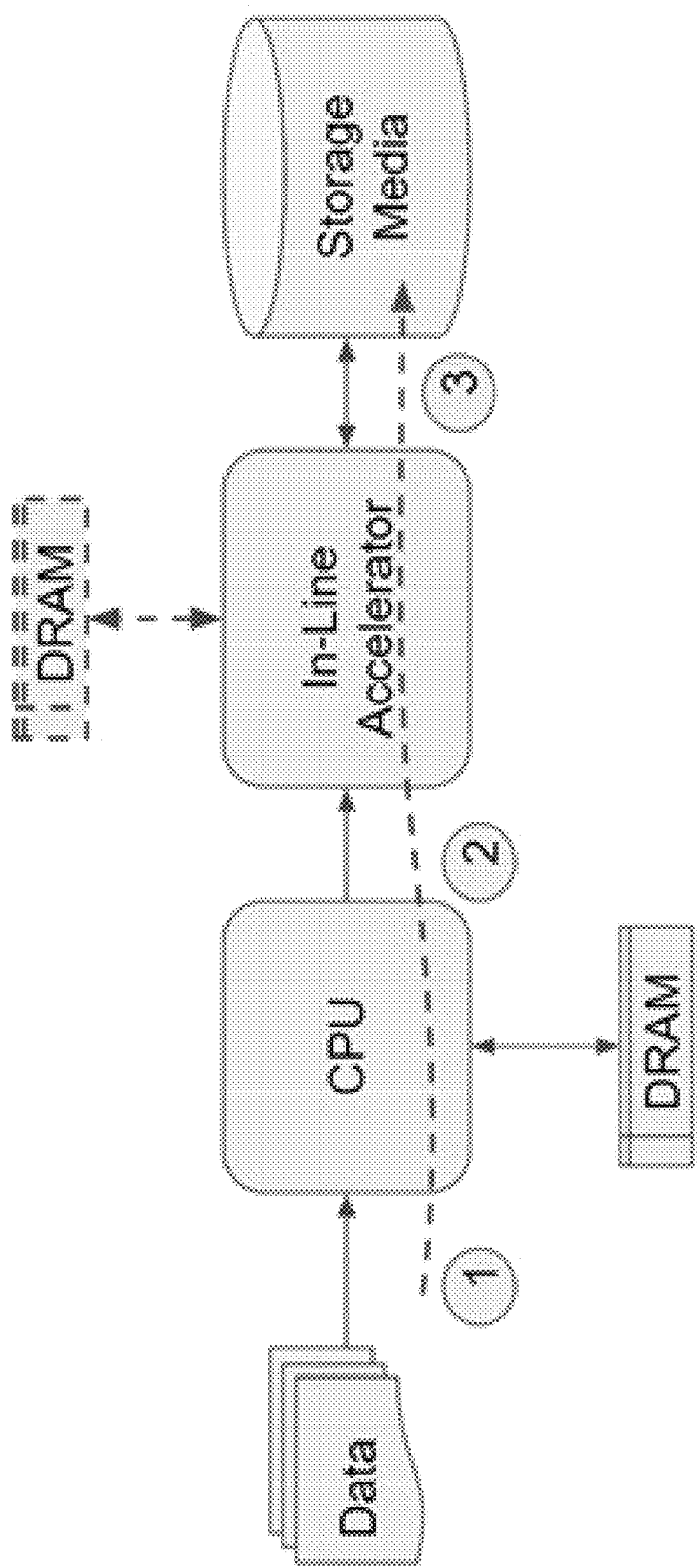
FIG. 26 illustrates an example of data flows.

In this in-line flow there are fewer data movements between processing elements in the system Data Ingress towards CPU
1. Data copied over by CPU to Co-Processor for processing
2. New (post-processing) data is read back by CPU from Co-Processor
3. New data is copied over to Storage Media However, even in this case, an In-Line Accelerator architecture is still superior, requiring less processing stages and consuming less bandwidth and hardware resources in the system. The equivalent In-Line data processing flow is illustrated in FIG. 26:

In this in-line flow, there are fewer data movements between processing elements in the system
1. Data Ingress towards CPU
2. Data copied over by CPU to Co-Processor for processing
3. New (post-processing) data is written by In-Line Accelerator to the Storage Media The advantages of the in-line accelerator over the co-processor flow are:
There is no round-trip towards the in-line accelerator and back to the CPU. Data traverses through the CPU only once, reducing load on the CPU and freeing up CPU resources for other tasks
There are less data movements across processing elements in the system overall, thus reducing latency and load on the system overall as well as reducing the total internal bandwidth required to perform the same tasks.

System Description

The described system is used as a data storage system. It is given as example but not limited to this example. Another system could be used for Machine Learning, using the same concepts. It includes general purpose CPUs, Memory and storage media (solid-state drive—SSD, hard disk drive—HDD or similar) as well acceleration processor(s) that that are integrated as in-line processing stage (as described in the background chapter) to perform data processing logic. The in-line acceleration processors include data processing logic that may be applied to the data accessible to it.

The in-line acceleration processor(s) may be implemented by a field programmable gate array (FPGA). The FPGA may include also un-configured parts. Those parts may be programmed to include additional logic supplied by a user to add user-specific in-line data processing functionality to the acceleration stage. One FPGA can include multiple users parts (more than one user).

In-Line Accelerator Engine Basic Design

The In-Line Accelerator interfaces with the rest of the system via Peripheral Component Interconnect Express (PCIe) links and shares the same Virtual Address Space with the rest of the System via PCIe memory mapping mechanism. It may store all the data in its embedded memory buffer, or it may be implemented using an external memory such as dynamic random-access memory (DRAM) for additional memory capacity.

Figure 27:
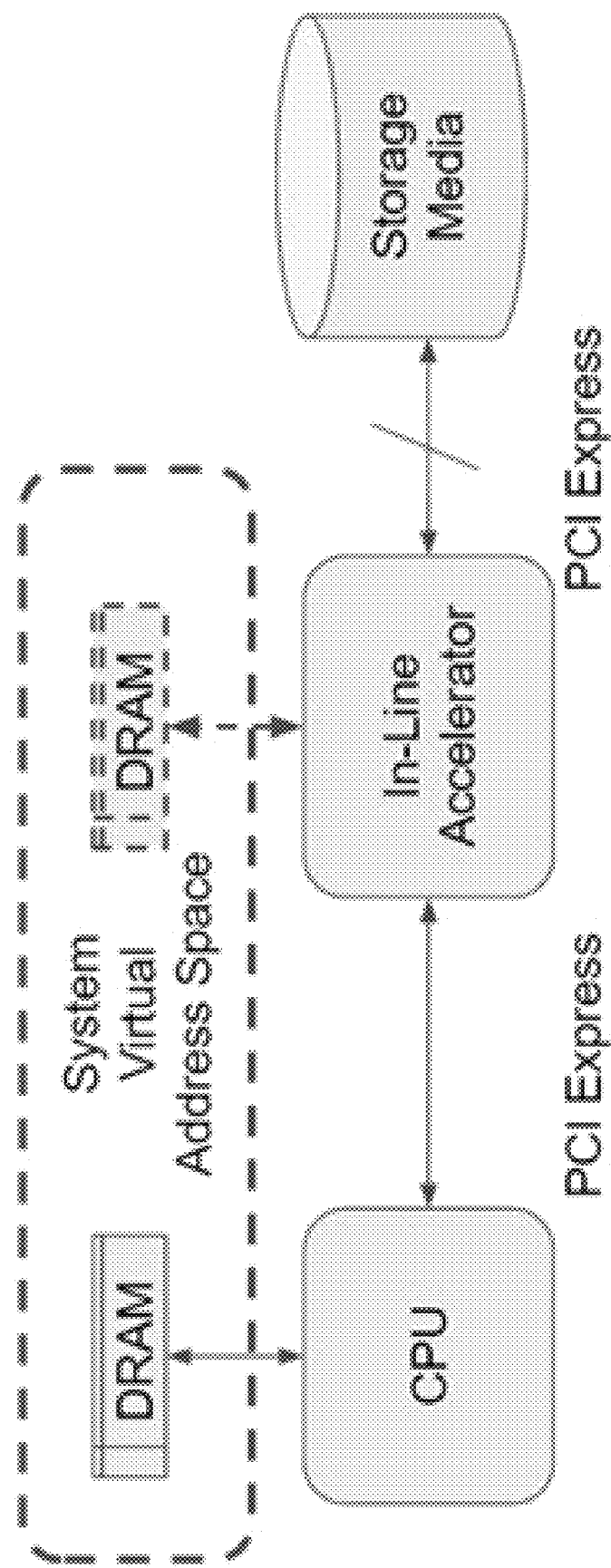
FIG. 27 illustrates an example of data flows.

The In-Line Accelerator may also include one or more Data-Processing Engines (Acceleration Engines) that can be invoked independently and in parallel. The In-Line Accelerator shall implement an Application Programming Interface (API) so that Users can program shall be used to program the Accelerator Engines. The In-Line Accelerator shall intercept all data and control messages that flow through it. It may pass-through control and data messages that have not been flagged by the user for in-line processing. See, for example, FIG. 27.

Basic Operation Example of a Storage System with In-Line Accelerator

Figure 28:
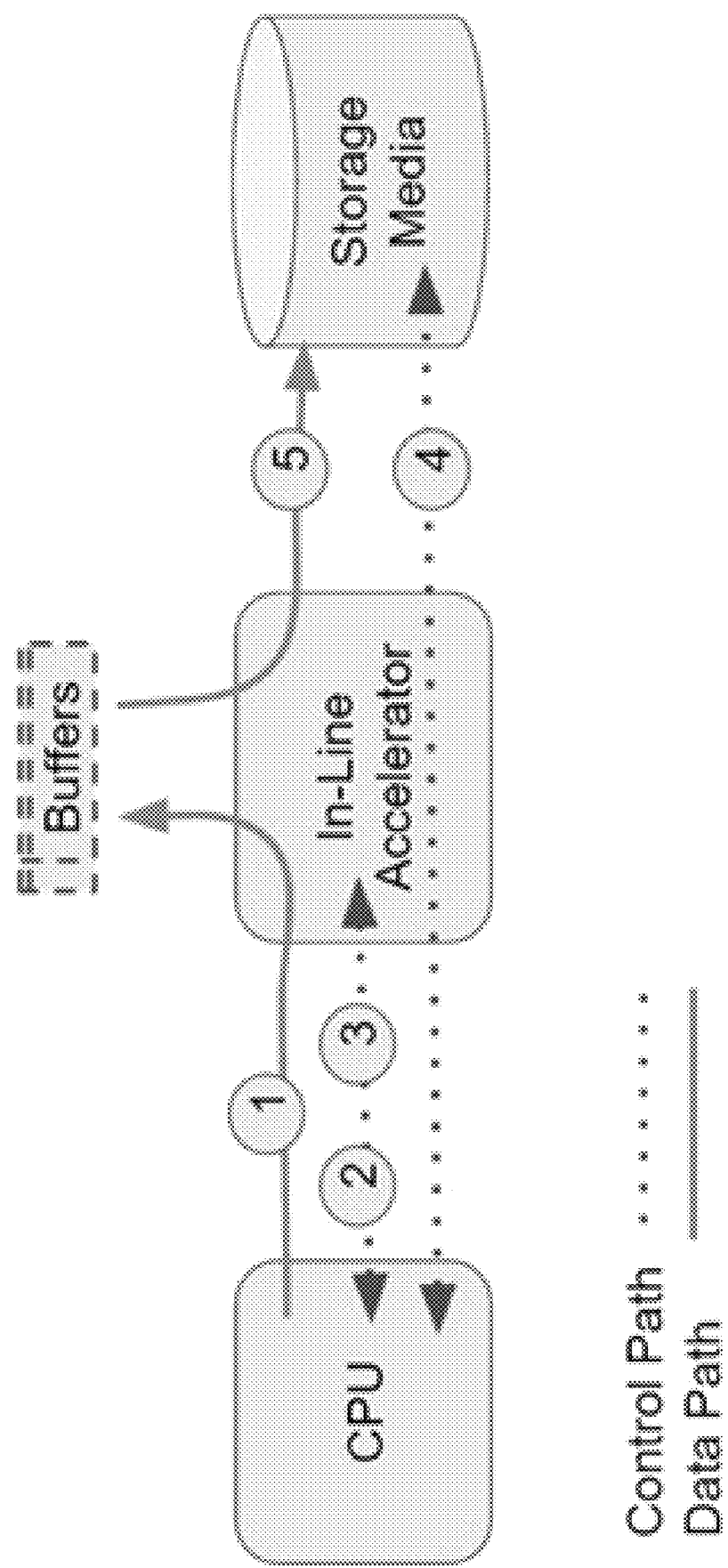
FIG. 28 illustrates an example of data flows.

FIG. 28 illustrates a basic flow of data processing through the In-Line Accelerator—
1. Source Data is copied to Memory Mapped Buffer of the In-Line Accelerator
2. An operation command is issued via the API to instruct the Accelerator Engine to process the data via the Control Plane API.
3. When processing is done, a completion notification is issued to the application running on the Host CPU with information on the memory address location of the post-processed data (the result data)
4. A command is issued to the Storage Media Device via the Media Native API (bypassing the In-Line Accelerator) with instructions to copy the result data from the memory buffers of the In-Line Accelerator which are mapped to the virtual memory address space of the system and thus are accessible to the Storage Media Device transparently.
5. Result data is copied to the Storage Media as a native memory transfer operation.

There is provided an in-line accelerator that may be located between the CPU and target storage/TO-device/other-CPU.

By placing a Programmable Acceleration Engine in the form of an FPGA on the data path of the PCIe bus to and from the storage, there is no longer a need for a round-trip copy of the data and the memory and PCIe I/O bandwidth can be utilized significantly more effectively, resulting in either performance and/or system cost gains.

The in-line accelerator may be an FPGA.

The in-line accelerator may be connected to multiple PCIe devices

The in-line accelerator targets storage device(s)

The storage device may be a nonvolatile memory express (NVMe) device

The in-line accelerator may be used to perform replication/erasure-code, compression, encryption, compaction, de-duplication The in-line accelerator may be used to perform user functions by partially re-programming the FPGA The in-line accelerator may include local memory such double data rate (DDR) DRAM.

The DDR may be a dual port while the other port connected to the CPU or network interface controller (NIC).

The DDR may be used for mapping tables, bloom filters.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

The phrase "may be X" indicates that condition X may be fulfilled. This phrase also suggests that condition X may not be fulfilled.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for accessing a storage system, the method comprises:
    receiving a block call, from a processor that executes an application and by a storage engine of a computer that is coupled to a storage system;
    determining whether to convert the block call to a key value call based on a state of the storage system;
    generating, by the storage engine and based on the block call, a key value call; and
    sending the key value call to a key value frontend of the storage system, wherein the state of the storage system comprises a load imposed on the key value frontend of the storage system and on a block frontend of the storage system.

2. The method according to claim 1 wherein the generating comprises generating storage processing hints that are included in the key value call.

3. The method according to claim 2 wherein the storage processing hints are indicative of a priority of the key value call.

4. The method according to claim 2 wherein the storage processing hints are indicative of whether to respond to the key value call by executing a background process.

5. The method according to claim 2 wherein the storage processing hints are application-level semantic hints.

6. The method according to claim 1 further comprising sending the block call to a block frontend of the storage system.

7. The method according to claim 6 comprising sending, in parallel, the block call, and the key value call.

8. The method according to claim 1 wherein the generating of the key value call comprises converting the block call to the key value call.

9. The method according to claim 1 wherein block call is associated with application data; and wherein the key value call is related to application metadata.

10. The method according to claim 1 comprises treating in a different manner block calls and key value calls.

11. The method according to claim 10 comprising associating different levels of service to block calls and to the key value calls.

12. A non-transitory computer readable medium that stores instructions that once executed by a computer causes the computer to execute the steps of:
receiving a block call, from a processor that executes an application and by a storage engine of a computer that is coupled to a storage system;
determining whether to convert the block call to a key value call based on a state of the storage system;
generating, by the storage engine and based on the block call, a key value call; and
sending the key value call to a key value frontend of the storage system, wherein the state of the storage system comprises a load imposed on the key value frontend of the storage system and on a block frontend of the storage system.

13. The non-transitory computer readable medium according to claim 12 wherein the generating comprises generating storage processing hints that are included in the key value call.

14. The non-transitory computer readable medium according to claim 13 wherein the storage processing hints are indicative of a priority of the key value call.

15. The non-transitory computer readable medium according to claim 13 wherein the storage processing hints are indicative of whether to respond to the key value call by executing a background process.

16. The non-transitory computer readable medium according to claim 13 wherein the storage processing hints are application-level semantic hints.

17. The non-transitory computer readable medium according to claim 12 that stores instructions for sending the block call to a block frontend of the storage system.

18. The non-transitory computer readable medium according to claim 17 that stores instructions for sending, in parallel, the block call, and the key value call.

19. A computer that comprises multiple circuits that comprise a processor, wherein the multiple circuits are configured to execute the steps of receiving a block call, from the processor when the processor executes an application and by a storage engine of a computer that is coupled to a storage system; determining whether to convert the block call to a key value call based on a state of the storage system; generating, by the storage engine and based on the block call, a key value call; and sending the key value call to a key value frontend of the storage system, wherein the state of the storage system comprises a load imposed on the key value frontend of the storage system and on a block frontend of the storage system.

\* \* \* \* \*